US010715917B2

(12) United States Patent
Christoph et al.

(10) Patent No.: US 10,715,917 B2
(45) **Date of Patent: *Jul. 14, 2020**

(54) SOUND WAVE FIELD GENERATION

(71) Applicant: HARMAN BECKER AUTOMOTIVE SYSTEMS GMBH, Karlsbad (DE)

(72) Inventors: Markus Christoph, Straubing (DE); Leander Scholz, Salching (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/302,808

(22) PCT Filed: Mar. 24, 2015

(86) PCT No.: PCT/EP2015/056196
§ 371 (c)(1),
(2) Date: Oct. 7, 2016

(87) PCT Pub. No.: WO2015/154986
PCT Pub. Date: Oct. 15, 2015

(65) Prior Publication Data

US 2017/0034623 A1 Feb. 2, 2017

(30) Foreign Application Priority Data

Apr. 7, 2014 (EP) .................................... 14163718

(51) Int. Cl.
*G10K 11/178* (2006.01)
*G06F 3/16* (2006.01)
(Continued)

(52) U.S. Cl.
CPC ............. *H04R 5/027* (2013.01); *H04S 7/301* (2013.01); *H04S 7/302* (2013.01); *H04S 7/307* (2013.01);
(Continued)

(58) Field of Classification Search
CPC ...... H04R 3/12; H04R 2499/13; H04R 5/027; H04S 7/301; H04S 7/307; H04S 7/302; H04S 2420/13
(Continued)

(56) References Cited

U.S. PATENT DOCUMENTS 5,416,845 A * 5/1995 Qun ................ G10K 11/17854 381/71.12
7,286,674 B2 * 10/2007 Karjalainen ........... H03G 5/165 381/66
(Continued)

FOREIGN PATENT DOCUMENTS

CN 101296529 A 10/2008
JP 2004064739 A 2/2004
(Continued)

OTHER PUBLICATIONS

Jarrett et al., "Rigid sphere room impulse response simulation: Algorithm and applications", J. Acoust. Soc. Am. 132 (3), Sep. 2012, pp. 1462-1472.
(Continued)

*Primary Examiner* — Vivian C Chin
*Assistant Examiner* — Douglas J Suthers
(74) *Attorney, Agent, or Firm* — Brooks Kushman P.C.

(57) ABSTRACT

A system and method is configured to generate a sound wave field around a listening position in a target loudspeaker-room-microphone system in which a loudspeaker array of K≥1 groups of loudspeakers is disposed around the listening position, and a microphone array of M≥1 groups of microphones is disposed at the listening position. The system and method include equalizing filtering with controllable transfer functions in signal paths upstream of the K groups of loudspeakers. The system and method further include controlling with equalization control signals of the controllable
(Continued)

transfer functions for equalizing filtering according to an adaptive control algorithm based on error signals and an input signal. The microphone array includes at least two first groups of microphones that are annularly disposed around a listener's head, around or in an artificial head or around or in a rigid sphere.

6 Claims, 38 Drawing Sheets

(51) Int. Cl.
*H04R 5/027* (2006.01)
*H04S 7/00* (2006.01)

(52) U.S. Cl.
CPC ...... *H04R 2499/13* (2013.01); *H04S 2420/13* (2013.01)

(58) Field of Classification Search
USPC ............................ 381/97, 71.11, 71.12, 71.8
See application file for complete search history.

(56) References Cited

U.S. PATENT DOCUMENTS

| | | | | |
|---|---|---|---|---|
| 2004/0032955 | A1 | 2/2004 | Hashimoto et al. | |
| 2005/0141723 | A1 | 6/2005 | Lee et al. | |
| 2008/0004872 | A1 | 1/2008 | Nordholm et al. | |
| 2008/0049948 | A1 | 2/2008 | Christoph et al. | |
| 2008/0260189 | A1 | 10/2008 | Schobben | |
| 2008/0273724 | A1 | 11/2008 | Hartung et al. | |
| 2008/0285775 | A1* | 11/2008 | Christoph | H03G 3/32 381/99 |
| 2011/0103590 | A1 | 5/2011 | Christoph et al. | |
| 2011/0249825 | A1 | 10/2011 | Ise | |
| 2014/0056431 | A1 | 2/2014 | Kano | |
| 2014/0348329 | A1 | 11/2014 | Christoph | |
| 2014/0348353 | A1 | 11/2014 | Christoph | |
| 2014/0348354 | A1 | 11/2014 | Christoph et al. | |
| 2015/0117672 | A1 | 4/2015 | Christoph | |
| 2015/0287400 | A1 | 10/2015 | Christoph | |
| 2015/0289057 | A1 | 10/2015 | Christoph | |
| 2015/0289058 | A1 | 10/2015 | Christoph | |
| 2015/0289059 | A1 | 10/2015 | Christoph | |
| 2015/0350805 | A1 | 12/2015 | Christoph | |
| 2015/0373476 | A1 | 12/2015 | Christoph et al. | |
| 2016/0196818 | A1 | 7/2016 | Christoph | |

FOREIGN PATENT DOCUMENTS

| | | | |
|---|---|---|---|
| JP | 20044336313 | A | 11/2004 |
| JP | 2005198251 | A | 7/2005 |
| JP | 2009027331 | A | 2/2009 |
| JP | 2010136027 | A | 6/2010 |
| JP | 2011221362 | A | 11/2011 |
| JP | 2014501064 | A | 1/2014 |
| WO | 2004016037 | A1 | 2/2004 |
| WO | 2012061149 | A1 | 5/2012 |
| WO | 2013150341 | A1 | 10/2013 |
| WO | 2013099093 | A1 | 4/2015 |

OTHER PUBLICATIONS

Kuo et al., "Active Noise Control Systems, Algorithms and DSP Implementations", 1996, John Wiley & Sons, New York, NY, 42 pages.
Widrow et al., "Adaptive Signal Processing", 1985, Printice-Hall, Inc., Upper Saddle River, NJ, 8 pages.
Farina et al., "AQT—A New Objective Measurement of the Acoustical Quality of Sound Reproduction in Small Compartments", Audio Engineering Society, 110th Convention, Amsterdam, The Netherlands, May 12-15, 2001, 7 pages.
Kirkeby et al., "Fast Deconvolution of Multichannel Systems Using Regularization", IEEE Transactions on Speech and Audio Processing, vol. 6, No. 2, Mar. 1998, pp. 189-195.
Algazi et al., "Motion-Tracked Binaural Sound", J. Audio Eng. Soc., vol. 52, No. 11, Nov. 2004, pp. 1142-1156.
Guillaume, "Algorithmes pour la synthese de champs sonores", http://pastel.paristech.org/2383, Nov. 2, 2006, pp. 123-136.
European Search Report for Application No. 14163718.1, dated Jun. 25, 2014, 9 pages.
International Search Report for Application No. PCT/EP2015/056196, dated May 26, 2015, 4 pages.
Nelson et al., "Adaptive Inverse Filters for Stereophonic Sound Reproduction", IEEE Transactions on Signal Processing, vol. 40, No. 7, Jul. 1992, pp. 1621-1632.
Nakadai, K. et al., "Real-Time Multiple Sound Source Tracking by Particle-Filter-based Integration of Heterogenous Microphone Arrays", the 24th Meeting of Special Interest Group on AI Challenges, SIG-Challenge-0624, Japanese Society for Artificial Intelligence Special Interest Group on AI Challenges, Nov. 17, 2006, 8 pgs.
English Translation of Japanese Penultimate Office Action for Application No. 2016-558358, dated Aug. 2, 2019, 8 pgs.

* cited by examiner

SOUND WAVE FIELD GENERATION

CROSS-REFERENCE TO RELATED APPLICATION

This application is the U.S. national phase of PCT Application No. PCT/EP2015/056196 filed on Mar. 24, 2015, which claims priority to EP Application No. 14163718.1 filed on Apr. 7, 2014, the disclosures of which are incorporated in their entirety by reference herein.

TECHNICAL FIELD

The disclosure relates to system and method for generating a sound wave field.

BACKGROUND

Spatial sound field reproduction techniques utilize a multiplicity of loudspeakers to create a virtual auditory scene over a large listening area. Several sound field reproduction techniques, e.g., wave field synthesis (WFS) or Ambisonics, make use of a loudspeaker array equipped with a plurality of loudspeakers to provide a highly detailed spatial reproduction of an acoustic scene. In particular, wave field synthesis is used to achieve a highly detailed spatial reproduction of an acoustic scene to overcome limitations by using an array of, e.g., several tens to hundreds of loudspeakers.

Spatial sound field reproduction techniques overcome some of the limitations of stereophonic reproduction techniques. However, technical constraints prohibit the employment of a high number of loudspeakers for sound reproduction. Wave field synthesis (WFS) and Ambisonics are two similar types of sound field reproduction. Though they are based on different representations of the sound field (the Kirchhoff-Helmholtz integral for WFS and the spherical harmonic expansion for Ambisonics), their aim is congruent and their properties are alike. Analysis of the existing artifacts of both principles for a circular setup of a loudspeaker array came to the conclusion that HOA (Higher-Order Ambisonics), or more exactly near-field-corrected HOA, and WFS meet similar limitations. Both WFS and HOA and their unavoidable imperfections cause some differences in terms of the process and quality of the perception. In HOA, with a decreasing order of the reproduction, the impaired reconstruction of the sound field will probably result in a blur of the localization focus and a certain reduction in the size of the listening area.

For audio reproduction techniques such as wave field synthesis (WFS) or Ambisonics, the loudspeaker signals are typically determined according to an underlying theory, so that the superposition of sound fields emitted by the loudspeakers at their known positions describes a certain desired sound field. Typically, the loudspeaker signals are determined assuming free-field conditions. Therefore, the listening room should not exhibit significant wall reflections, because the reflected portions of the reflected wave field would distort the reproduced wave field. In many scenarios such as the interior of a car, the necessary acoustic treatment to achieve such room properties may be too expensive or impractical.

SUMMARY

A system is configured to generate a sound wave field around a listening position in a target loudspeaker-room-microphone system in which a loudspeaker array of K≥1 groups of loudspeakers, with each group of loudspeakers having at least one loudspeaker, is disposed around the listening position, and a microphone array of M≥1 groups of microphones, with each group of microphones having at least one microphone, is disposed at the listening position. The system includes K equalizing filter modules that are arranged in signal paths upstream of the groups of loudspeakers and downstream of an input signal path and that have controllable transfer functions. The system further includes K filter control modules that are arranged in signal paths downstream of the groups of microphones and downstream of the input signal path and that control the transfer functions of the K equalizing filter modules according to an adaptive control algorithm based on error signals from the K groups of microphones and an input signal on the input signal path. The microphone array includes at least two first groups of microphones that are annularly disposed around a listener's head, around or in an artificial head or around or in a rigid sphere.

A method is configured to generate a sound wave field around a listening position in a target loudspeaker-room-microphone system in which a loudspeaker array of K≥1 groups of loudspeakers, with each group of loudspeakers having at least one loudspeaker, is disposed around the listening position, and a microphone array of M≥1 groups of microphones, with each group of microphones having at least one microphone, is disposed at the listening position. The method includes equalizing filtering with controllable transfer functions in signal paths upstream of the K groups of loudspeakers and downstream of an input signal path. The method further includes controlling with equalization control signals of the controllable transfer functions for equalizing filtering according to an adaptive control algorithm based on error signals from the K groups of microphones and an input signal on the input signal path. The microphone array includes at least two first groups of microphones that are annularly disposed around a listener's head, around or in an artificial head or around or in a rigid sphere.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system and methods may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Figure 1:
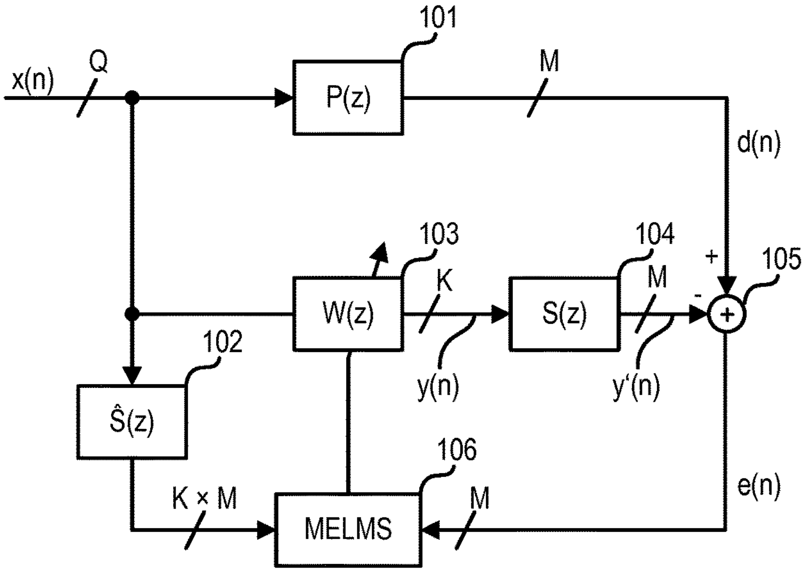
FIG. 1 is a flow chart illustrating a simple acoustic Multiple-Input Multiple-Output (MIMO) system with M recording channels (microphones) and K output channels (loudspeakers), including a multiple error least mean square (MELMS) system or method.

FIG. 1 is a signal flow chart of a system and method for equalizing a multiple-input multiple-output (MIMO) system, which may have a multiplicity of outputs (e.g., output channels for supplying output signals to $K \geq 1$ groups of loudspeakers) and a multiplicity of (error) inputs (e.g., recording channels for receiving input signals from M≥1 groups of microphones). A group includes one or more loudspeakers or microphones that are connected to a single channel, i.e., one output channel or one recording channel. It is assumed that the corresponding room or loudspeaker-room-microphone system (a room in which at least one loudspeaker and at least one microphone is arranged) is linear and time-invariant and can be described by, e.g., its room acoustic impulse responses. Furthermore, Q original input signals such as a mono input signal x(n) may be fed into (original signal) inputs of the MIMO system. The MIMO system may use a multiple error least mean square (MELMS) algorithm for equalization, but may employ any other adaptive control algorithm such as a (modified) least mean square (LMS), recursive least square (RLS), etc. Input signal x(n) is filtered by M primary paths 101, which are represented by primary path filter matrix P(z) on its way from one loudspeaker to M microphones at different positions, and provides M desired signals d(n) at the end of primary paths 101, i.e., at the M microphones.

By way of the MELMS algorithm, which may be implemented in a MELMS processing module 106, a filter matrix W(z), which is implemented by an equalizing filter module 103, is controlled to change the original input signal x(n) such that the resulting K output signals, which are supplied to K loudspeakers and which are filtered by a filter module 104 with a secondary path filter matrix S(z), match the desired signals d(n). Accordingly, the MELMS algorithm evaluates the input signal x(n) filtered with a secondary pass filter matrix (z), which is implemented in a filter module 102 and outputs K×M filtered input signals, and M error signals e(n). The error signals e(n) are provided by a subtractor module 105, which subtracts M microphone signals y'(n) from the M desired signals d(n). The M recording channels with M microphone signals y'(n) are the K output channels with K loudspeaker signals y(n) filtered with the secondary path filter matrix S(z), which is implemented in filter module 104, representing the acoustical scene. Modules and paths are understood to be at least one of hardware, software, and/or acoustical paths.

The MELMS algorithm is an iterative algorithm to obtain the optimum least mean square (LMS) solution. The adaptive approach of the MELMS algorithm allows for in situ design of filters and also enables a convenient method to readjust the filters whenever a change occurs in the electro-acoustic transfer functions. The MELMS algorithm employs the steepest descent approach to search for the minimum of the performance index. This is achieved by successively updating filters' coefficients by an amount proportional to the negative of gradient $\nabla(n)$, according to which $w(n+1)=w(n)+\mu(-\nabla(n))$, where $\mu$ is the step size that controls the convergence speed and the final misadjustment. An approximation may be in such LMS algorithms to update the vector w using the instantaneous value of the gradient $\nabla(n)$ instead of its expected value, leading to the LMS algorithm.

Figure 2:
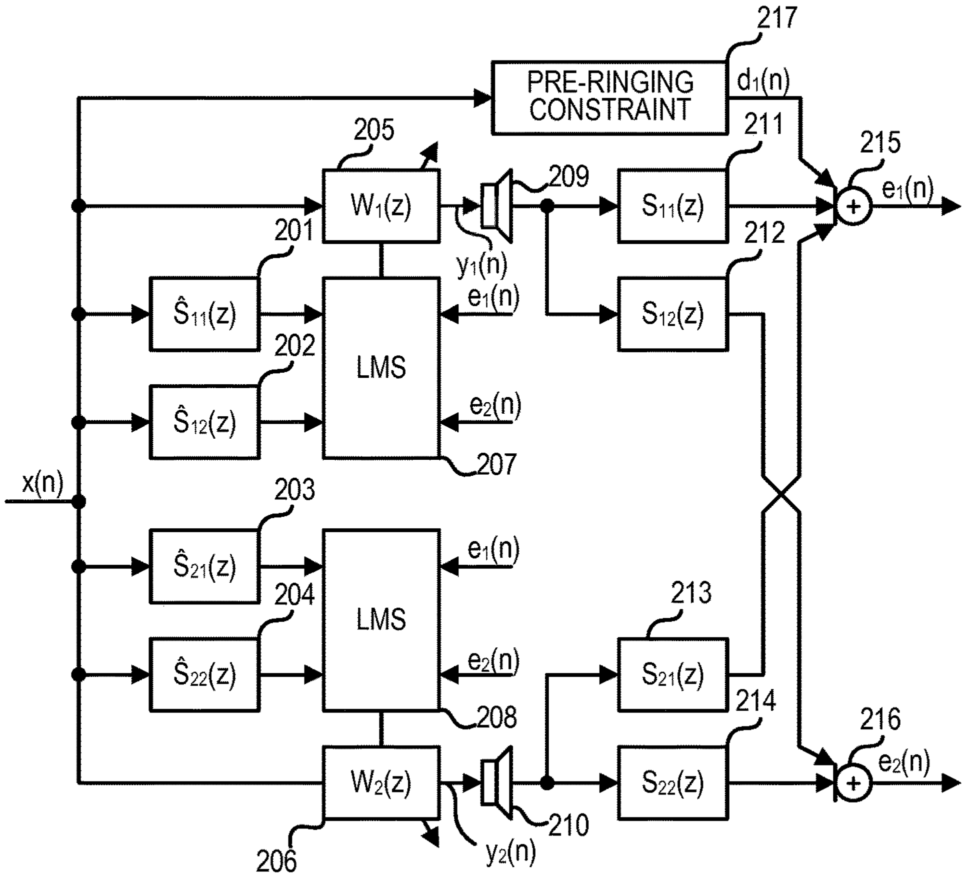
FIG. 2 is a flowchart illustrating a 1×2×2 MELMS system or method applicable in the MIMO system shown in FIG. 1.

FIG. 2 is a signal flow chart of an exemplary Q×K×M MELMS system or method, wherein Q is 1, K is 2 and M is 2 and which is adjusted to create a bright zone at microphone 215 and a dark zone at microphone 216; i.e., it is adjusted for individual sound zone purposes. A "bright zone" represents an area where a sound field is generated in contrast to an almost silent "dark zone". Input signal x(n) is supplied to four filter modules 201-204, which form a 2×2 secondary path filter matrix with transfer functions $\hat{S}_{11}(z)$, $\hat{S}_{12}(z)$, $\hat{S}_{21}(Z)$ and $\hat{S}_{22}(z)$, and to two filter modules 205 and 206, which form a filter matrix with transfer functions $W_1(z)$ and $W_2(z)$. Filter modules 205 and 206 are controlled by least mean square (LMS) modules 207 and 208, whereby module 207 receives signals from modules 201 and 202 and error signals $e_1(n)$ and $e_2(n)$, and module 208 receives signals from modules 203 and 204 and error signals $e_1(n)$ and $e_2(n)$. Modules 205 and 206 provide signals $y_1(n)$ and $y_2(n)$ for loudspeakers 209 and 210. Signal $y_1(n)$ is radiated by loudspeaker 209 via secondary paths 211 and 212 to microphones 215 and 216, respectively. Signal $y_2(n)$ is radiated by loudspeaker 210 via secondary paths 213 and 214 to microphones 215 and 216, respectively. Microphone 215 generates error signals $e_1(n)$ and $e_2(n)$ from received signals $y_1(n)$, $y_2(n)$ and desired signal $d_1(n)$. Modules 201-204 with transfer functions $\hat{S}_{11}(z)$, $\hat{S}_{12}(z)$, $\hat{S}_{21}(z)$ and $\hat{S}_{22}(z)$ model the various secondary paths 211-214, which have transfer functions $S_{11}(z)$, $S_{12}(z)$, $S_{21}(z)$ and $S_{22}(z)$.

Figure 4:
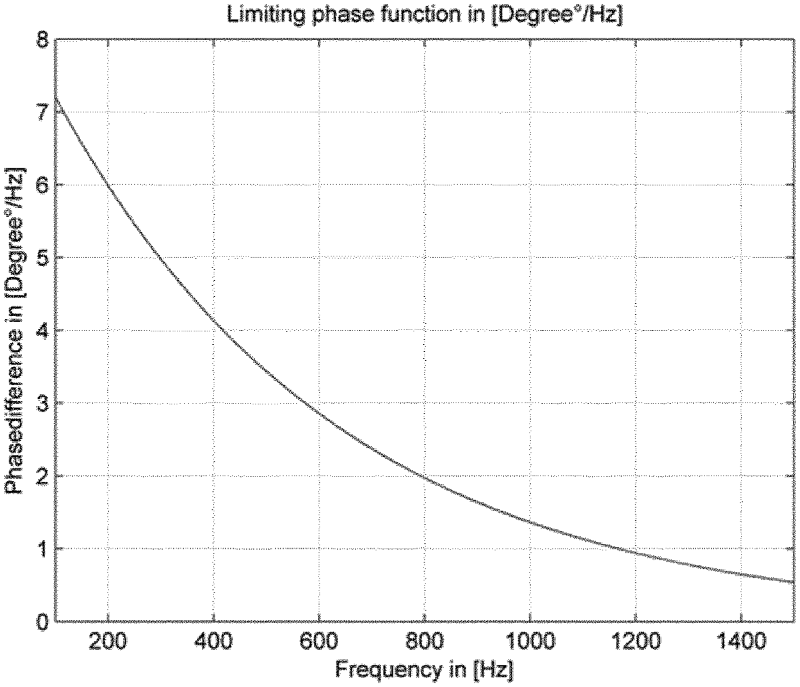
FIG. 4 is a diagram illustrating the curve of a limiting phase function (phase difference curve over frequency) derived from the curve shown in FIG. 3.

Furthermore, a pre-ringing constraint module 217 may supply to microphone 215 an electrical or acoustic desired signal $d_1(n)$, which is generated from input signal x(n) and is added to the summed signals picked up at the end of the secondary paths 211 and 213 by microphone 215, eventually resulting in the creation of a bright zone there, whereas such a desired signal is missing in the case of the generation of error signal $e_2(n)$, hence resulting in the creation of a dark zone at microphone 216. In contrast to a modeling delay, whose phase delay is linear over frequency, the pre-ringing constraint is based on a non-linear phase over frequency in order to model a psychoacoustic property of the human ear known as pre-masking. An exemplary graph depicting the inverse exponential function of the group delay difference over frequency is and the corresponding inverse exponential function of the phase difference over frequency as a pre-masking threshold is shown in FIG. 4. "Pre-masking" threshold is understood herein as a constraint to avoid pre-ringing in equalizing filters.

Figure 3:
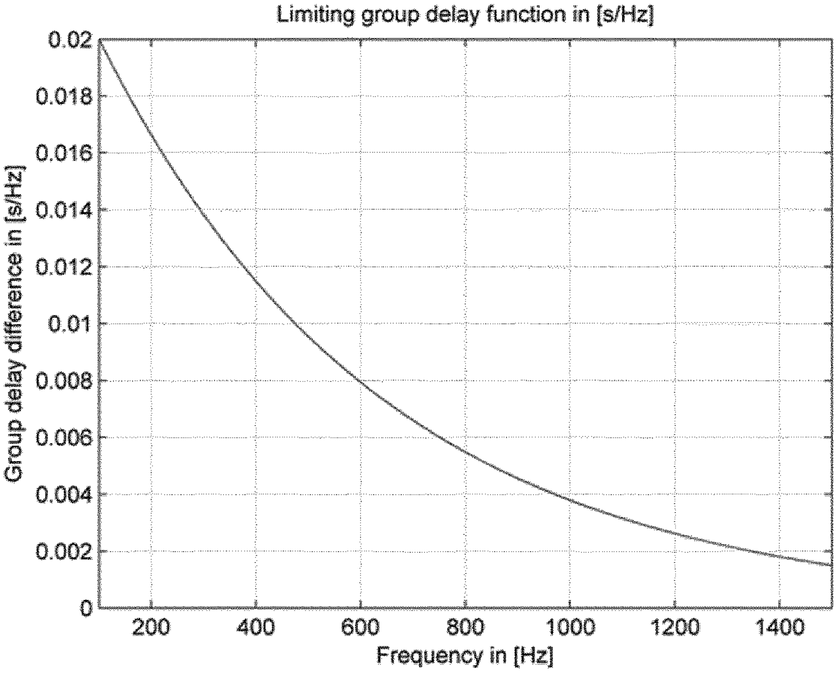
FIG. 3 is a diagram illustrating a pre-ringing constraint curve in the form of a limiting group delay function (group delay differences over frequency).
Figure 5:
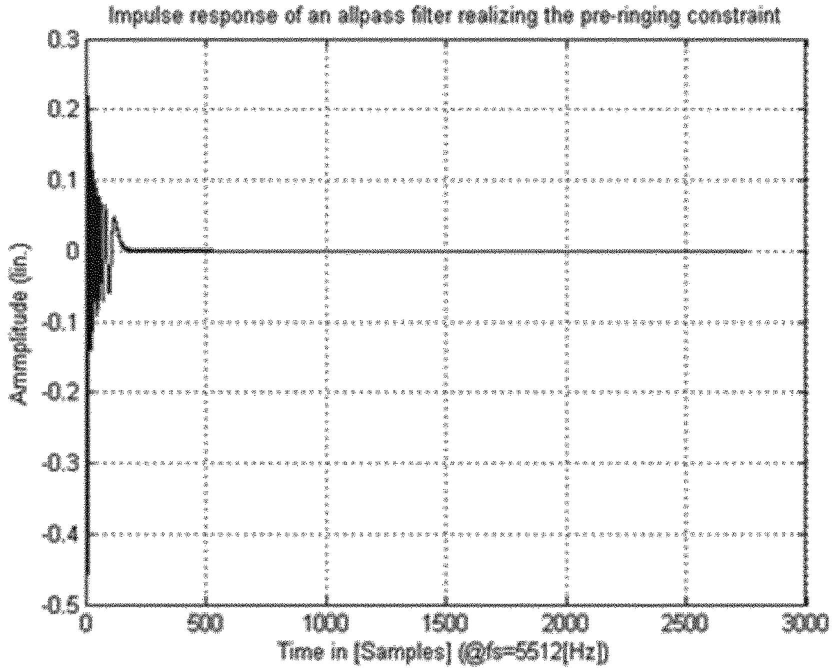
FIG. 5 is an amplitude time diagram illustrating the impulse response of an all-pass filter designed according to the curve shown in FIG. 4.
Figure 6:
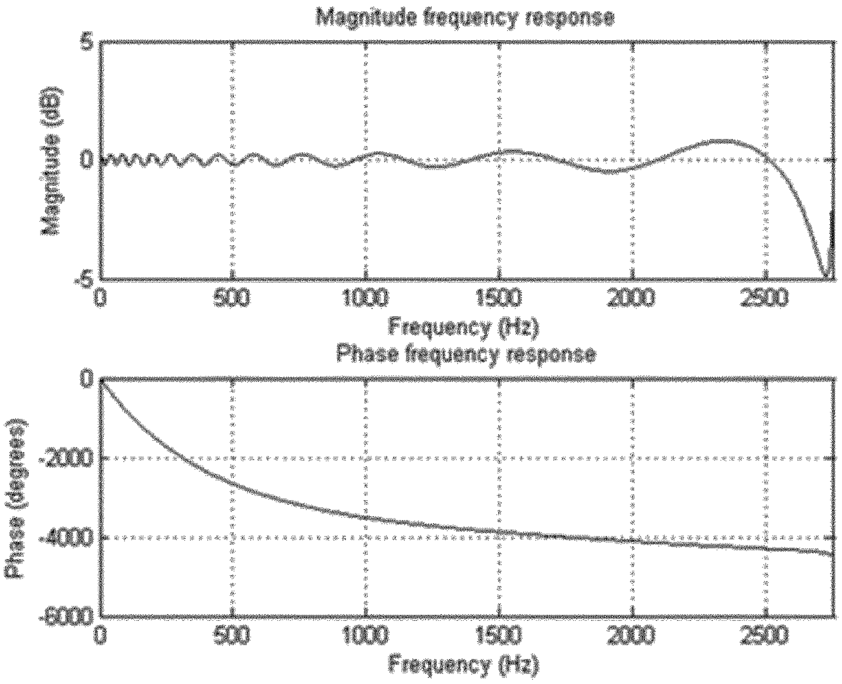
FIG. 6 is a Bode diagram illustrating the magnitude and phase behavior of the all-pass filter shown in FIG. 5.

As can be seen from FIG. 3, which shows a constraint in the form of a limiting group delay function (group delay differences over frequency), the pre-masking threshold decreases when the frequency increases. While at a frequency of approximately 100 Hz, a pre-ringing represented by a group delay difference of about 20 ms is acceptable for a listener, at a frequency of approximately 1,500 Hz, the threshold is around 1.5 ms and may reach higher frequencies with an asymptotic end-value of approximately 1 ms. The curve shown in FIG. 3 can be easily transformed into a limiting phase function, which is shown in FIG. 4 as phase difference curve over frequency. By integrating the limiting phase difference function, a corresponding phase frequency characteristic can be derived. This phase frequency characteristic may then form the basis for the design of an all-pass filter with a phase frequency characteristic that is the integral of the curve shown in FIG. 4. The impulse response of an accordingly designed all-pass filter is depicted in FIG. 5, and its corresponding Bode diagram is depicted in FIG. 6.

Figure 7:
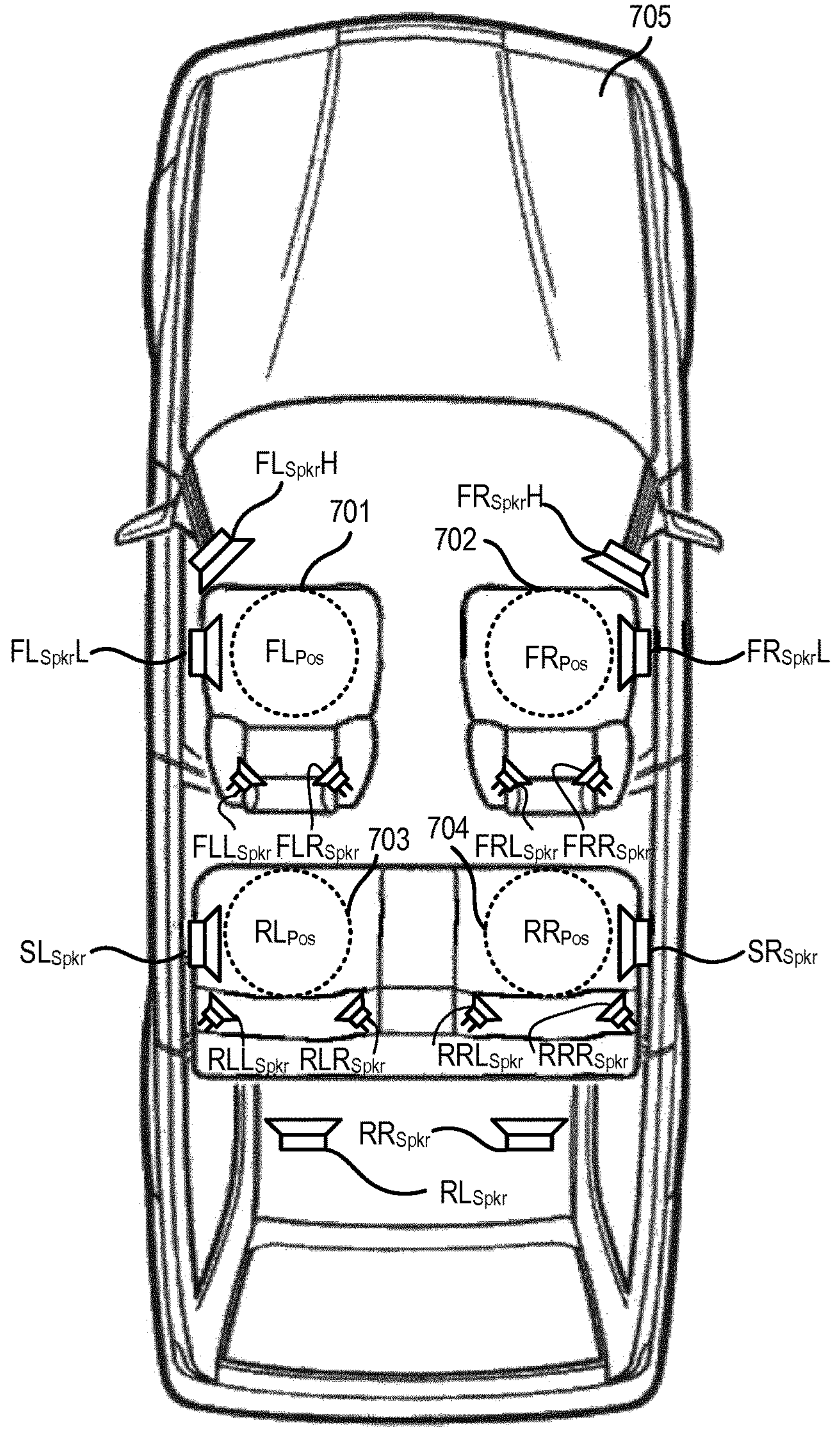
FIG. 7 is a block diagram illustrating a setup for generating individual sound zones in a vehicle.

Referring now to FIG. 7, a setup for generating individual sound zones in a vehicle 705 using the MELMS algorithm may include four sound zones 701-704 corresponding to listening positions (e.g., the seat positions in the vehicle) arranged front left $FL_{Pos}$, front right $FR_{Pos}$, rear left $RL_{Pos}$ and rear right $RR_{Pos}$. In the setup, eight system loudspeakers are arranged more distant from sound zones 701-704. For example, two loudspeakers, a tweeter/midrange loudspeaker $FL_{Spkr}H$ and a woofer $FL_{Spkr}L$, are arranged closest to front left position $FL_{Pos}$ and, correspondingly, a tweeter/midrange loudspeaker $FR_{Spkr}H$ and a woofer $FR_{Spkr}L$ are arranged closest to front right position $FR_{Pos}$. Furthermore, broadband loudspeakers $SL_{Spkr}$ and $SR_{Spkr}$ may be arranged next to sound zones corresponding to positions $RL_{Pos}$ and $RR_{Pos}$, respectively. Subwoofers $RL_{Spkr}$ and $RR_{Spkr}$ may be disposed on the rear shelf of the vehicle interior, which, due to the nature of the low-frequency sound generated by subwoofers $RL_{Spkr}$ and $RR_{Spkr}$, impact all four listening positions front left $FL_{Pos}$, front right $FR_{Pos}$, rear left $RL_{Pos}$ and rear right $RR_{Pos}$. Additionally, vehicle 705 may be equipped with yet other loudspeakers, arranged close to sound zones 701-704, e.g., in the headrests of the vehicle. The additional loudspeakers are loudspeakers $FLL_{Spkr}$ and $FLR_{Spkr}$ for zone 701; loudspeakers $FRL_{Spkr}$ and $FRR_{Spkr}$ for zone 702; loudspeakers $RLL_{Spkr}$ and $RLR_{Spkr}$ for zone 703; and loudspeakers $RRL_{Spkr}$ and $RRR_{Spkr}$ for zone 704. All loudspeakers in the setup shown in FIG. 7 form respective groups (groups with one loudspeaker) except loudspeaker $SL_{Spkr}$, which forms a group of passively coupled bass and tweeter speakers, and loudspeaker $SR_{Spkr}$, which forms a group of passively coupled bass and tweeter speakers (groups with two loudspeakers). Alternatively or additionally, woofer $FL_{Spkr}L$ may form a group together with tweeter/midrange loudspeaker $FL_{Spkr}H$ and woofer $FR_{Spkr}L$ may form a group together with tweeter/midrange loudspeaker $FR_{Spkr}H$ (groups with two loudspeakers).

Figure 8:
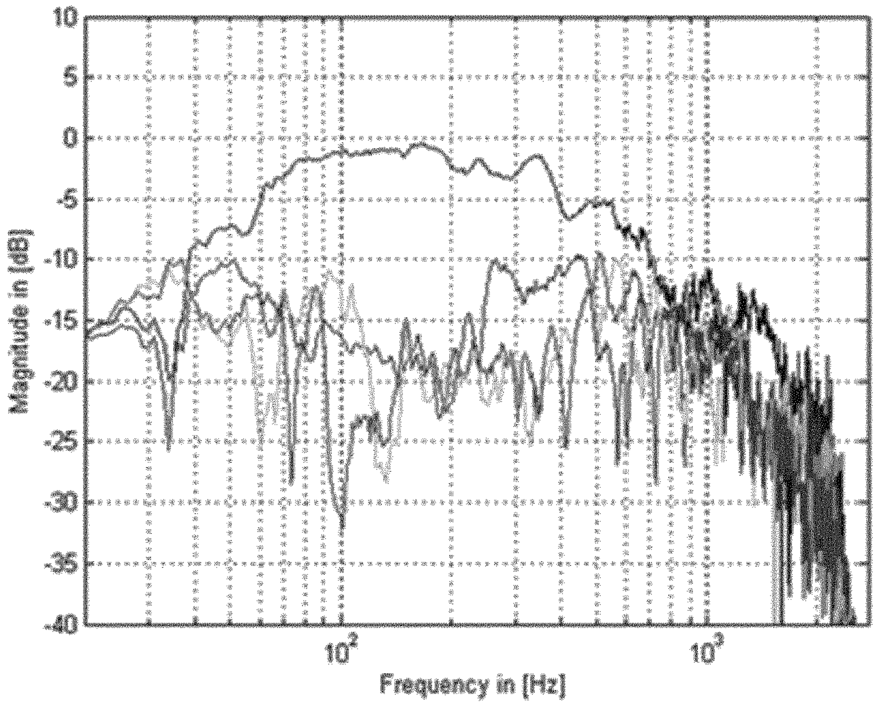
FIG. 8 is a magnitude frequency diagram illustrating the magnitude frequency responses at each of the four zones (positions) in the setup shown in FIG. 7 using a MIMO system solely based on more distant loudspeakers.
Figure 9:
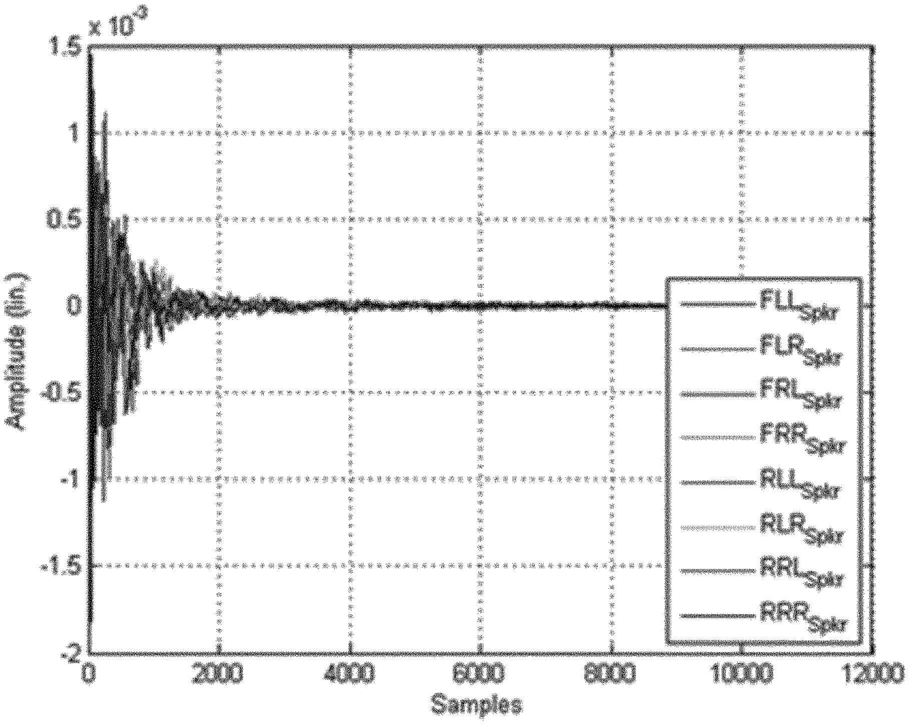
FIG. 9 is an amplitude time diagram (time in samples) illustrating the corresponding impulse responses of the equalizer filters of the MIMO system that forms the basis of the diagram shown in FIG. 8.

FIG. 8 is a diagram illustrating the magnitude frequency responses at each of the four zones 701-704 (positions) in the setup shown in FIG. 7 using equalizer filters, a psychoacoustically motivated pre-ringing constraint module and the system loudspeakers, i.e., $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$. FIG. 9 is an amplitude time diagram (time in samples) illustrating the corresponding impulse responses of the equalizer filters for generating a desired crosstalk cancellation in the respective loudspeaker paths. In contrast to the simple use of a modeling delay, the use of a psychoacoustically motivated pre-ringing constraint provides sufficient attenuation of the pre-ringing. In acoustics, pre-ringing designates the appearance of noise before the actual sound impulse occurs. As can be seen from FIG. 9, the filter coefficients of the equalizing filters, and thus the impulse responses of the equalizing filters, exhibit only little pre-ringing. It can additionally be seen from FIG. 8 that the resulting magnitude frequency responses at all desired sound zones tend to deteriorate at higher frequencies, e.g., above 400 Hz.

Figure 10:
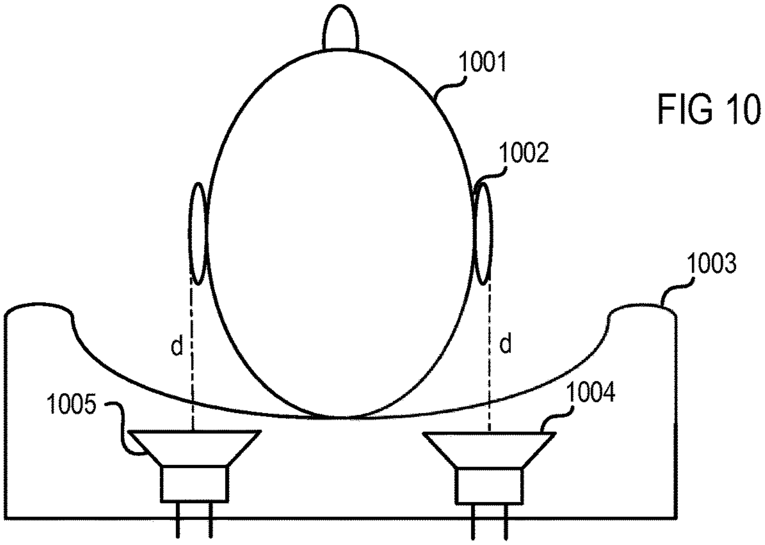
FIG. 10 is a schematic diagram of a headrest with integrated close-distance loudspeakers applicable in the setup shown in FIG. 7.
Figure 11:
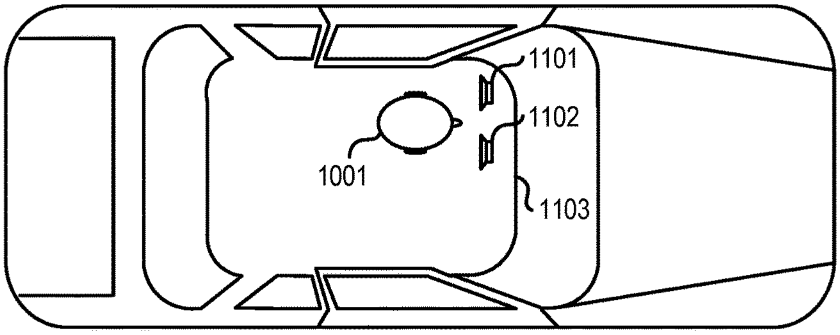
FIG. 11 is a schematic diagram of an alternative arrangement of close-distance loudspeakers in the setup shown in FIG. 7.
Figure 12:
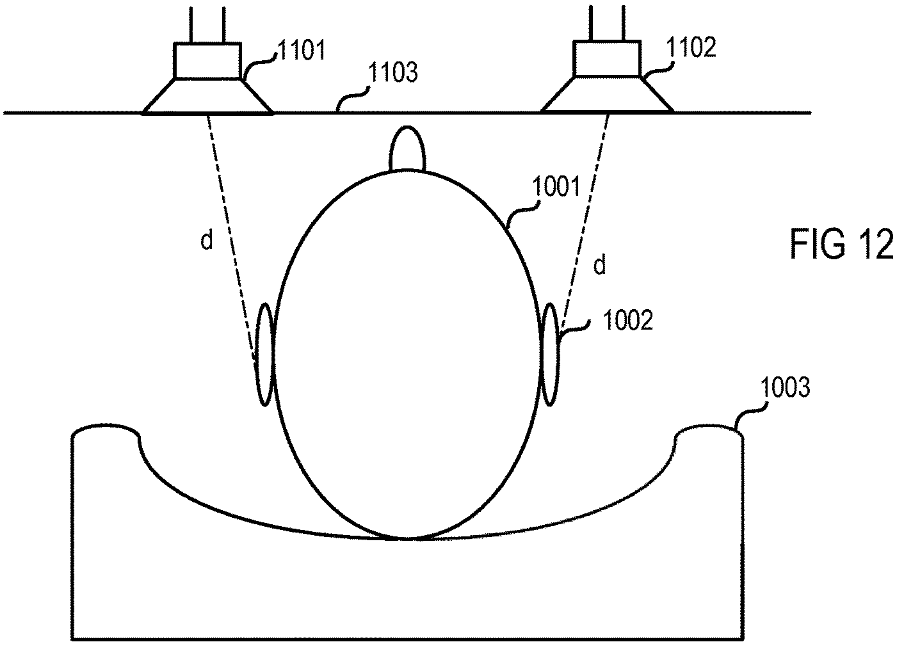
FIG. 12 is a schematic diagram illustrating the alternative arrangement shown in FIG. 11 in more detail.

As shown in FIG. 10, loudspeakers 1004 and 1005 may be arranged in a close distance d to listener's ears 1002, e.g., below 0.5 m, or even 0.4 or 0.3 m, in order to generate the desired individual sound zones. One exemplary way to arrange loudspeakers 1004 and 1005 so close is to integrate loudspeakers 1004 and 1005 into headrest 1003 on which listener's head 1001 may rest. Another exemplary way is to dispose (directive) loudspeakers 1101 and 1102 in ceiling 1103, as shown in FIGS. 11 and 12. Other positions for the loudspeakers may be the B-pillar or C-pillar of the vehicle in combination with loudspeakers in the headrest or the ceiling. Alternatively or additionally, directional loudspeakers may be used instead of loudspeakers 1004 and 1005 or combined with loudspeakers 1004 and 1005 at the same position as or another position than loudspeakers 1004 and 1005.

Figure 13:
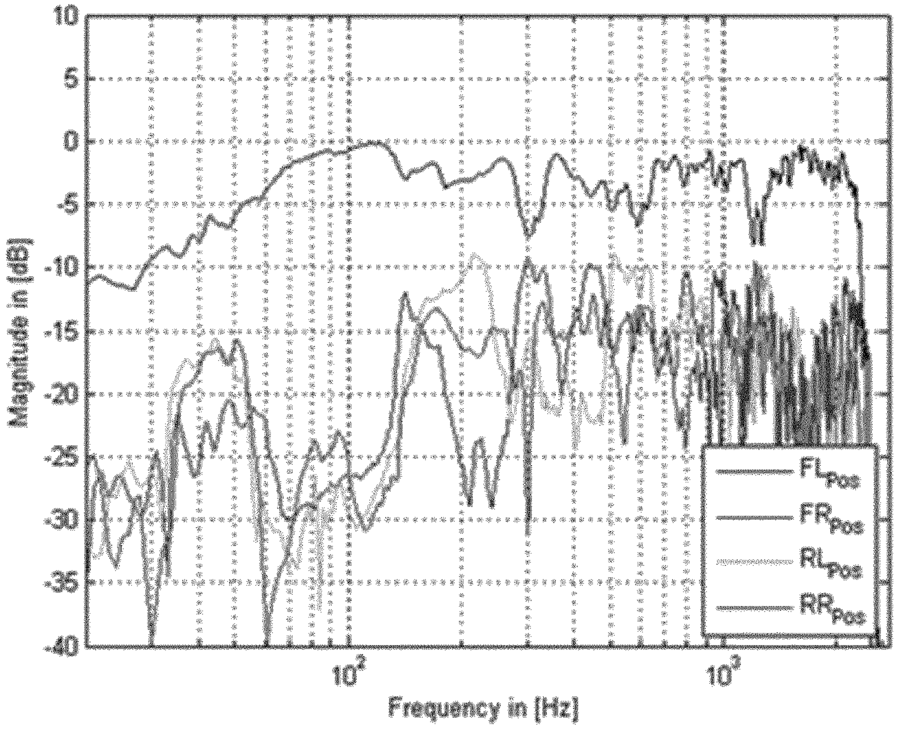
FIG. 13 is a magnitude frequency diagram illustrating the frequency characteristics at the four positions in the setup shown in FIG. 7 when a modeling delay of half the filter length and only close-distance loudspeakers are used.
Figure 14:
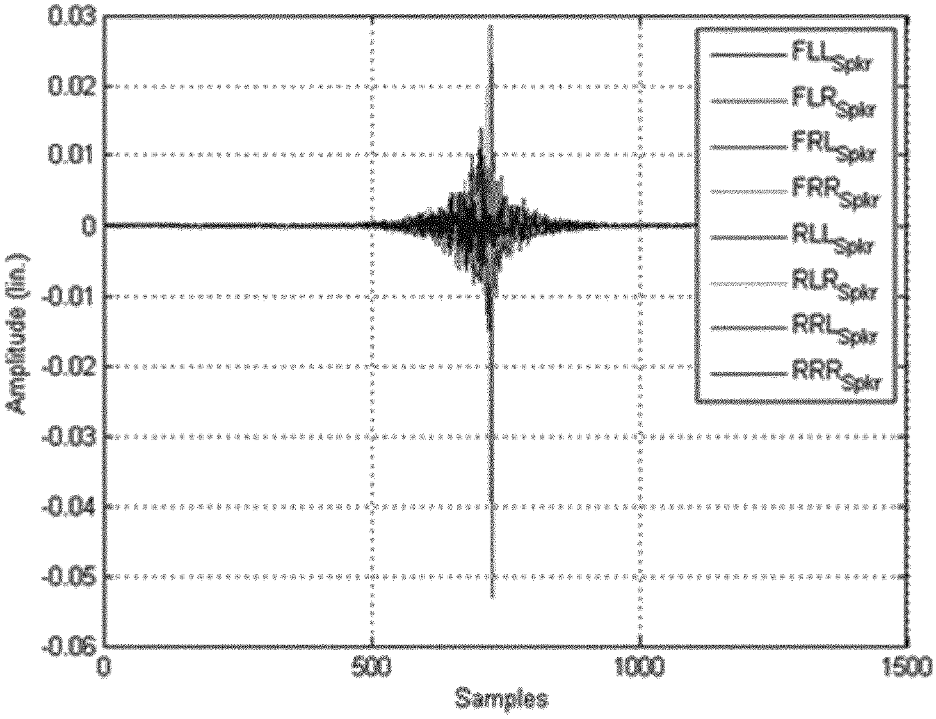
FIG. 14 is an amplitude time diagram illustrating the impulse responses corresponding to the equalization filter of the MIMO system, which results in the frequency characteristics at the four desired positions shown in FIG. 13.
Figure 15:
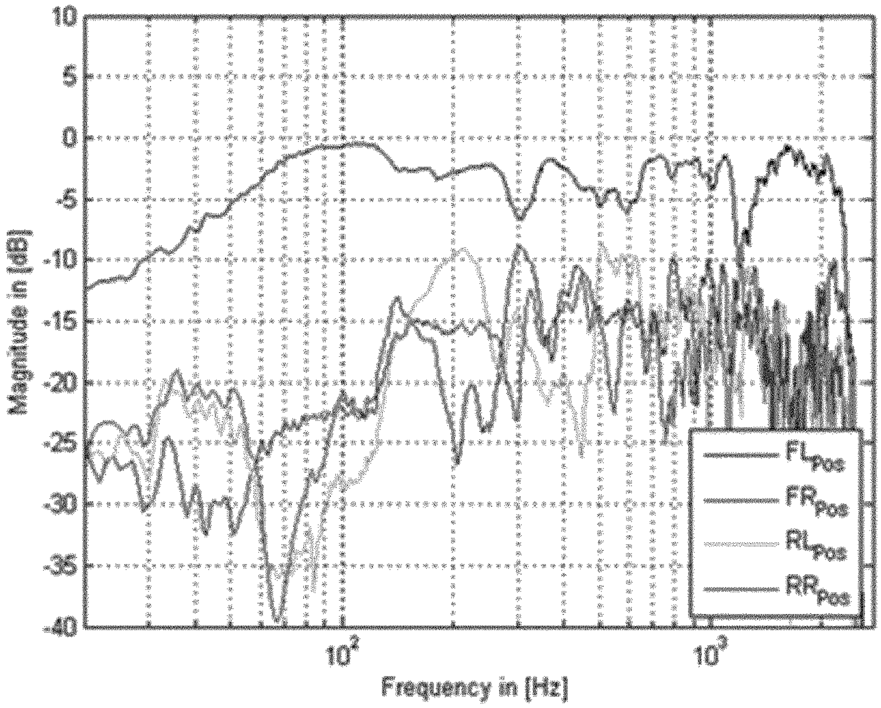
FIG. 15 is a magnitude frequency diagram illustrating the frequency characteristics at the four positions in the setup shown in FIG. 7 when a length-reduced modeling delay and only close-distance loudspeakers are used.
Figure 16:
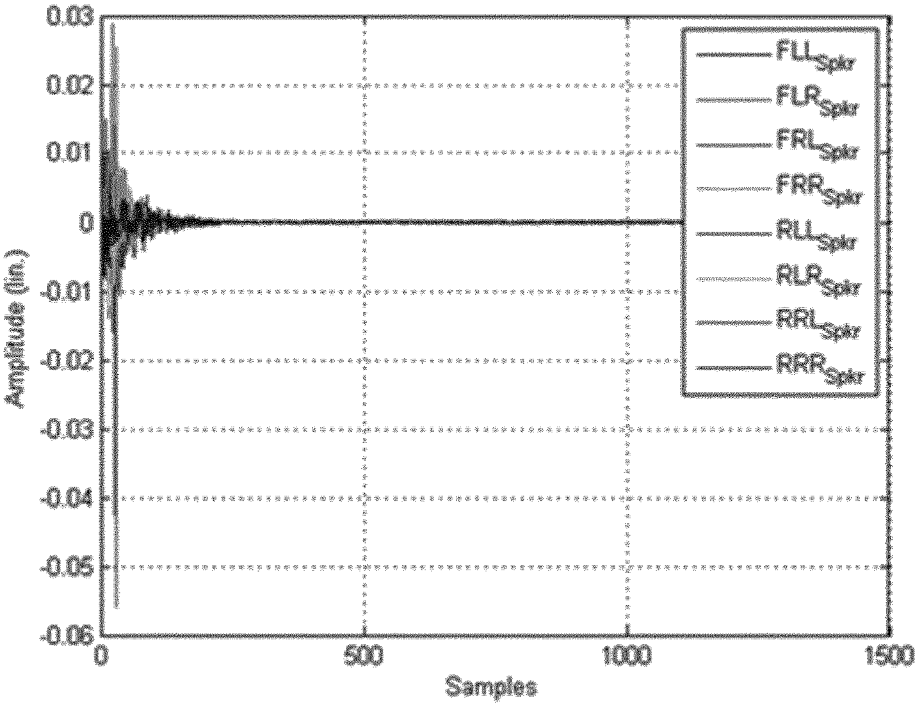
FIG. 16 is an amplitude time diagram illustrating the impulse responses corresponding to the equalization filter of the MIMO system, which results in the frequency characteristics at the four desired positions shown in FIG. 15.

Referring again to the setup shown in FIG. 7, additional loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$ may be disposed in the headrests of the seats in positions $FL_{Pos}$, $FR_{Pos}$, $RL_{Pos}$ and $RR_{Pos}$. As can be seen from FIG. 13, only loudspeakers that are arranged in close distance to a listener's ears, such as additional loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$, exhibit an improved magnitude frequency behavior at higher frequencies. The crosstalk cancellation is the difference between the upper curve and the three lower curves in FIG. 13. However, due to the short distance between the loudspeaker and the ears such as a distance less than 0.5 m, or even less than 0.3 or 0.2 m, pre-ringing is relatively low, as shown in FIG. 14, which illustrates the filter coefficients and thus the impulse responses of all equalizing filters, for providing crosstalk cancellation when using only headrest loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$, and, instead of the pre-ringing constraint, a modeling delay whose delay time may correspond to half of the filter length. Pre-ringing can be seen in FIG. 14 as noise on the left side of the main impulse. Arranging loudspeakers in close distance to a listener's ears may in some applications already provide sufficient pre-ringing suppression and sufficient crosstalk cancellation if the modeling delay is sufficiently shortened in psychoacoustic terms, as can be seen in FIGS. 15 and 16.

Figure 17:
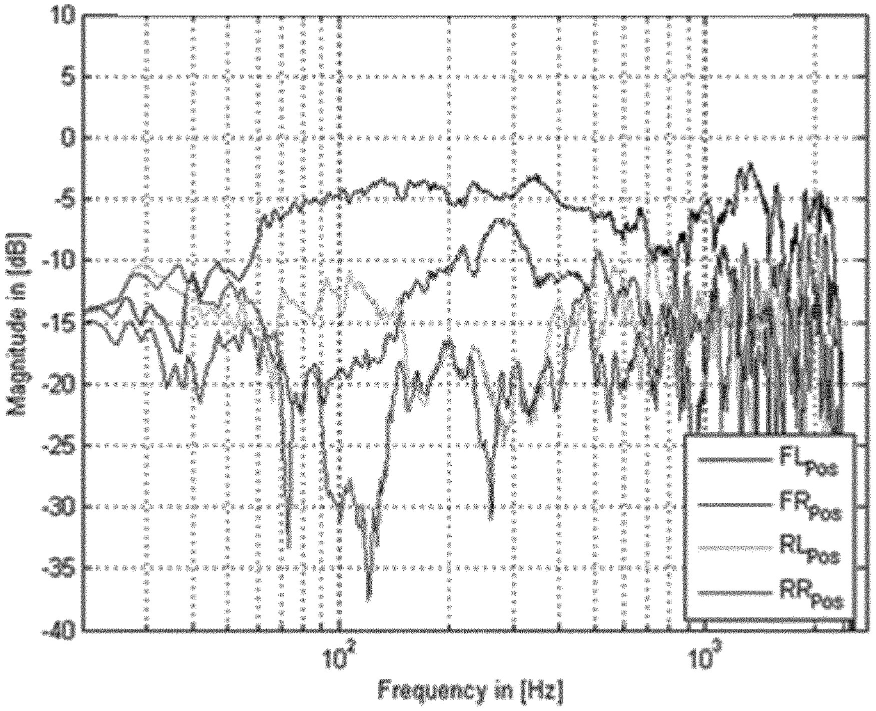
FIG. 17 is a magnitude frequency diagram illustrating the frequency characteristics at the four positions in the setup shown in FIG. 7 when a length-reduced modeling delay and only system, i.e., far-distance, loudspeakers are used.
Figure 18:
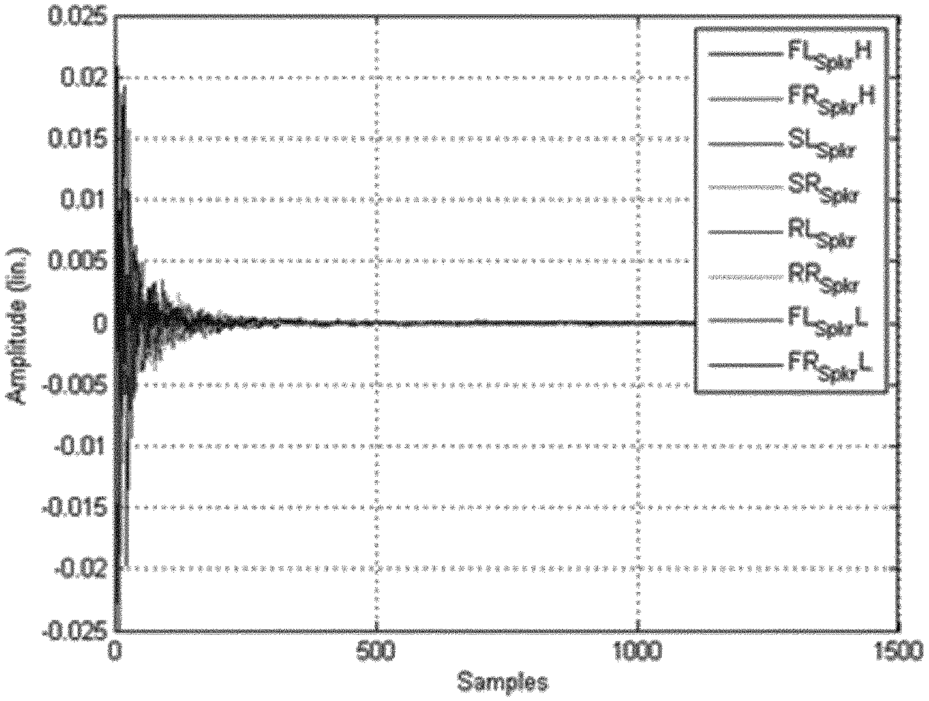
FIG. 18 is an amplitude time diagram illustrating the impulse responses corresponding to the equalization filter of the MIMO system, which results in the frequency characteristics at the four desired positions shown in FIG. 17.

When combining less distant loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$ with a pre-ringing constraint instead of a modeling delay, the pre-ringing can be further decreased without deteriorating the crosstalk cancellation at positions $FL_{Pos}$, $FR_{Pos}$, $RL_{Pos}$ and $RR_{Pos}$ (i.e., the inter-position magnitude difference) at higher frequencies. Using more distant loudspeakers $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ instead of less distant loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$ and a shortened modeling delay (the same delay as in the example described above in connection with FIGS. 15 and 16) instead of a pre-ringing constraint exhibits worse crosstalk cancellation, as can be seen in FIGS. 17 and 18. FIG. 17 is a diagram illustrating the magnitude frequency responses at all four sound zones 701-704 using only loudspeakers $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ disposed at a distance of more than 0.5 m from positions $FL_{Pos}$, $FR_{Pos}$, $RL_{Pos}$ and $RR_{Pos}$ in combination with equalizing filters and the same modeling delay as in the example described in connection with FIGS. 15 and 16.

Figure 19:
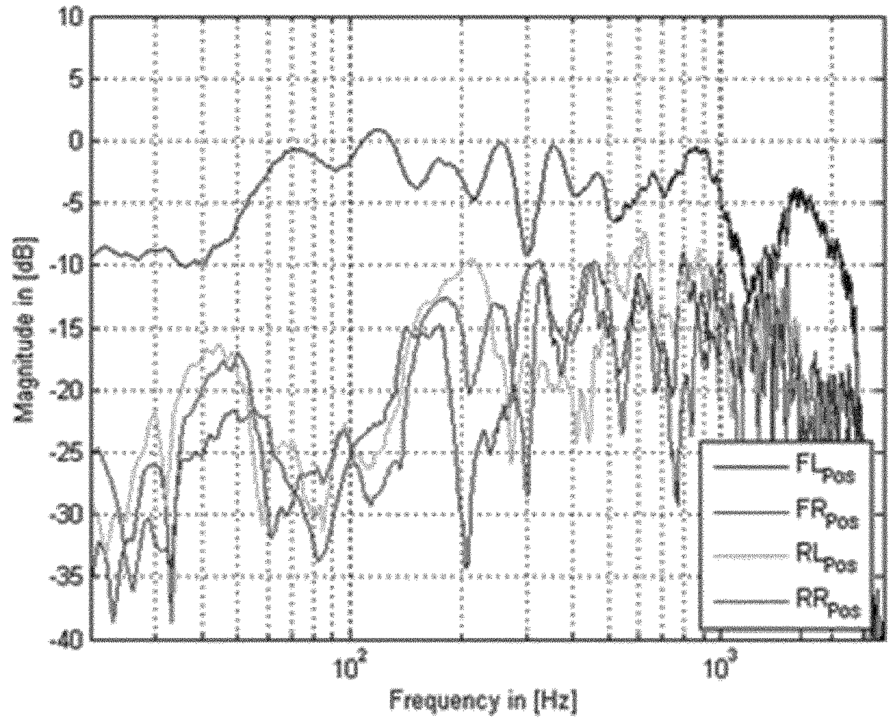
FIG. 19 is a magnitude frequency diagram illustrating the frequency characteristics at the four positions in the setup shown in FIG. 7 when an all-pass filter implementing the pre-ringing constraint instead of a modeling delay and only close-distance loudspeakers are used.
Figure 20:
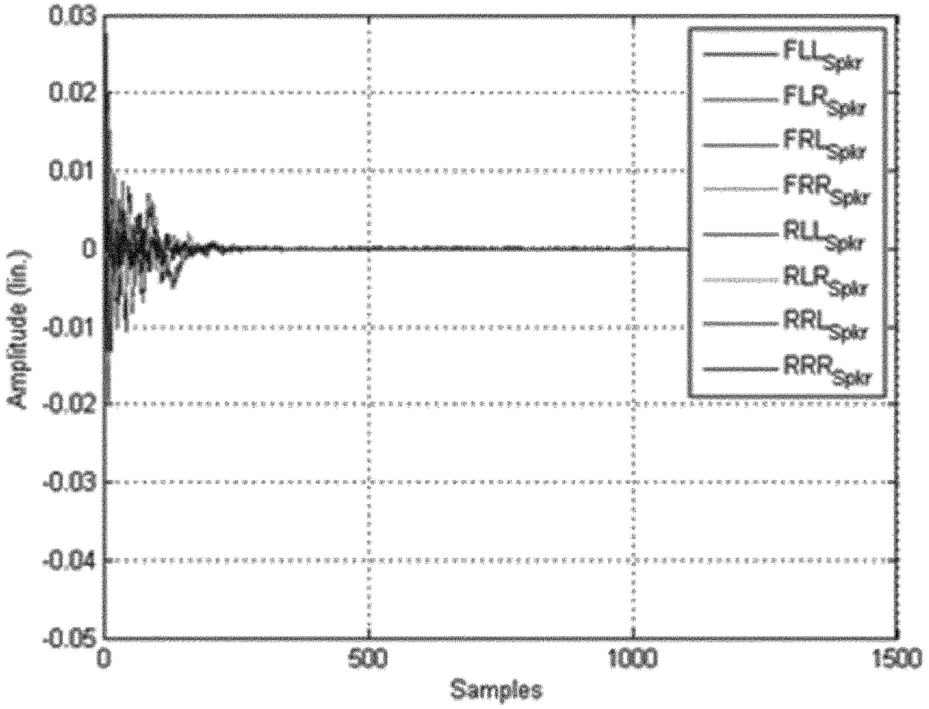
FIG. 20 is an amplitude time diagram illustrating the impulse responses corresponding to the equalization filter of the MIMO system, which results to the frequency characteristics at the four desired positions shown in FIG. 19.

However, combining loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$, which are arranged in the headrests with the more distant loudspeakers of the setup shown in FIG. 7, i.e., loudspeakers $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$, and, as shown in FIGS. 19 and 20, using a pre-ringing constraint instead of a modeling delay with reduced length can further decrease (compare FIGS. 18 and 20) the pre-ringing and increase (compare FIGS. 17 and 19) the crosstalk cancellation at positions $FL_{Pos}$, $FR_{Pos}$, $RL_{Pos}$ and $RR_{Pos}$.

Alternative to a continuous curve, as shown in FIGS. 3-5, a stepped curve may also be employed in which, for example, the step width may be chosen to be frequency-dependent according to psychoacoustic aspects such as the Bark scale or the mel scale. The Bark scale is a psychoacoustic scale that ranges from one to 24 and corresponds to the first 24 critical bands of hearing. It is related to but somewhat less popular than the mel scale. It is perceived as noise by a listener when spectral drops or narrow-band peaks, known as temporal diffusion, occur within the magnitude frequency characteristic of a transfer function. Equalizing filters may therefore be smoothed during control operations or certain parameters of the filters such as the quality factor may be restricted in order to reduce unwanted noise. In case of smoothing, nonlinear smoothing that approximates the critical bands of human hearing may be employed. A nonlinear smoothing filter may be described by the following equation:

$$\overline{A} = \frac{1}{\min\left\{N-1, \left\lceil n\alpha - \frac{1}{2}\right\rceil\right\} - \max\left\{0, \left\lceil \frac{n}{\alpha} - \frac{1}{2}\right\rceil\right\}} \cdot \sum_{k=\max\left\{0,\left\lceil \frac{n}{\alpha}-\frac{1}{2}\right\rceil\right\}}^{\min\left\{N-1,\left\lceil n\alpha-\frac{1}{2}\right\rceil\right\}} |A(j\omega_k)|,$$

wherein n=[0, . . . , N−1] relates to the discrete frequency index of the smoothed signal; N relates to the length of the fast Fourier transformation (FFT); $\lceil x-\frac{1}{2} \rceil$ relates to rounding up to the next integer; α relates to a smoothing coefficient, e.g., (octave/3-smoothing) results in $\alpha=2^{1/3}$, in which $\overline{A}(j\omega)$ is the smoothed value of A(jω); and k is a discrete frequency index of the non-smoothed value A(jω), k∈[0, . . . , N−1].

As can be seen from the above equation, nonlinear smoothing is basically frequency-dependent arithmetic averaging whose spectral limits change dependent on the chosen nonlinear smoothing coefficient α over frequency. To apply this principle to a MELMS algorithm, the algorithm is modified so that a certain maximum and minimum level threshold over frequency is maintained per bin (spectral unit of an FFT), respectively, according to the following equation in the logarithmic domain:

$$\text{Max}Gain\text{Lim}_{dB}(f) = \frac{\text{Max}Gain_{dB}}{\max\{1, (f(\alpha-1))\}},$$

$$\text{Min}Gain\text{Lim}_{dB}(f) = \frac{\text{Min}Gain_{dB}}{\max\{1, (f(\alpha-1))\}},$$

wherein f=[0, . . . , fs/2] is the discrete frequency vector of length (N/2+1), N is the length of the FFT, $f_s$ is the sampling frequency, $\text{MaxGain}_{dB}$ is the maximum valid increase in [dB] and $\text{MinGain}_{dB}$ is the minimum valid decrease in [dB].

In the linear domain, the above equation reads as:

$$\text{Max}Gain\text{Lim}(f) = 10^{\frac{MaxGainLim_{dB}(f)}{20}},$$

$$\text{Min}Gain\text{Lim}(f) = 10^{\frac{MinGainLim_{dB}(f)}{20}}.$$

Figure 21:
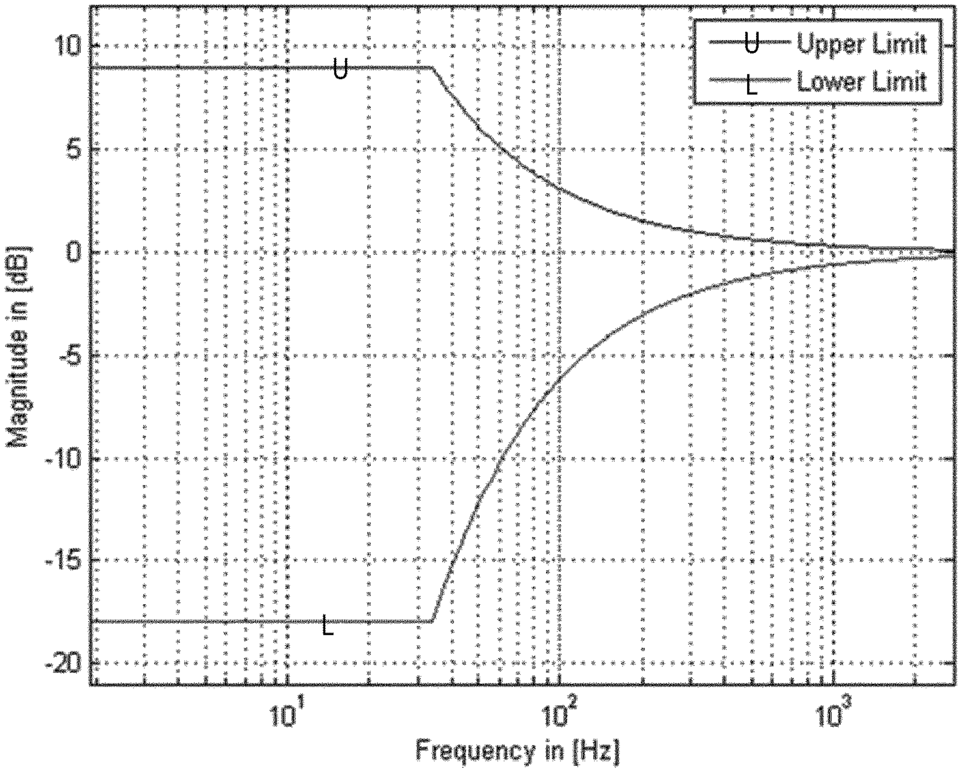
FIG. 21 is an amplitude frequency diagram illustrating the upper and lower thresholds of an exemplary magnitude constraint in the logarithmic domain.

From the above equations, a magnitude constraint can be derived that is applicable to the MELMS algorithm in order to generate nonlinear smoothed equalizing filters that suppress spectral peaks and drops in a psychoacoustically acceptable manner. An exemplary magnitude frequency constraint of an equalizing filter is shown in FIG. 21, wherein upper limit U corresponds to the maximum valid increase $\text{MaxGainLim}_{dB}(f)$ and lower limit L corresponds to the minimum allowable decrease $\text{MinGainLim}_{dB}(f)$. The diagrams shown in FIG. 21 depict upper threshold U and lower threshold L of an exemplary magnitude constraint in the logarithmic domain, which is based on the parameters $f_s$=5,512 Hz, $\alpha=2^{1/24}$, $\text{MaxGain}_{dB}$=9 dB and $\text{MinGain}_{ds}$=−18 dB. As can be seen, the maximum allowable increase (e.g., $\text{MaxGain}_{dB}$=9 dB) and the minimum allowable decrease (e.g., $\text{MinGain}_{dB}$=−18 dB) is achieved only at lower frequencies (e.g., below 35 Hz). This means that lower frequencies have the maximum dynamics that decrease with increasing frequencies according to the nonlinear smoothing coefficient (e.g., $\alpha=2^{1/24}$) whereby according to the frequency sensitivity of the human ear, the increase of upper threshold U and the decrease of lower threshold L are exponential over frequency.

In each iteration step, the equalizing filters based on the MELMS algorithm are subject to nonlinear smoothing, as described by the equations below.

Smoothing:

$$A_{SS}(j\omega_0) = |A(j\omega_0)|,$$

$$\overline{A}_{SS}(j\omega_n) = \begin{cases} |A(j\omega_{n-1})|\text{Max}Gain\text{Lim}(n), & \text{if } |A(j\omega_n)| > |\overline{A}_{SS}(j\omega_{n-1})|\text{Max}Gain\text{Lim}(n), \\ |A(j\omega_{n-1})|\text{Min}Gain\text{Lim}(n), & \text{if } |A(j\omega_n)| < |\overline{A}_{SS}(j\omega_{n-1})|\text{Min}Gain\text{Lim}(n), \\ |A(j\omega_n)|, & \text{otherwise,} \end{cases}$$

$$n \in \left[1, \ldots, \frac{N}{2}\right],$$

Double Sideband Spectrum:

$$\overline{A}_{DS}(j\omega_n) = \begin{cases} \overline{A}_{SS}(j\omega_n) & n = \left[0, \ldots, \frac{N}{2}\right], \\ \overline{A}_{SS}(j\omega_{N-n})^*, & n = \left[\left(\frac{N}{2}+1\right), \ldots, N-1\right], \end{cases}$$

with $\overline{A}_{SS}(j\omega_{N-n})^*$=complex conjugate of $\overline{A}_{SS}(j\omega_{N-n})$.

Complex Spectrum:

$$A_{NF}(j\omega) = \overline{A}_{DS}(j\omega)e^{j\angle\{A(j\omega)\}},$$

Impulse Response of the Inverse Fast Fourier Transformation (IFFT):

$$a_{NF}(n) = \Re\{\text{IFFT}\{A_{NF}(j\omega)\}\}.$$

Figure 22:
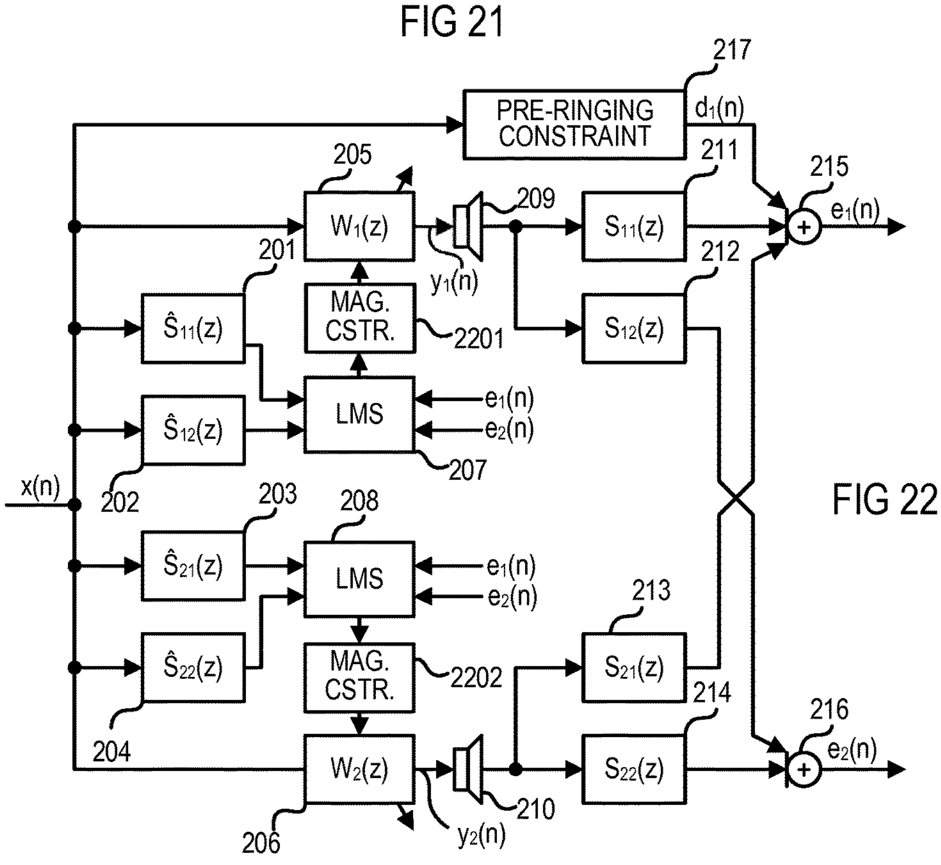
FIG. 22 is a flow chart of a MELMS system or method with a magnitude constraint that is based on the system and method described above in connection with FIG. 2.

A flow chart of an accordingly modified MELMS algorithm is shown in FIG. 22, which is based on the system and method described above in connection with FIG. 2. Magnitude constraint module 2201 is arranged between LMS module 207 and equalizing filter module 205. Another magnitude constraint module 2202 is arranged between LMS module 208 and equalizing filter module 206. The magnitude constraint may be used in connection with the pre-ringing constraint (as shown in FIG. 22), but may be also used in standalone applications, in connection with other psychoacoustically motivated constraints or in connection with a modeling delay.

Figure 23:
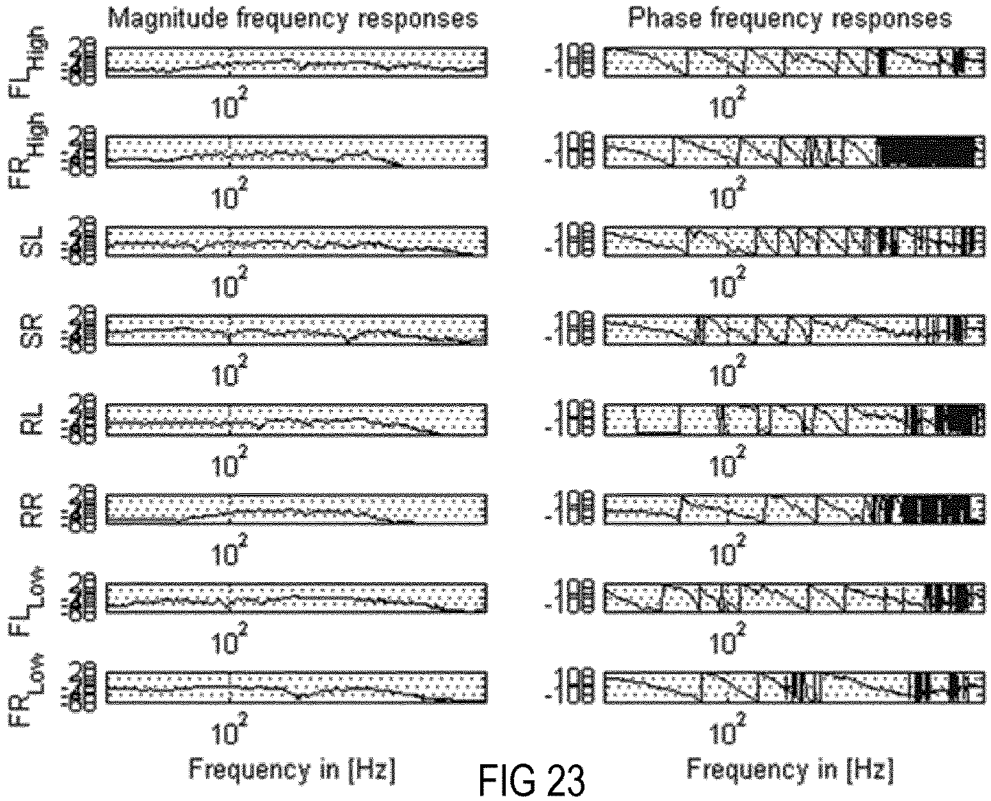
FIG. 23 is a Bode diagram (magnitude frequency responses, phase frequency responses) of the system or method using a magnitude constraint, as shown in FIG. 22.
Figure 24:
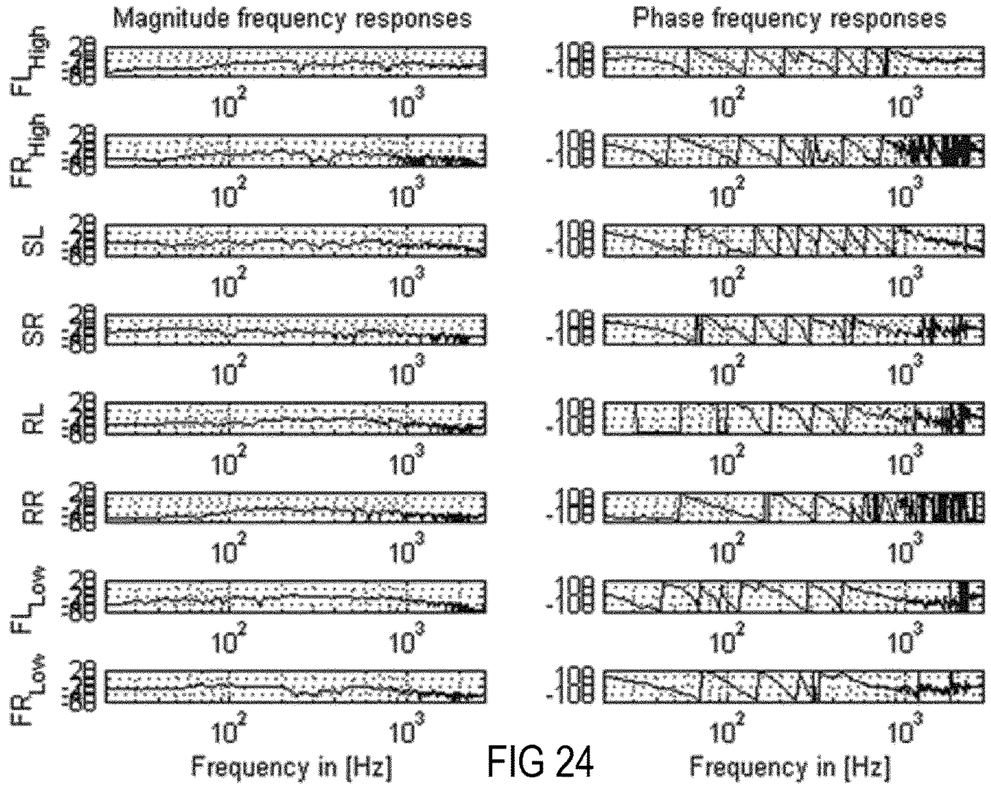
FIG. 24 is a Bode diagram (magnitude frequency responses, phase frequency responses) of a system or method using no magnitude constraint.
Figure 25:
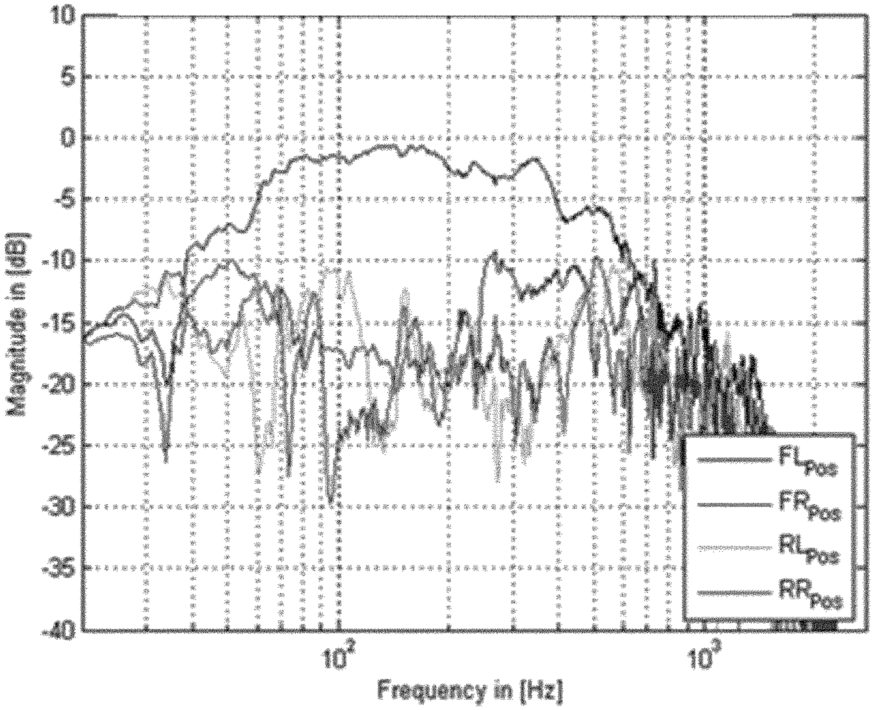
FIG. 25 is a magnitude frequency diagram illustrating the frequency characteristics at the four positions in the setup shown in FIG. 7 when only the eight more distant loudspeakers in combination with a magnitude and pre-ringing constraint are used.
Figure 26:
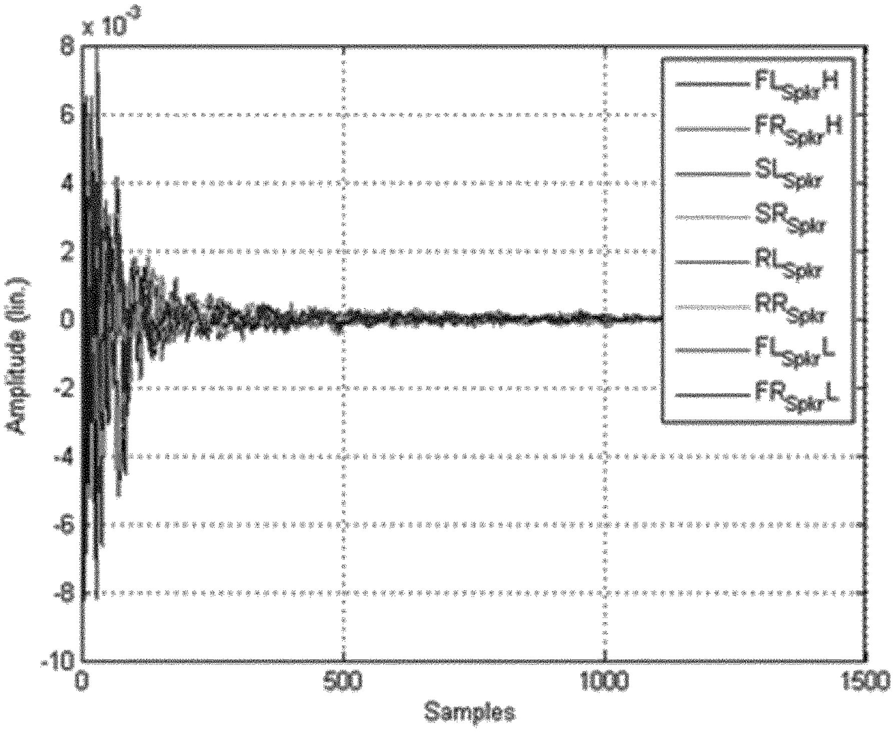
FIG. 26 is an amplitude time diagram illustrating the impulse responses corresponding to the equalization filter of the MIMO system, which results in the frequency characteristics at the four desired positions shown in FIG. 25.

However, when combining the magnitude constraint with the pre-ringing constraint, the improvements illustrated by way of the Bode diagrams (magnitude frequency responses, phase frequency responses) shown in FIG. 23 may be achieved in contrast to systems and methods without magnitude constraints, as illustrated by the corresponding resulting Bode diagrams shown in FIG. 24. It is clear that only the magnitude frequency responses of systems and methods with magnitude constraints are subject to nonlinear smoothing, while the phase frequency responses are not essentially altered. Furthermore, systems and methods with magnitude constraints and pre-ringing constraints exert no negative influence on the crosstalk cancellation performance, as can be seen from FIG. 25 (compared to FIG. 8), but post-ringing may deteriorate, as shown in FIG. 26, compared to FIG. 9. In acoustics, post-ringing designates the appearance of noise after the actual sound impulse has occurred and can be seen in FIG. 26 as noise on the right side of the main impulse.

Figure 27:
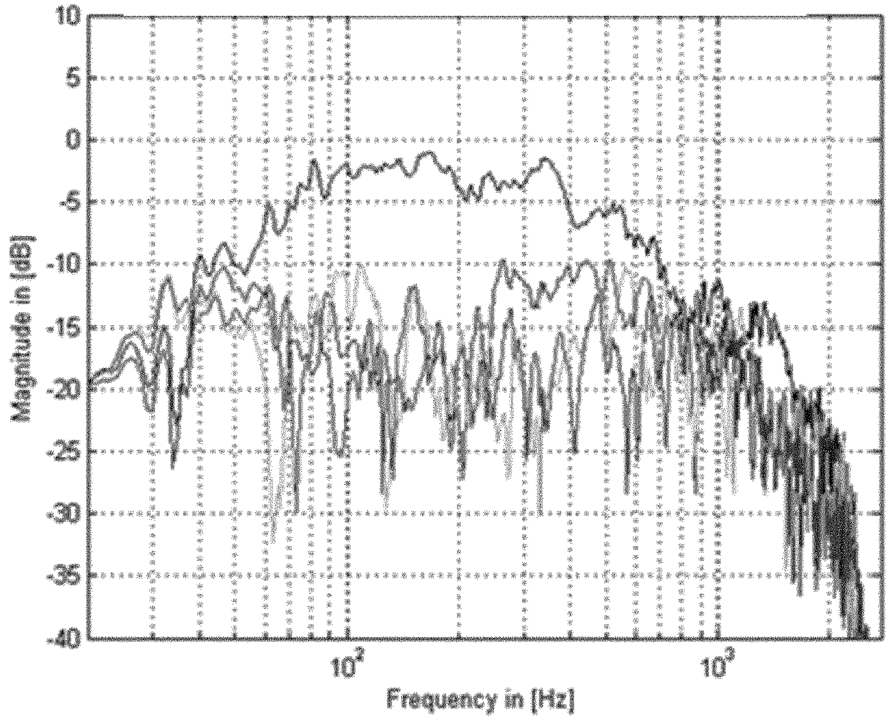
FIG. 27 is a magnitude frequency diagram illustrating the frequency characteristics at the four positions in the setup shown in FIG. 7 when only more distant loudspeakers in combination with a pre-ringing constraint and a magnitude constraint based on windowing with a Gauss window are used.
Figure 28:
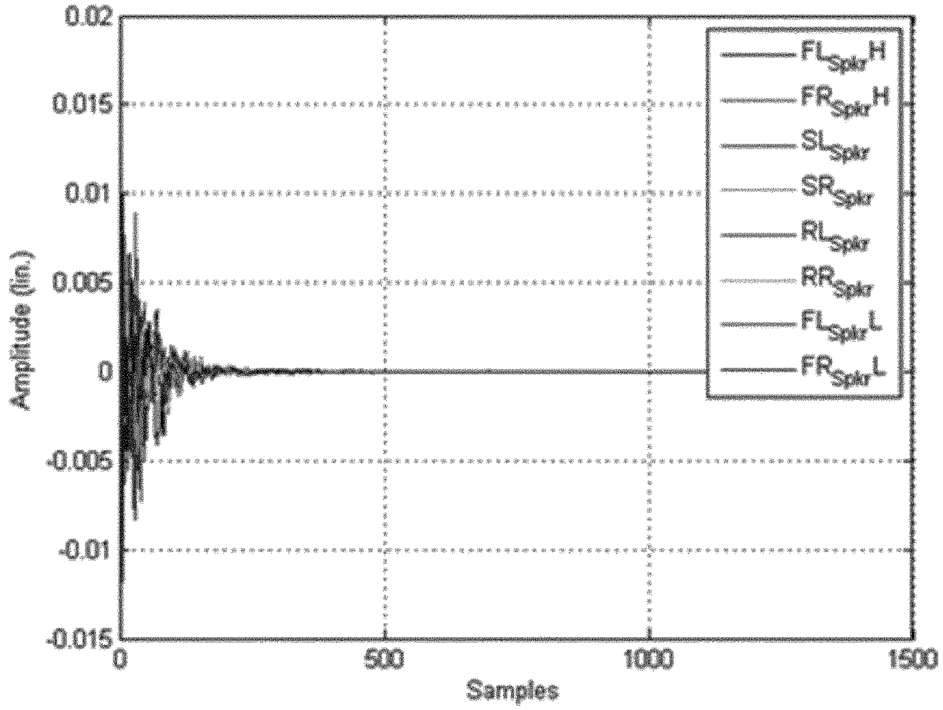
FIG. 28 is an amplitude time diagram illustrating the impulse responses corresponding to the equalization filter of the MIMO system, which results in the frequency characteristics at the four desired positions shown in FIG. 27.

An alternative way to smooth the spectral characteristic of the equalizing filters may be to window the equalizing filter coefficients directly in the time domain. With windowing, smoothing cannot be controlled according to psychoacoustic standards to the same extent as in the system and methods described above, but windowing of the equalizing filter coefficients allows for controlling the filter behavior in the time domain to a greater extent. FIG. 27 is a diagram illustrating the magnitude frequency responses at sound zones 701-704 when using equalizing filters and only the more distant loudspeakers, i.e., loudspeakers $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$, in combination with a pre-ringing constraint and a magnitude constraint based on windowing with a Gauss window of 0.75. The corresponding impulse responses of all equalizing filters are depicted in FIG. 28.

Figure 29:
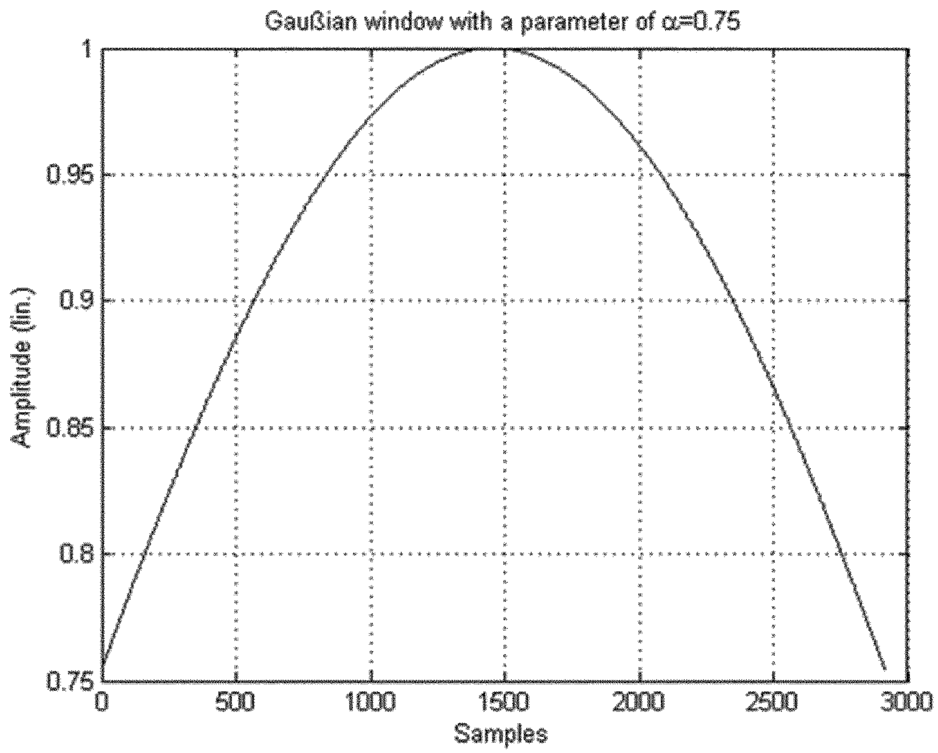
FIG. 29 is an amplitude time diagram illustrating an exemplary Gauss window.

If windowing is based on a parameterizable Gauss window, the following equation applies:

$$w(n) = e^{-\frac{1}{2}\left(\alpha\frac{2n}{N}\right)^2},$$

wherein $$-\frac{N}{2} \leq n \leq \frac{N}{2}$$

and α is a parameter that is indirect proportional to the standard deviation σ and that is, for example, 0.75. Parameter α may be seen as a smoothing parameter that has a Gaussian shape (amplitude over time in samples), as shown in FIG. 29.

Figure 30:
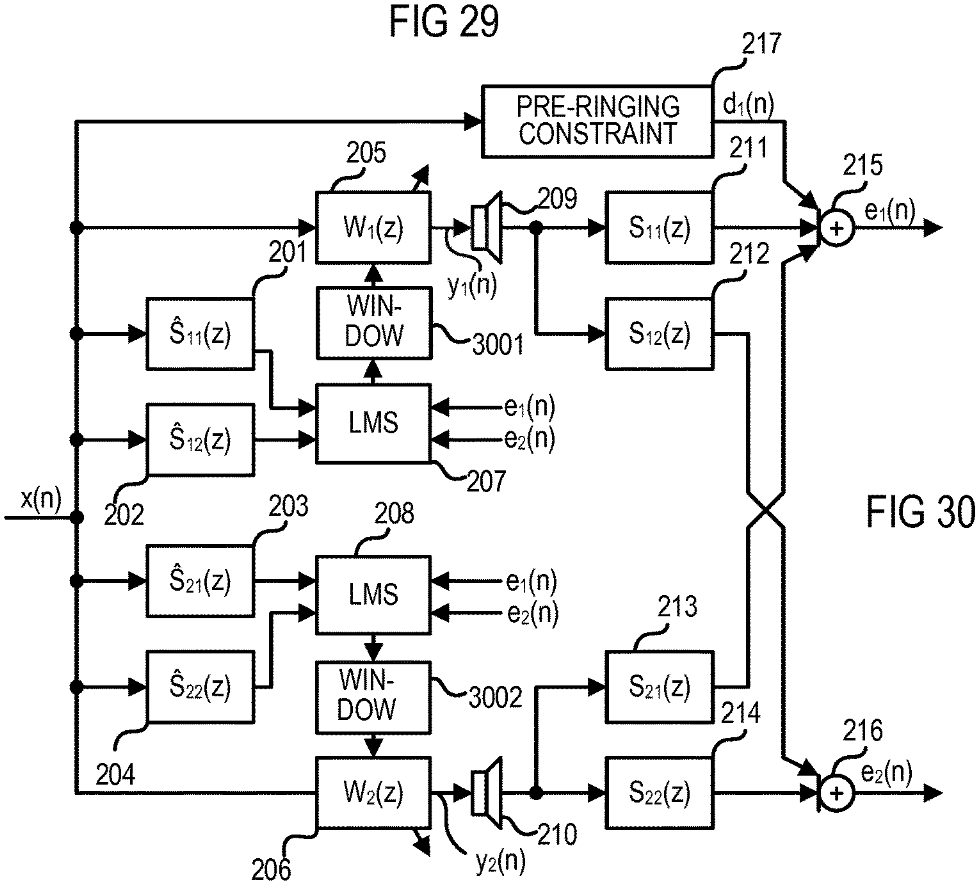
FIG. 30 is a flow chart of a MELMS system or method with a windowing magnitude constraint that is based on the system and method described above in connection with FIG. 2.

The signal flow chart of the resulting system and method shown in FIG. 30 is based on the system and method described above in connection with FIG. 2. A windowing module 3001 (magnitude constraint) is arranged between LMS module 207 and equalizing filter module 205. Another windowing module 3002 is arranged between LMS module 208 and equalizing filter module 206. Windowing may be used in connection with the pre-ringing constraint (as shown in FIG. 22), but may be also used in standalone applications, in connection with other psychoacoustically motivated constraints or in connection with a modeling delay.

Figure 31:
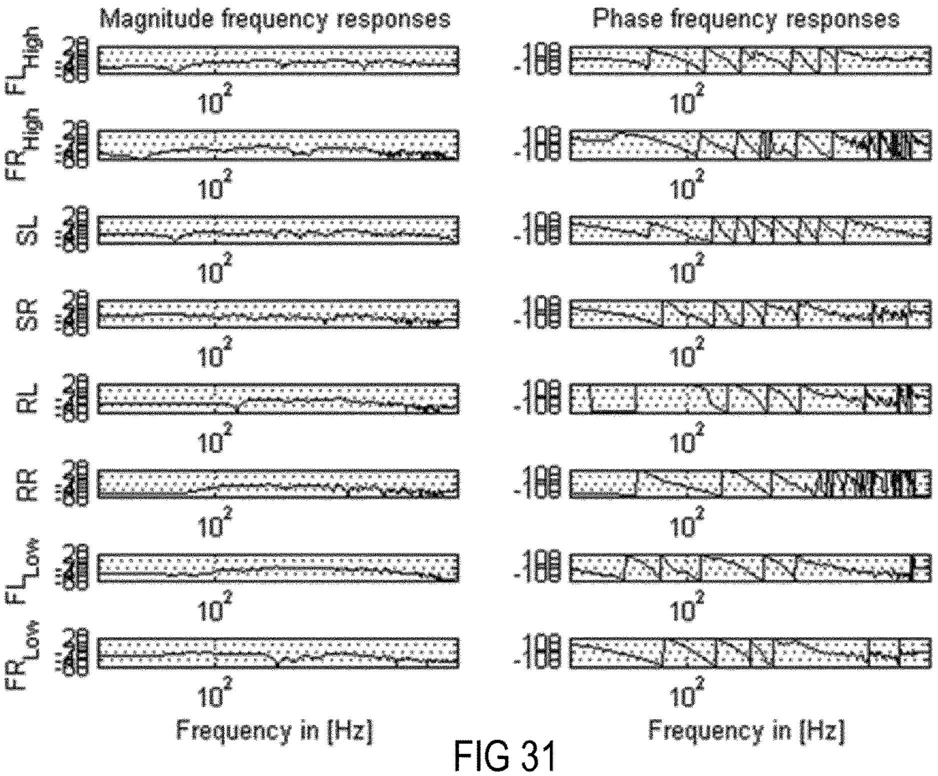
FIG. 31 is a Bode diagram (magnitude frequency responses, phase frequency responses) of a system or method when only more distant loudspeakers in combination with a pre-ringing constraint and a magnitude constraint based on windowing with the modified Gauss window are used.

Windowing results in no significant changes in the cross-talk cancellation performance, as can be seen in FIG. 27, but the temporal behavior of the equalizing filters is improved, as can be seen from a comparison of FIGS. 26 and 28. Using a window as a magnitude constraint, however, does not result in such a huge smoothing of the magnitude frequency curve as with the other version, as will be apparent when comparing FIG. 31 with FIGS. 23 and 24. Instead, the phase time characteristic is smoothed since smoothing is performed in the time domain, as will also be apparent when comparing FIG. 31 with FIGS. 23 and 24. FIG. 31 is a Bode diagram (magnitude frequency responses, phase frequency responses) of a system or method when only more distant loudspeakers in combination with a pre-ringing constraint and a magnitude constraint based on windowing with the modified Gauss window are used.

As windowing is performed after applying the constraint in the MELMS algorithm, the window (e.g., the window shown in FIG. 29) is shifted and modified periodically, which can be expressed as follows:

$$Win(n) = \begin{cases} w\left(\frac{N}{2}+n\right), & n = \left[0, \ldots, \frac{N}{2}-1\right], \\ 0, & n = \left[\frac{N}{2}, \ldots, N-1\right]. \end{cases}$$

Figure 32:
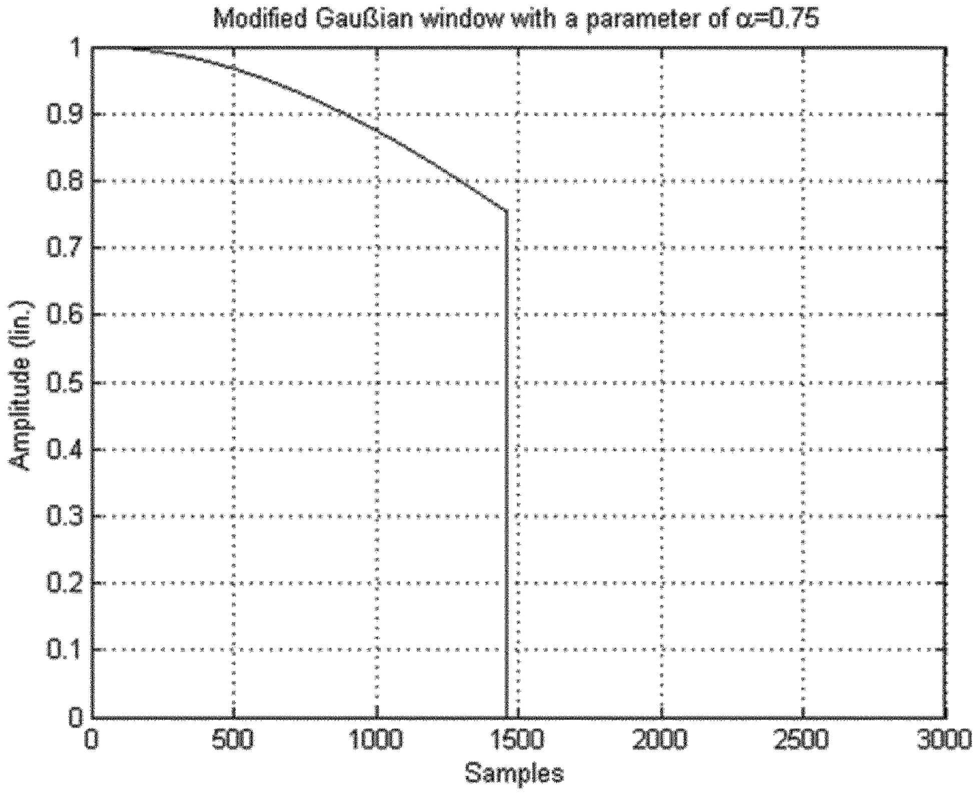
FIG. 32 is an amplitude time diagram illustrating an exemplary modified Gauss window.

The Gauss window shown in FIG. 29 tends to level out when parameter α gets smaller and thus provides less smoothing at smaller values of parameter α. Parameter α may be chosen dependent on different aspects such as the update rate (i.e., how often windowing is applied within a certain number of iteration steps), the total number of iterations, etc. In the present example, windowing was performed in each iteration step, which was the reason for choosing a relatively small parameter α, since repeated multiplications of the filter coefficients with the window are performed in each iteration step and the filter coefficients successively decrease. An accordingly modified window is shown in FIG. 32.

Windowing allows not only for a certain smoothing in the spectral domain in terms of magnitude and phase, but also for adjusting the desired temporal confinement of the equalizing filter coefficients. These effects can be freely chosen by way of a smoothing parameter such as a configurable window (see parameter α in the exemplary Gauss window described above) so that the maximum attenuation and the acoustic quality of the equalizing filters in the time domain can be adjusted.

Yet another alternative way to smooth the spectral characteristic of the equalizing filters may be to provide, in addition to the magnitude, the phase within the magnitude constraint. Instead of an unprocessed phase, a previously adequately smoothed phase is applied, whereby smoothing may again be nonlinear. However, any other smoothing characteristic is applicable as well. Smoothing may be applied only to the unwrapped phase, which is the continuous phase frequency characteristic, and not to the (repeatedly) wrapped phase, which is within a valid range of $-\pi \leq \phi < \pi$.

In order also to take the topology into account, a spatial constraint may be employed, which can be achieved by adapting the MELMS algorithm as follows:

$$W_k(e^{j\Omega},n+1)=W_k(e^{j\Omega},n)+\mu\Sigma_{m=1}^{M}(X_{k,m}'(e^{j\Omega},n)E_m'(e^{j\Omega},n)),$$

wherein $E_m'(e^{j\Omega},n)=E_m(e^{j\Omega},n)G_m(e^{j\Omega})$ and $G_m(e^{j\Omega})$ is the weighting function for the $m^{th}$ error signal in the spectral domain.

Figure 33:
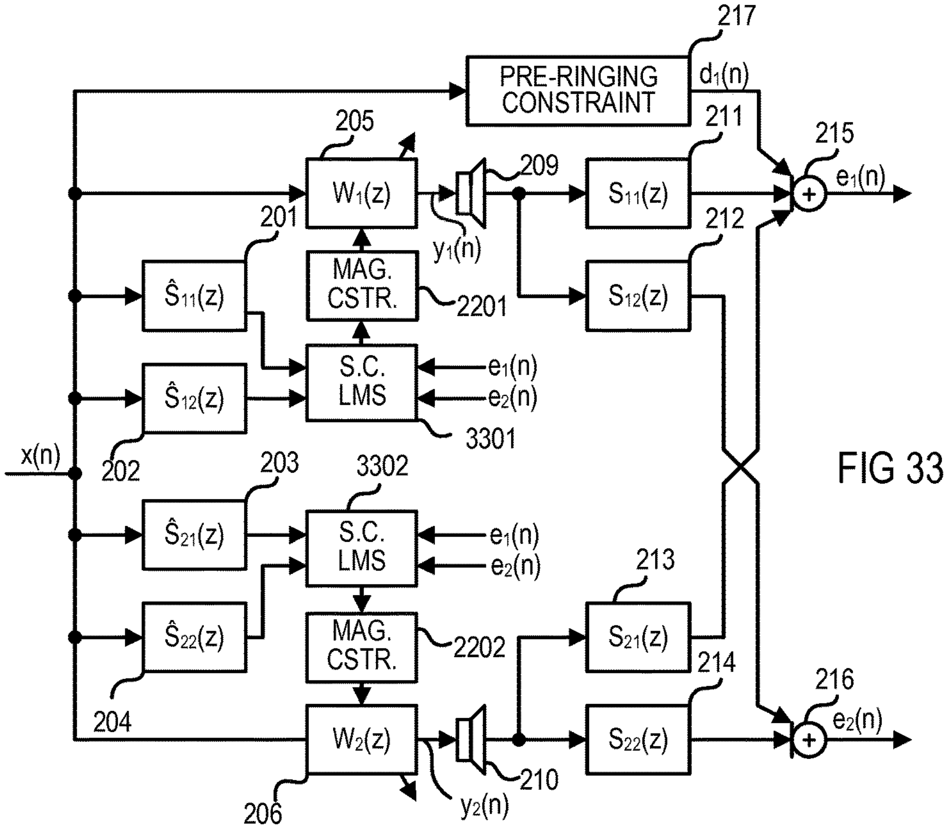
FIG. 33 is a flow chart of a MELMS system or method with a spatial constraint that is based on the system and method described above in connection with FIG. 22.

A flow chart of an accordingly modified MELMS algorithm, which is based on the system and method described above in connection with FIG. 22 and in which a spatial constraint LMS module 3301 substitutes LMS module 207 and a spatial constraint LMS module 3302 substitutes LMS module 208, is shown in FIG. 33. The spatial constraint may be used in connection with the pre-ringing constraint (as shown in FIG. 33), but may also be used in standalone applications, in connection with psychoacoustically motivated constraints or in connection with a modeling delay.

Figure 34:
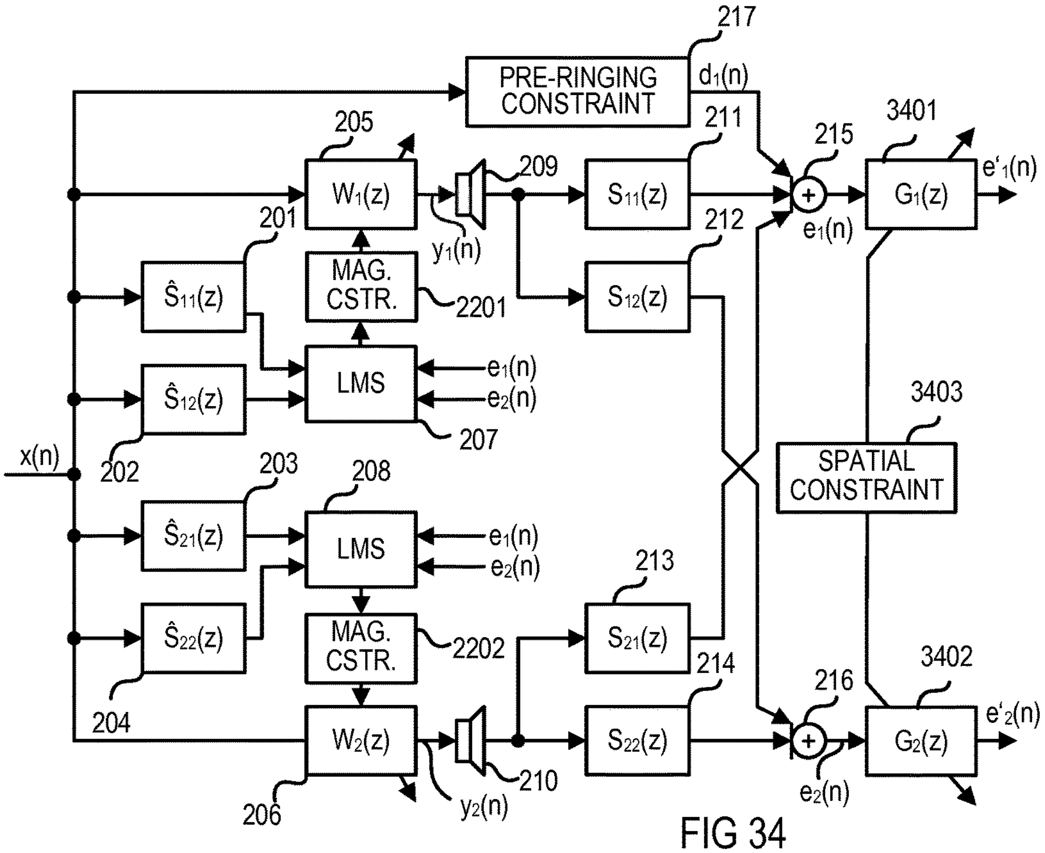
FIG. 34 is a flow chart of a MELMS system or method with an alternative spatial constraint that is based on the system and method described above in connection with FIG. 22.

A flow chart of an alternatively modified MELMS algorithm, which is also based on the system and method described above in connection with FIG. 22, is shown in FIG. 34. A spatial constraint module 3403 is arranged to control a gain control filter module 3401 and a gain control filter module 3402. Gain control filter module 3401 is arranged downstream of microphone 215 and provides a modified error signal $e'_1(n)$. Gain control filter module 3402 is arranged downstream of microphone 216 and provides a modified error signal $e'_2(n)$.

In the system and method shown in FIG. 34, (error) signals $e_1(n)$ and $e_2(n)$ from microphones 215 and 216 are modified in the time domain rather than in the spectral domain. The modification in the time domain can nevertheless be performed such that the spectral composition of the signals is also modified, e.g., by way of the filter that provides a frequency-dependent gain. However, the gain may also simply be frequency independent.

In the example shown in FIG. 34, no spatial constraint is applied, i.e., all error microphones (all positions, all sound zones) are weighted equally so that no special emphasis or insignificance is applied to particular microphones (positions, sound zones). However, a position-dependent weighting can be applied as well. Alternatively, sub-areas may be defined so that, for example, areas around the listener's ears may be amplified and areas at the back part of the head may be damped.

It may be desirable to modify the spectral application field of the signals supplied to the loudspeakers since the loudspeakers may exhibit differing electrical and acoustic characteristics. But even if all characteristics are identical, it may be desirable to control the bandwidth of each loudspeaker independently from the other loudspeakers since the usable bandwidths of identical loudspeakers with identical characteristics may differ when disposed at different locations (positions, vented boxes with different volume). Such differences may be compensated by way of crossover filters. In the exemplary system and method shown in FIG. 35, a frequency-dependent gain constraint, herein also referred to as a frequency constraint, may be used instead of crossover filters to make sure that all loudspeakers are operated in an identical or at least similar fashion, e.g., such that none of the loudspeakers are overloaded, which leads to unwanted nonlinear distortions. Frequency constraints can be realized in a multiplicity of ways, two of which are discussed below.

Figure 35:
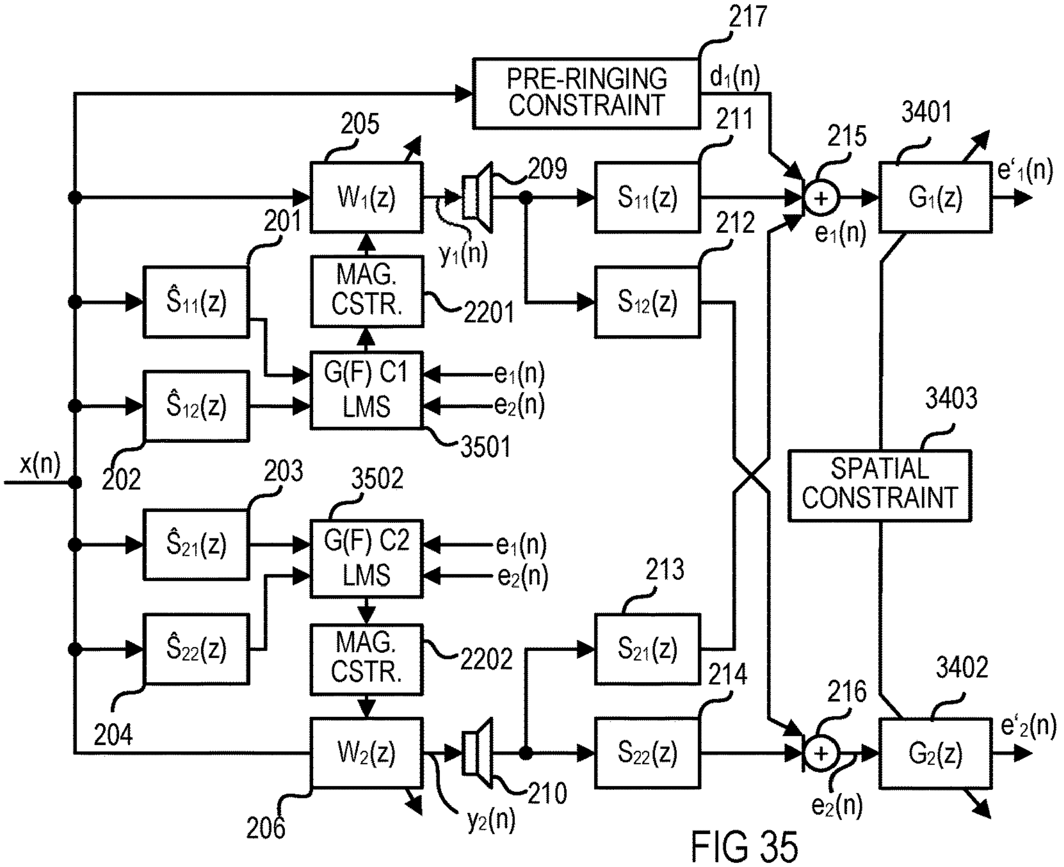
FIG. 35 is a flow chart of a MELMS system or method with a frequency-dependent gain constraint LMS, which is based on the system and method described above in connection with FIG. 34.

A flow chart of an accordingly modified MELMS algorithm, which is based on the system and method described above in connection with FIG. 34, but may be based on any other system and method described herein, with or without particular constraints, is shown in FIG. 35. In the exemplary system shown in FIG. 35, LMS modules 207 and 208 are substituted by frequency-dependent gain constraint LMS modules 3501 and 3502 to provide a specific adaptation behavior, which can be described as follows:

$$\widehat{X'}_{k,m}(e^{j\Omega},n)=X_{k,m}(e^{j\Omega},n)\overline{S}_{k,m}(e^{j\Omega},n)|F_k(e^{j\Omega})|,$$

wherein k=1, . . . , K, K being the number of loudspeakers; m=1, . . . , M, M being the number of microphones; $\overline{S}_{k,m}(e^{j\Omega},n)$ is the model of the secondary path between the $k^{th}$ loudspeaker and the $m^{th}$ (error) microphone at time n (in samples); and $|F_k(e^{j\Omega})|$ is the magnitude of the crossover filter for the spectral restriction of the signal supplied to the $k^{th}$ loudspeaker, the signal being essentially constant over time n.

Figure 36:
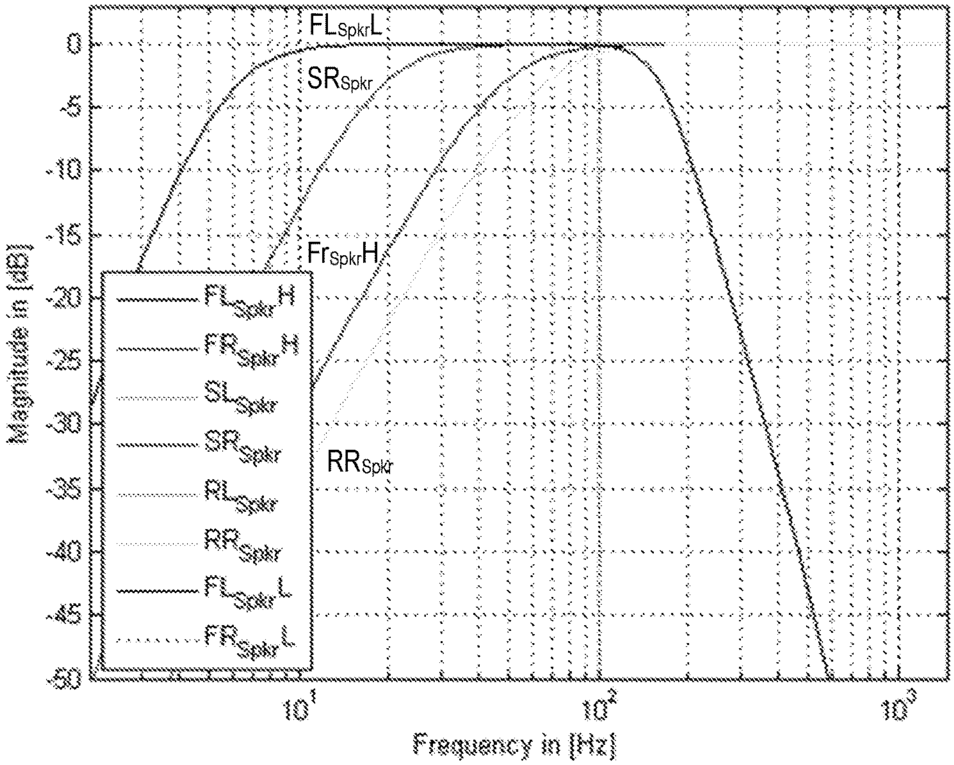
FIG. 36 is a magnitude frequency diagram illustrating the frequency-dependent gain constraints corresponding to four more distant loudspeakers when using crossover filters.

As can be seen, the modified MELMS algorithm is essentially only a modification with which filtered input signals are generated, wherein the filtered input signals are spectrally restricted by way of K crossover filter modules with a transfer function $F_k(e^{j\Omega})$. The crossover filter modules may have complex transfer functions, but in most applications, it is sufficient to use only the magnitudes of transfer functions $|F_k(e^{j\Omega})|$ in order to achieve the desired spectral restrictions since the phase is not required for the spectral restriction and may even disturb the adaptation process. The magnitude of exemplary frequency characteristics of applicable crossover filters are depicted in FIG. 36.

Figure 37:
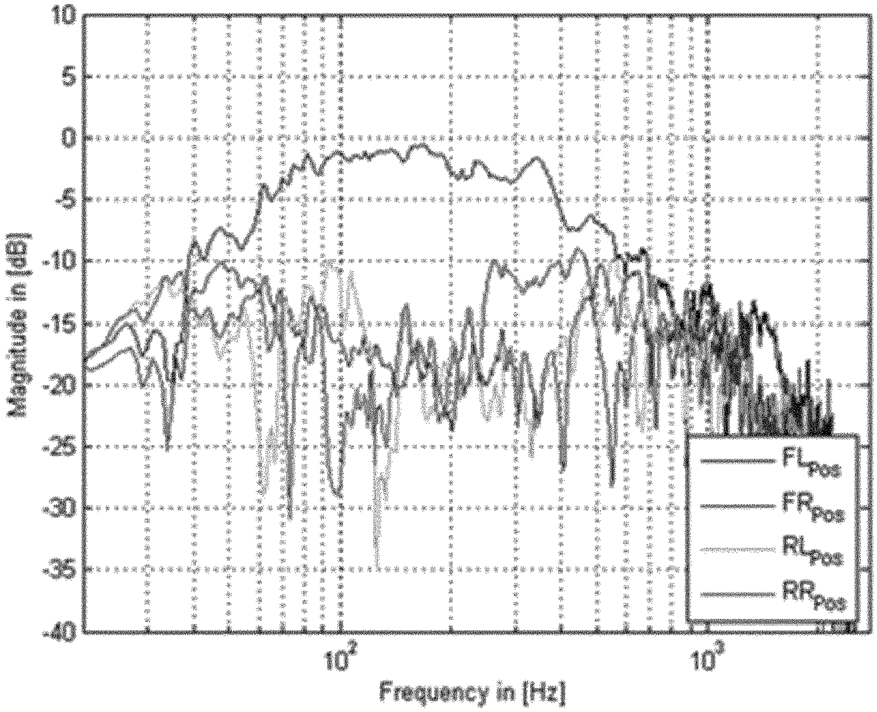
FIG. 37 is a magnitude frequency diagram illustrating the frequency characteristics at the four positions in the setup shown in FIG. 7 when only more distant loudspeakers in combination with a pre-ringing constraint, a windowed magnitude constraint and an adaptive frequency (dependent gain) constraint are used.
Figure 38:
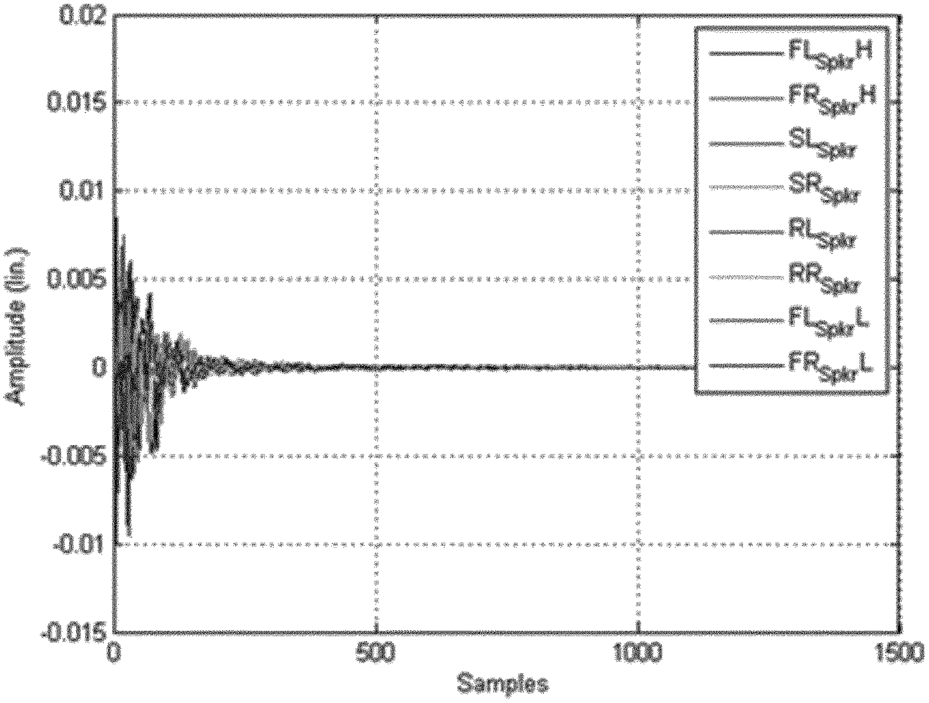
FIG. 38 is an amplitude time diagram illustrating the impulse responses corresponding to the equalization filter of the MIMO system, which results in the frequency characteristics at the four desired positions shown in FIG. 37.

The corresponding magnitude frequency responses at all four positions and the filter coefficients of the equalizing filters (representing the impulse responses thereof) over time (in samples), are shown in FIGS. 37 and 38, respectively. The magnitude responses shown in FIG. 37 and the impulse responses of the equalizing filters for establishing crosstalk cancellation shown in FIG. 38 relate to four positions when applying equalizing filters in connection with exclusively more distant loudspeakers such as loudspeakers $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ in the setup shown in FIG. 7 in combination with a frequency constraint, a pre-ringing constraint and a magnitude constraint, including windowing with a Gauss window of 0.25.

Figure 39:
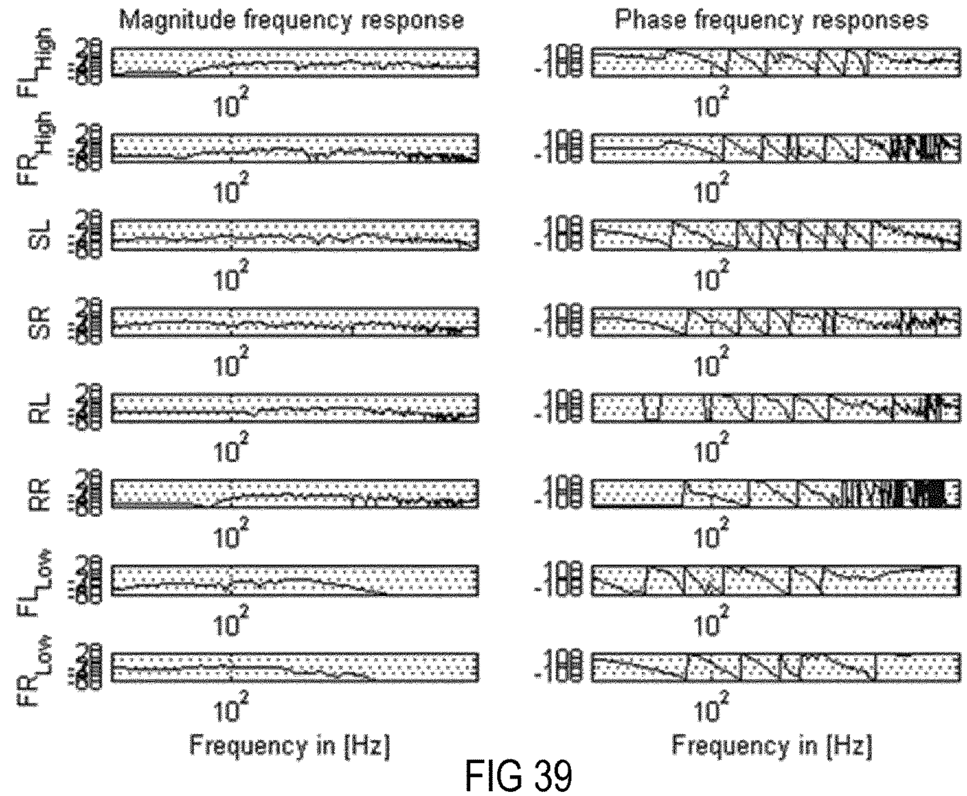
FIG. 39 is a Bode diagram of a system or method when only more distant loudspeakers in combination with a pre-ringing constraint, a windowed magnitude constraint and an adaptive frequency (dependent gain) constraint are used.

FIGS. 37 and 38 illustrate the results of the spectral restriction of the output signals by way of the crossover filter modules below 400 Hz, which is the minor influence of the front woofers $FL_{Spkr}L$ and $FR_{Spkr}L$ in the setup shown in FIG. 7, and the absence of any significant influence on the crosstalk cancellation, as can be seen from a comparison of FIGS. 37 and 27. These results are also supported when comparing the Bode diagrams shown in FIGS. 39 and 31, in which the diagrams shown in FIG. 39 are based on the same setup that forms the basis of FIGS. 37 and 38 and shows a significant change of the signal supplied to woofers $FL_{Spkr}L$ and $FR_{Spkr}L$ when they are next to front positions $FL_{Pos}$ and $FR_{Pos}$. Systems and methods with frequency constraints as set forth above may tend to exhibit a certain weakness (magnitude drops) at low frequencies in some applications. Therefore, the frequency constraint may be alternatively implemented, e.g., as discussed below in connection with FIG. 40.

Figure 40:
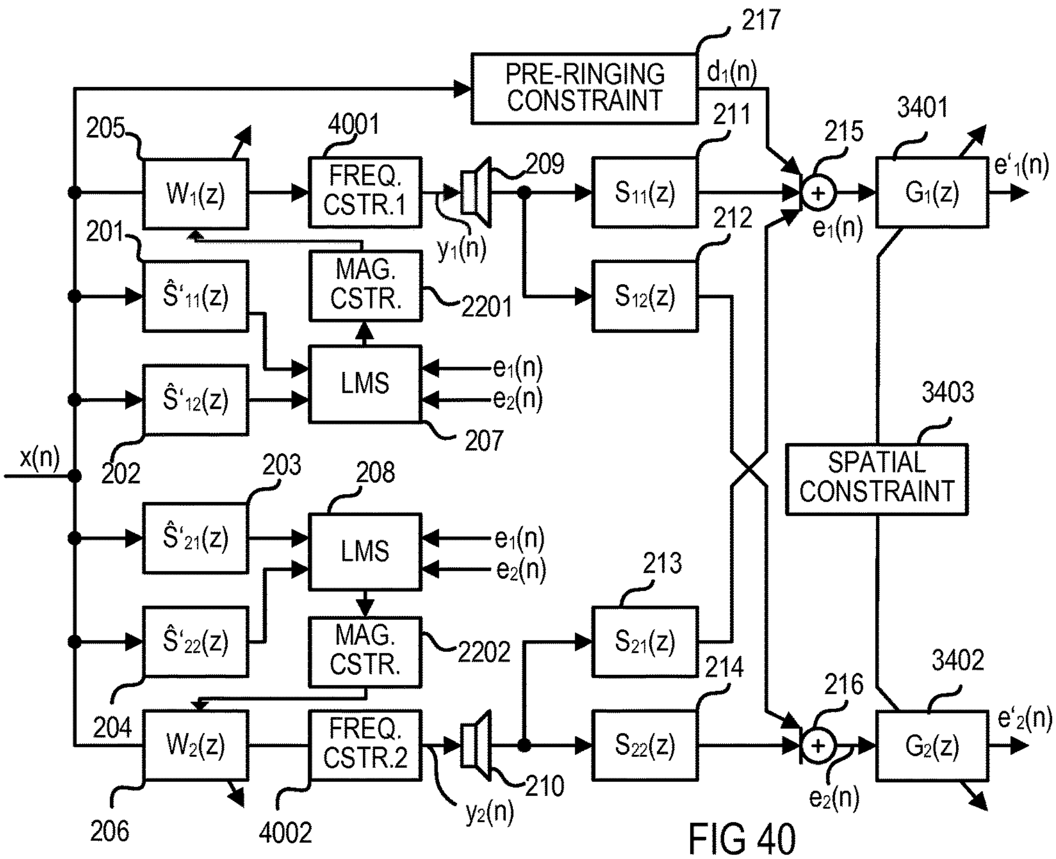
FIG. 40 is a flow chart of a MELMS system or method that is based on the system and method described above in connection with FIG. 34, with an alternative frequency (dependent gain) constraint.

A flow chart of an accordingly modified MELMS algorithm, as shown in FIG. 40, is based on the system and method described above in connection with FIG. 34, but may be alternatively based on any other system and method described herein, with or without particular constraints. In the exemplary system shown in FIG. 40, a frequency constraint module 4001 may be arranged downstream of equalizing filter 205, and a frequency constraint module 4002 may be arranged downstream of equalizing filter 206. The alternative arrangement of the frequency constraint allows for reducing the complex influence (magnitude and phase) of the crossover filters in the room transfer characteristics, i.e., in the actual occurring transfer functions $S_{k,m}(e^{j\Omega},n)$ by way of pre-filtering the signals supplied to the loudspeakers, and in the transfer functions of their models $\hat{S}_{k,m}(e^{j\Omega},n)$, which is indicated in FIG. 40 by $\widehat{S'}_{k,m}(e^{j\Omega},n)$. This modification to the MELMS algorithm can be described with the following equations:

$$S'_{k,m}(e^{j\Omega},n)=S_{k,m}(e^{j\Omega},n)F_k(e^{j\Omega}),$$

$$\widehat{S'}_{k,m}(e^{j\Omega},n)=\hat{S}_{k,m}(e^{j\Omega},n)F_k(e^{j\Omega}),$$

wherein $\widehat{S'}_{k,m}(e^{j\Omega},n)$ is an approximation of $S'_{k,m}(e^{j\Omega},n)$.

Figure 41:
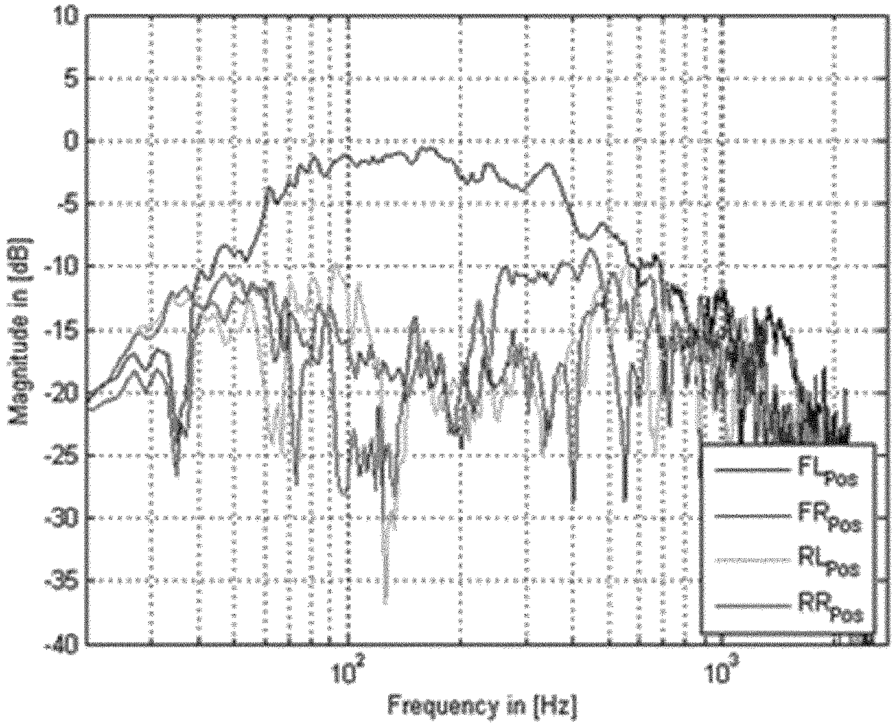
FIG. 41 is a magnitude frequency diagram illustrating the frequency characteristics at the four positions in the setup shown in FIG. 7, with applied equalizing filters when only more distant loudspeakers in combination with a pre-ringing constraint, a windowed magnitude constraint and the alternative frequency (dependent gain) constraint in the room impulse responses are used.
Figure 42:
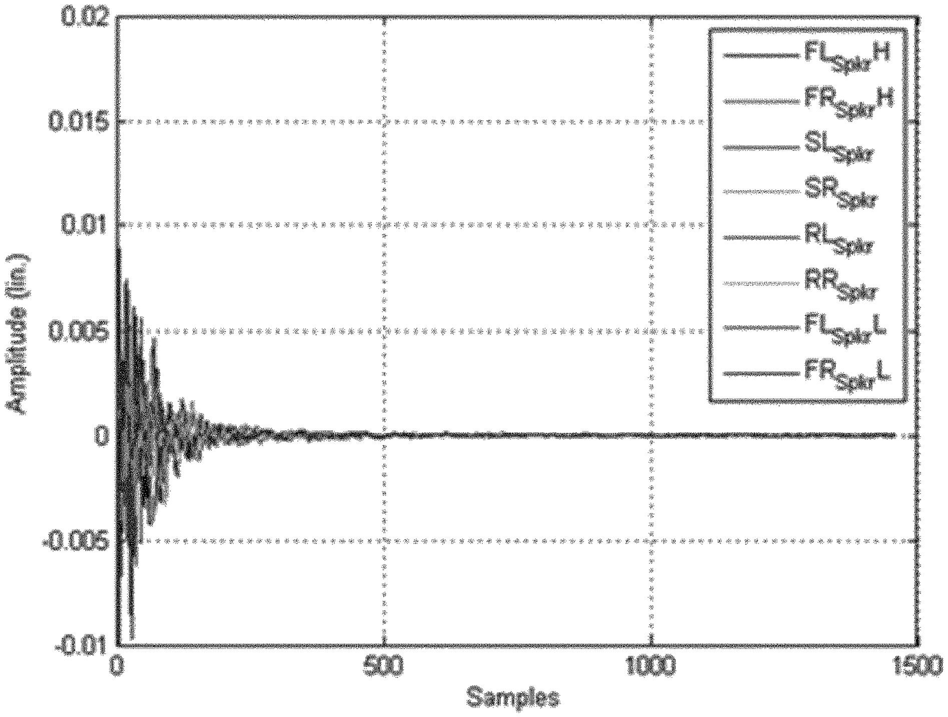
FIG. 42 is an amplitude time diagram illustrating the impulse responses corresponding to the equalization filter of the MIMO system, which results in the frequency characteristics at the four desired positions shown in FIG. 41.
Figure 43:
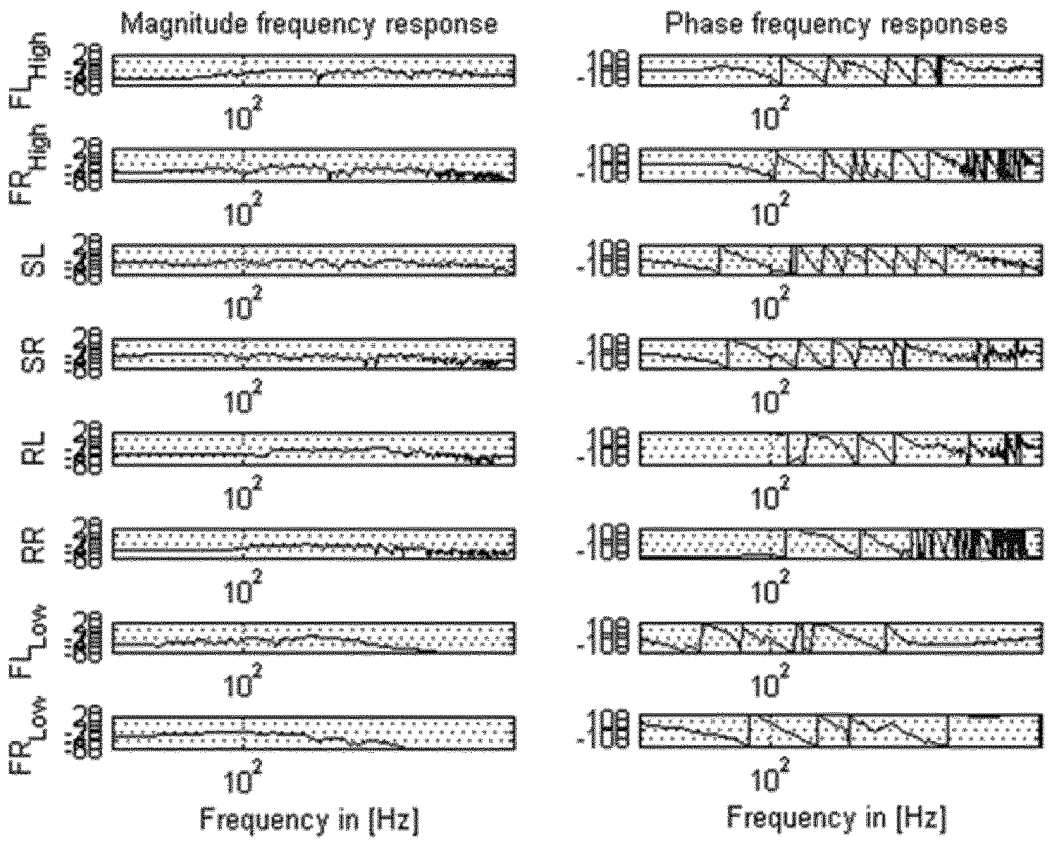
FIG. 43 is a Bode diagram of the equalizing filters applied to the setup shown in FIG. 7 when only more distant loudspeakers in combination with a pre-ringing constraint, a windowed magnitude constraint and the alternative frequency (dependent gain) constraints in the room impulse responses are used.

FIG. 41 is a diagram illustrating the magnitude frequency responses at the four positions described above in connection with FIG. 7 when equalizing filters are applied and only the more distant loudspeakers, i.e., $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ in the setup shown in FIG. 7, are used in connection with a pre-ringing constraint, a magnitude constraint (windowing with a Gauss window of 0.25) and a frequency constraint that is included in the room transfer functions. The corresponding impulse responses are shown in FIG. 42, and the corresponding Bode diagrams are shown in FIG. 43. As can be seen in FIGS. 41-43, the crossover filters have a significant impact on woofers $FL_{Spkr}L$ and $FR_{Spkr}L$ next to front positions $FL_{Pos}$ and $FR_{Pos}$. Particularly when comparing FIGS. 41 and 37, it can be seen that the frequency constraint on which the diagram of FIG. 41 is based allows for a more distinct filtering effect at lower frequencies and that the crosstalk cancellation performance deteriorates a little bit at frequencies above 50 Hz.

Depending on the application, at least one (other) psychoacoustically motivated constraint may be employed, either alone or in combination with other psychoacoustically motivated or not psychoacoustically motivated constraints such as a loudspeaker-room-microphone constraint. For example, the temporal behavior of the equalizing filters when using only a magnitude constraint, i.e., non-linear smoothing of the magnitude frequency characteristic when maintaining the original phase (compare the impulse responses depicted in FIG. 26), is perceived by the listener as annoying tonal post-ringing. This post-ringing may be suppressed by way of a post-ringing constraint, which can be described based on an energy time curve (ETC) as follows:

Zero Padding:

$$w_k = \begin{bmatrix} \overline{w_k} \\ 0 \end{bmatrix},$$

wherein $\overline{w_k}$ the final set of filter coefficients for the $k^{th}$ equalizing filter in a MELMS algorithm with length N/2, and 0 is the zero column vector with length N.

FFT Conversion:

$$W_{k,t}(e^{j\Omega}) = \Re\{\mathrm{FFT}\{w_k(t, \ldots, t+N)\}\}.$$

ETC Calculation:

$$ETC_{k_{\frac{N}{2}\frac{N}{2}}}(n, t) = \left[W_{k,t}(e^{j\Omega_{n=0}}), \ldots, W_{k,t}\left(e^{j\Omega_{n=\frac{N}{2}-1}}\right)\right],$$

$$ETC_{dBk_{\frac{N}{2}\frac{N}{2}}}(n, t) = 20\log_{10}\left(\left|ETC_{k_{\frac{N}{2}\frac{N}{2}}}(n, t)\right|\right),$$

$$n \in \left[0, \ldots, \frac{N}{2}\right],$$

$$t \in \left[0, \ldots, \frac{N}{2} - 1\right],$$

wherein $W_{k,t}(e^{j\Omega})$ is the real part of the spectrum of the $k^{th}$ equalizing filter at the $t^{th}$ iteration step (rectangular window) and $$ETC_{dBk_{\frac{N}{2}\frac{N}{2}}}(n, t)$$

represents the waterfall diagram of the $k^{th}$ equalizing filter, which includes all N/2 magnitude frequency responses of the single sideband spectra with a length of N/2 in the logarithmic domain.

When calculating the ETC of the room impulse response of a typical vehicle and comparing the resulting ETC with the ETC of the signal supplied to front left high-frequency loudspeaker $FL_{Spkr}H$ in a MELMS system or method described above, it turns out that the decay time exhibited in certain frequency ranges is significant longer, which can be seen as the underlying cause of post-ringing. Furthermore, it turns out that the energy contained in the room impulse response of the MELMS system and method described above might be too much at a later time in the decay process. Similar to how pre-ringing is suppressed, post-ringing may be suppressed by way of a post-ringing constraint, which is based on the psychoacoustic property of the human ear called (auditory) post-masking.

Figure 44:
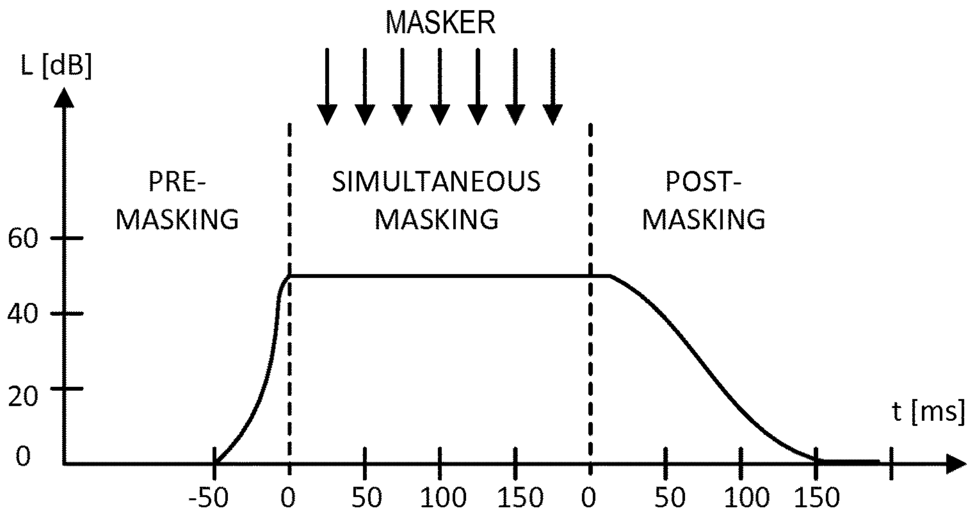
FIG. 44 is a schematic diagram illustrating the sound pressure levels over time for pre-masking, simultaneous masking and post-masking.

Auditory masking occurs when the perception of one sound is affected by the presence of another sound. Auditory masking in the frequency domain is known as simultaneous masking, frequency masking or spectral masking. Auditory masking in the time domain is known as temporal masking or non-simultaneous masking. The unmasked threshold is the quietest level of the signal that can be perceived without a present masking signal. The masked threshold is the quietest level of the signal perceived when combined with a specific masking noise. The amount of masking is the difference between the masked and unmasked thresholds. The amount of masking will vary depending on the characteristics of both the target signal and the masker, and will also be specific to an individual listener. Simultaneous masking occurs when a sound is made inaudible by a noise or unwanted sound of the same duration as the original sound. Temporal masking or non-simultaneous masking occurs when a sudden stimulus sound makes other sounds that are present immediately preceding or following the stimulus inaudible. Masking that obscures a sound immediately preceding the masker is called backward masking or pre-masking, and masking that obscures a sound immediately following the masker is called forward masking or post-masking. Temporal masking's effectiveness attenuates exponentially from the onset and offset of the masker, with the onset attenuation lasting approximately 20 ms and the offset attenuation lasting approximately 100 ms, as shown in FIG. 44.

Figure 45:
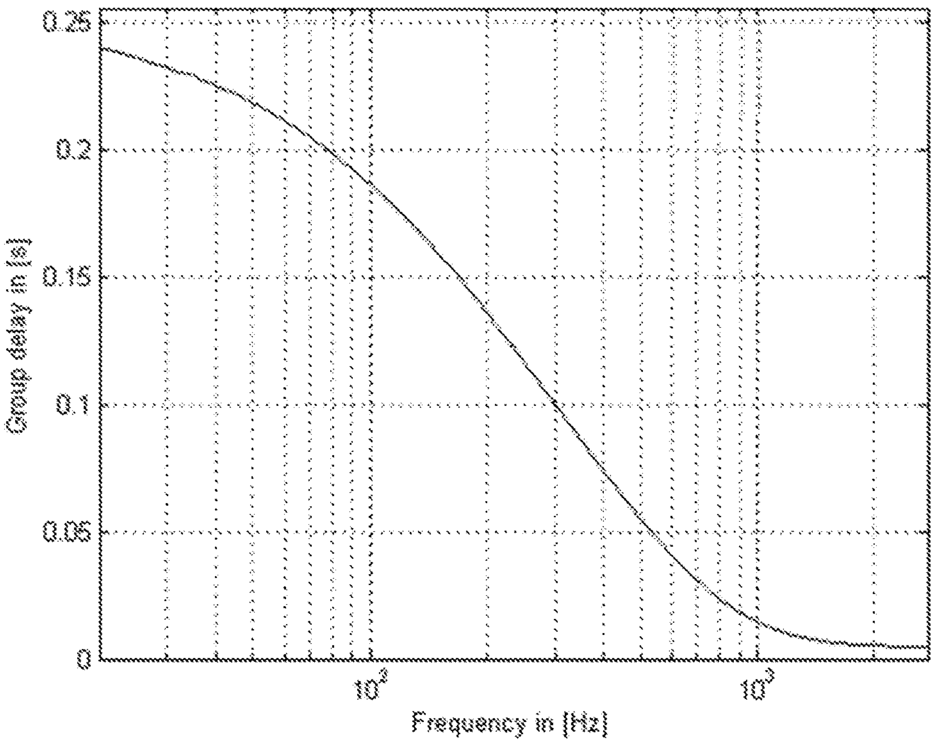
FIG. 45 is a diagram illustrating a post-ringing constraint curve in the form of a limiting group delay function as group delay differences over frequency.
Figure 46:
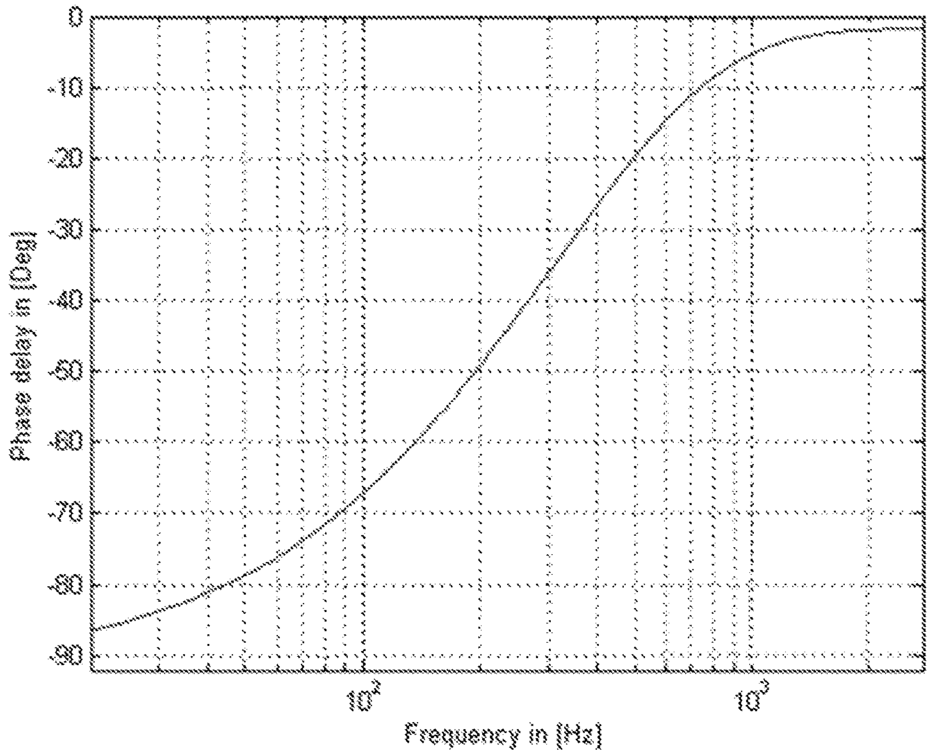
FIG. 46 is a diagram illustrating the curve of a limiting phase function as phase difference curve over frequency derived from the curve shown in FIG. 45.

An exemplary graph depicting the inverse exponential function of the group delay difference over frequency is shown in FIG. 45, and the corresponding inverse exponential function of the phase difference over frequency as the post-masking threshold is shown in FIG. 46. "Post-masking" threshold is understood herein as a constraint to avoid post-ringing in equalizing filters. As can be seen from FIG. 45, which shows a constraint in the form of a limiting group delay function (group delay differences over frequency), the post-masking threshold decreases when the frequency increases. While at a frequency of approximately 1 Hz, a post-ringing with a duration of around 250 ms may be acceptable for a listener, at a frequency of approximately 500 Hz, the threshold is already at around 50 ms and may reach higher frequencies with an approximate asymptotic end-value of 5 ms. The curve shown in FIG. 45 can easily be transformed into a limiting phase function, which is shown in FIG. 46 as phase difference curve over frequency. As the shapes of the curves of post-ringing (FIGS. 45 and 46) and pre-ringing (FIGS. 3 and 4) are quite similar, the same curve may be used for both post-ringing and pre-ringing but with different scaling. The post-ringing constraint may be described as follows:

Specifications:

$$t_S = \left[0, \frac{N}{2f_s}, \ldots, \left(\frac{N}{2} - 1\right)\right]$$

is the time vector with a length of N/2 (in samples), $t_0=0$ is the starting point in time, $a0_{db}=0$ dB is the starting level and $a1_{db}=-60$ dB is the end level.

Gradient:

$$m(n)=\frac{a1_{dB}-a0_{dB}}{\tau_{GroupDelay}(n)-t_0}$$

is the gradient of the limiting function (in dB/s), $\tau_{GroupDelay}(n)$ is the difference function of the group delay for suppressing post-ringing (in s) at frequency n (in FFT bin).

Limiting Function:

$LimFct_{dB}(n,t)=m(n)t_S$ is the temporal limiting function for the $n^{th}$ frequency bin (in dB), and $$n=\left[0,\ \ldots,\ \frac{N}{2}\right]$$

is the frequency index representing the bin number of the single sideband spectrum (in FFT bin).

Time Compensation/Scaling:

$$[ETC_{dBk}(n)_{Max},\ t_{Max}]=\max\{ETC_{dBk}(n,t)\},$$

$$\mathrm{Lim}Fct_{dB}(n,t)=\left[0\ \mathrm{Lim}Fct_{dB}\left(n,\left[0,\ \ldots,\ \frac{N}{2}-t_{Max}-1\right]\right)\right],$$

0 is the zero vector with length $t_{Max}$, and $t_{Max}$ is the time index in which the $n^{th}$ limiting function has its maximum.

Linearization:

$$\mathrm{Lim}Fct_{dB}(n,t)=10^{\frac{LimFct_{dB}(n,t)}{20}}.$$

Limitation of ETC:

$$ETC_k(n,t)=\begin{cases}\frac{\mathrm{Lim}Fct(n,t)}{|ETC_k(n,t)|}ETC_k(n,t), \text{ if } ETC_{dBk}(n,t)>\mathrm{Lim}Fct(n,t),\\ ETC_k(n,t), \text{ otherwise.}\end{cases}$$

Calculation of the Room Impulse Response:

$$\tilde{w}_k=\frac{2}{N+2}\sum_{n=0}^{N/2}ETC_k(n,t)$$

is the modified room impulse response of the $k^{th}$ channel (signal supplied to loudspeaker) that includes the post-ringing constraint.

As can be seen in the equations above, the post-ringing constraint is based here on a temporal restriction of the ETC, which is frequency dependent and whose frequency dependence is based on group delay difference function $\tau_{GroupDelay}(n)$. An exemplary curve representing group delay difference function $\tau_{GroupDelay}(n)$ is shown in FIG. 45. Within a given time period $\tau_{GroupDelay}(n)f_S$, the level of a limiting function $LimFct_{dB}$ (n,t) shall decrease according to thresholds $a0_{dB}$ and $a1_{db}$, as shown in FIG. 47.

Figure 47:
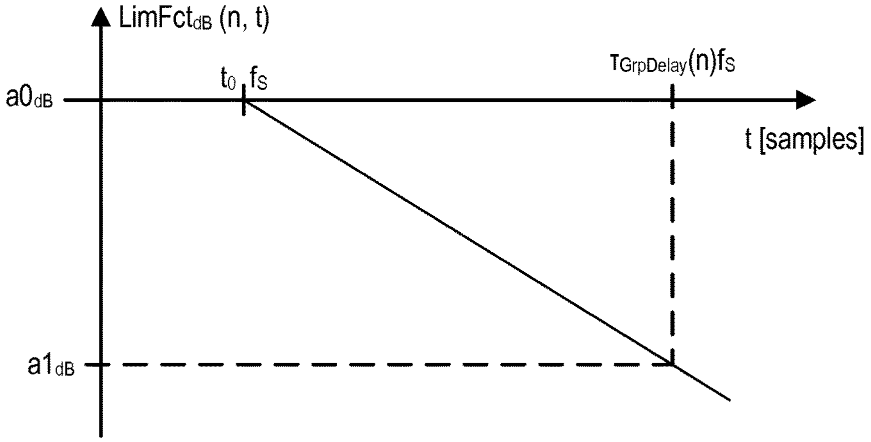
FIG. 47 is a level time diagram illustrating the curve of an exemplary temporal limiting function.

For each frequency n, a temporal limiting function such as the one shown in FIG. 47 is calculated and applied to the ETC matrix. If the value of the corresponding ETC time vector exceeds the corresponding threshold given by $LimFct_{dB}(n,t)$ at frequency n, the ETC time vector is scaled according to its distance from the threshold. In this way, it is assured that the equalizing filters exhibit in their spectra a frequency-dependent temporal drop, as required by group delay difference function $\tau_{GroupDelay}(n)$ As group delay difference function $\tau_{GroupDelay}$ (n) is designed according to psychoacoustic requirements (see FIG. 44), post-ringing, which is annoying to a listener, can be avoided or at least reduced to an acceptable degree.

Figure 48:
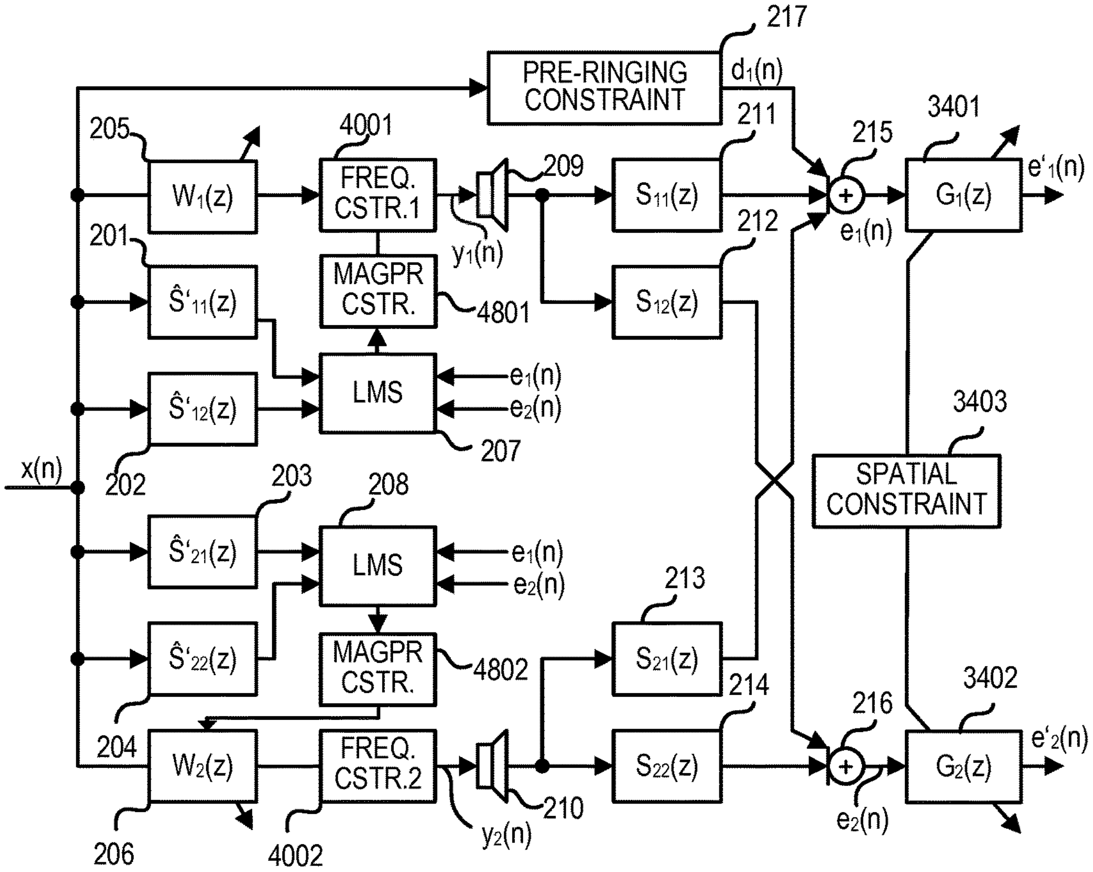
FIG. 48 is a flow chart of a MELMS system or method that is based on the system and method described above in connection with FIG. 40, with a combined magnitude post-ringing constraint.
Figure 49:
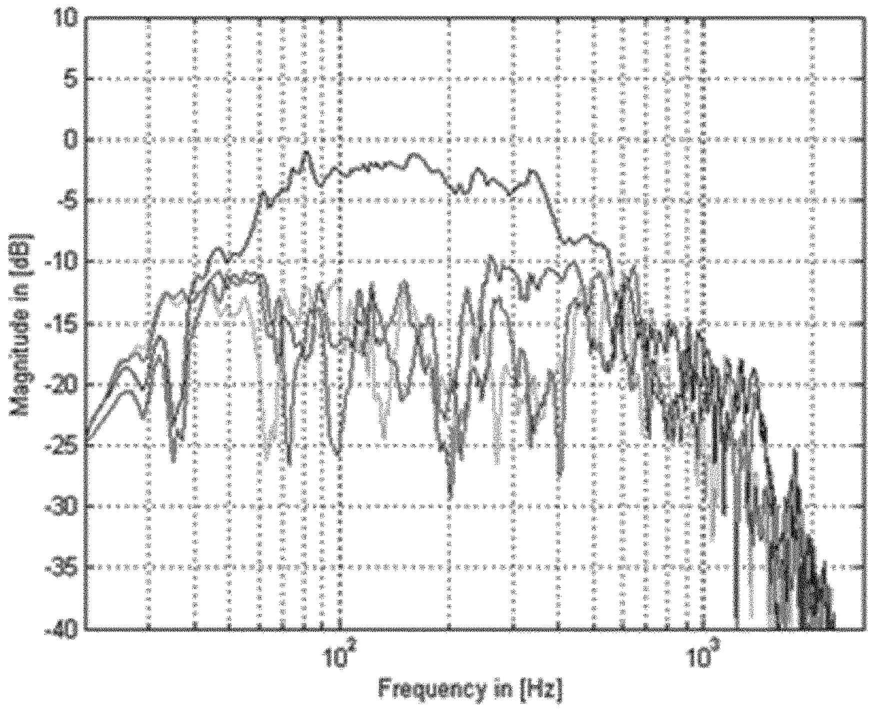
FIG. 49 is a magnitude frequency diagram illustrating the frequency characteristics at the four positions in the setup shown in FIG. 7, with applied equalizing filters when only more distant loudspeakers in combination with a pre-ringing constraint, a magnitude constraint-based non-linear smoothing, a frequency (dependent gain) constraint and a post-ringing constraint are used.

Referring now to FIG. 48, the post-ringing constraint can be implemented, for example, in the system and method described above in connection with FIG. 40 (or in any other system and method described herein). In the exemplary system shown in FIG. 48, combined magnitude and post-ringing constraint modules 4801 and 4802 are used instead of magnitude constraint modules 2201 and 2202. FIG. 49 is a diagram illustrating the magnitude frequency responses at the four positions described above in connection with FIG. 7 when equalizing filters are applied and only the more distant loudspeakers, i.e., $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ in the setup shown in FIG. 7, are used in connection with a pre-ringing constraint, a magnitude constraint (windowing with a Gauss window of 0.25), a frequency constraint that is included in the room transfer functions and a post-ringing constraint.

Figure 50:
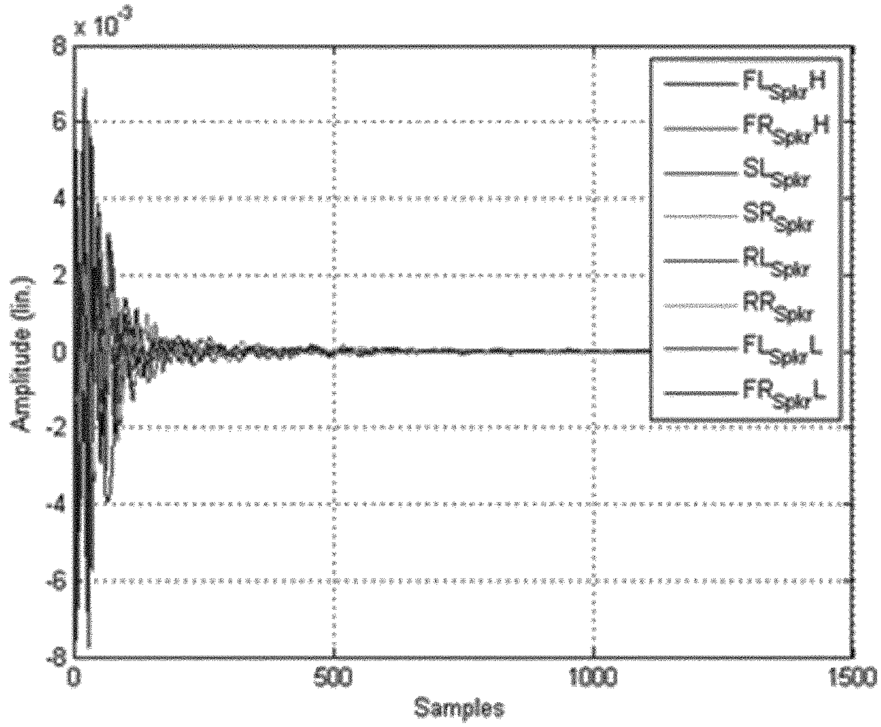
FIG. 50 is an amplitude time diagram illustrating the impulse responses corresponding to the equalization filter of the MIMO system, which results in the frequency characteristics at the four desired positions shown in FIG. 49.
Figure 51:
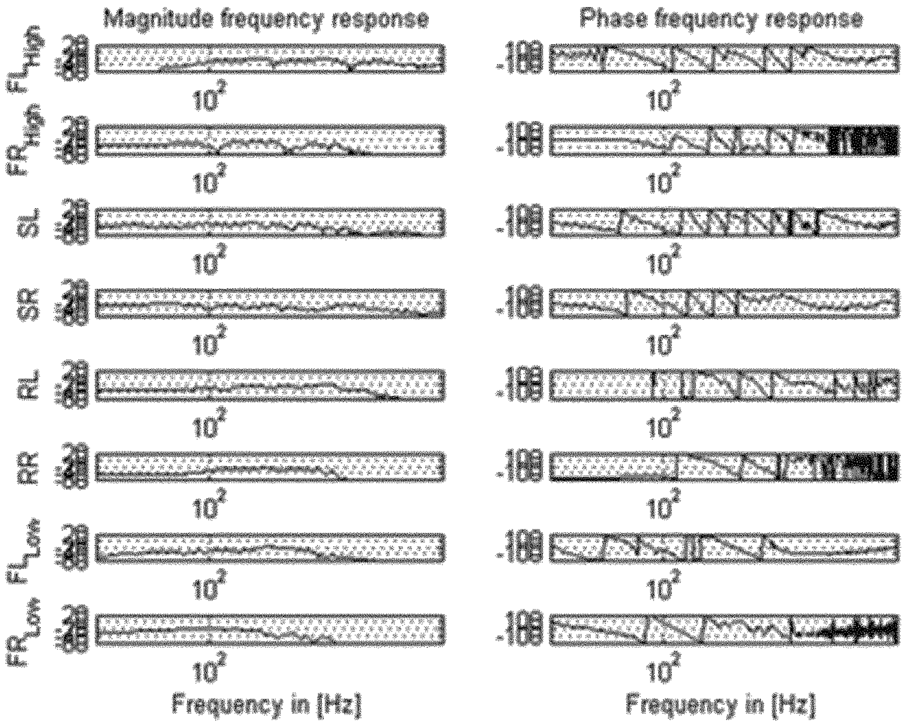
FIG. 51 is a Bode diagram of the equalizing filters applied to the setup shown in FIG. 7 when only more distant loudspeakers in combination with a pre-ringing constraint, a magnitude constraint-based non-linear smoothing, a frequency (dependent gain) constraint and a post-ringing constraint are used.

The corresponding impulse responses are shown in FIG. 50, and the corresponding Bode diagrams are shown in FIG. 51. When comparing the diagram shown in FIG. 49 with the diagram shown in FIG. 41, it can be seen that the post-ringing constraint slightly deteriorates the crosstalk cancellation performance. On the other hand, the diagram shown in FIG. 50 shows that post-ringing is less than in the diagram shown in FIG. 42, which relates to the system and method shown in FIG. 40. As is apparent from the Bode diagrams shown in FIG. 51, the post-ringing constraint has some effect on the phase characteristics, e.g., the phase curves are smoothed.

Another way to implement the post-ringing constraint is to integrate it in the windowing procedure described above in connection with the windowed magnitude constraint. The post-ringing constraint in the time domain, as previously described, is spectrally windowed in a similar manner as the windowed magnitude constraint so that both constraints can be merged into one constraint. To achieve this, each equalizing filter is filtered exclusively at the end of the iteration process, beginning with a set of cosine signals with equidistant frequency points similar to an FFT analysis. Afterwards, the accordingly calculated time signals are weighted with a frequency-dependent window function. The window function may shorten with increasing frequency so that filtering is enhanced for higher frequencies and thus nonlinear smoothing is established. Again, an exponentially sloping window function can be used whose temporal structure is determined by the group delay, similar to the group delay difference function depicted in FIG. 45.

The implemented window function, which is freely parameterizable and whose length is frequency dependent, may be of an exponential, linear, Hamming, Hanning, Gauss or any other appropriate type. For the sake of simplicity, the window functions used in the present examples are of the exponential type. Endpoint $a1_{dB}$ of the limiting function may be frequency dependent (e.g., a frequency-dependent limiting function $a1_{dB}(n)$ in which $a1_{dB}(n)$ may decrease when n increases) in order to improve the crosstalk cancellation performance.

The windowing function may be further configured such that within a time period defined by group delay function $\tau_{GroupDelay}(n)$, the level drops to a value specified by frequency-dependent endpoint $a1_{dB}(n)$, which may be modified by way of a cosine function. All accordingly windowed cosine signals are subsequently summed up, and the sum is scaled to provide an impulse response of the equalizing filter whose magnitude frequency characteristic appears to be smoothed (magnitude constraint) and whose decay behavior is modified according to a predetermined group delay difference function (post-ringing constraint). Since windowing is performed in the time domain, it affects not only the magnitude frequency characteristic, but also the phase frequency characteristic so that frequency-dependent nonlinear complex smoothing is achieved. The windowing technique can be described by the equations set forth below.

Specifications:

$$t_S = \left[0, \frac{N}{2f_S}, \ldots, \left(\frac{N}{2} - 1\right)\right]$$

is the time vector with a length of N/2 (in samples), $t_0=0$ is the starting point in time, $a0_{db}=0$ dB is the starting level and $a1_{db}=-120$ dB is the lower threshold.

Level Limiting:

$$\mathrm{Lim}Lev_{dB}(n) = \left(\frac{2a1_{dB_{Min}}}{N}\right)n$$

is a level limit, $$Lev\mathrm{Mod}Fct_{dB}(n) = -\frac{1}{2}\left(\cos\left(n\frac{2\pi}{N}\right) + 1\right)$$

is a level modification function, $a1_{dB}(n)=\mathrm{LimLev}_{dB}(n)\mathrm{LevModFct}_{dB}(n)$, wherein $$n = \left[0, \ldots, \frac{N}{2}\right]$$

is the frequency index representing the bin number of the single sideband spectrum.

Cosine Signal Matrix:

$\mathrm{CosMat}(n,t)=\cos(2\pi n t_S)$ is the cosine signal matrix.

Window Function Matrix:

$$m(n) = \frac{a1_{dB}(n) - a0_{dB}}{\tau_{GroupDelay}(n) - t_0}$$

is the gradient of the limiting function in dB/s, $\tau_{GroupDelay}(n)$ is the group delay difference function for suppressing post-ringing at the $n^{th}$ frequency bin, $\mathrm{LimFct}_{dB}(n,t)=m(n)t_S$ is the temporal limiting function for the $n^{th}$ frequency bin, $$WinMat(n, t) = 10^{\frac{LimFct_{dB}(n,t)}{20}}$$

is the matrix that includes all frequency-dependent window functions.

Filtering (Application):

$$\mathrm{Cos}MatFilt_k(n, t) = \sum_{t=0}^{(\frac{N}{2})-1} w_k(t)\mathrm{Cos}Mat(n, t)$$

is the cosine matrix filter, wherein $w_k$ is the $k^{th}$ equalizing filter with length N/2.

Windowing and Scaling (Application):

$$\tilde{w}_k = \frac{2}{N+2}\sum_{t=0}^{N/2} \mathrm{Cos}MatFilt_k(n, t)WinMat(n, t)$$

is a smoothed equalizing filter of the $k^{th}$ channel derived by means of the previously described method.

Figure 54:
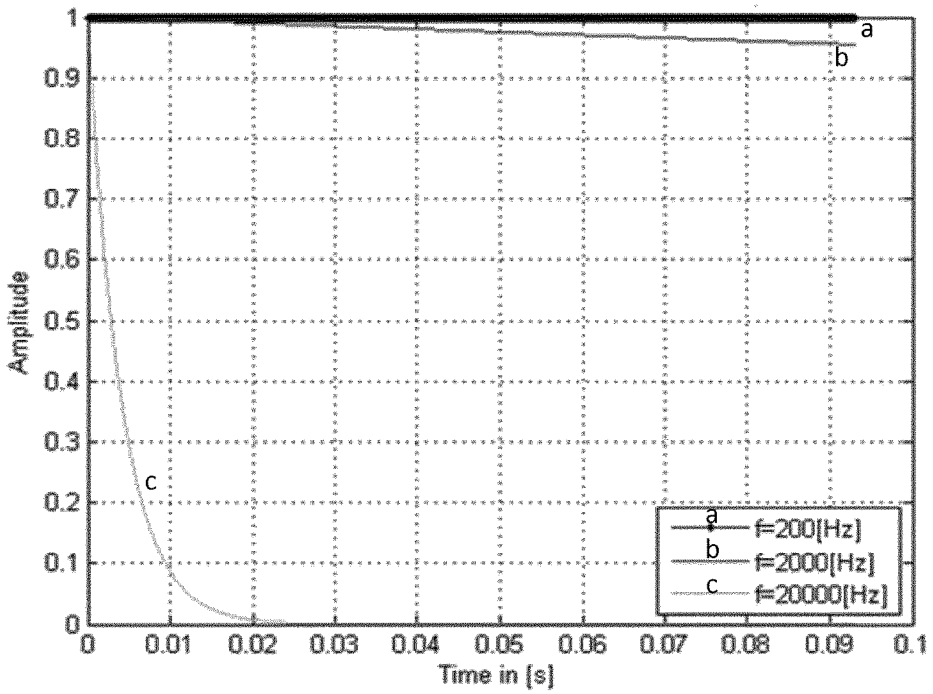
FIG. 54 is a magnitude time diagram illustrating the curve of exemplary window functions with exponential windows at three different frequencies.
Figure 52:
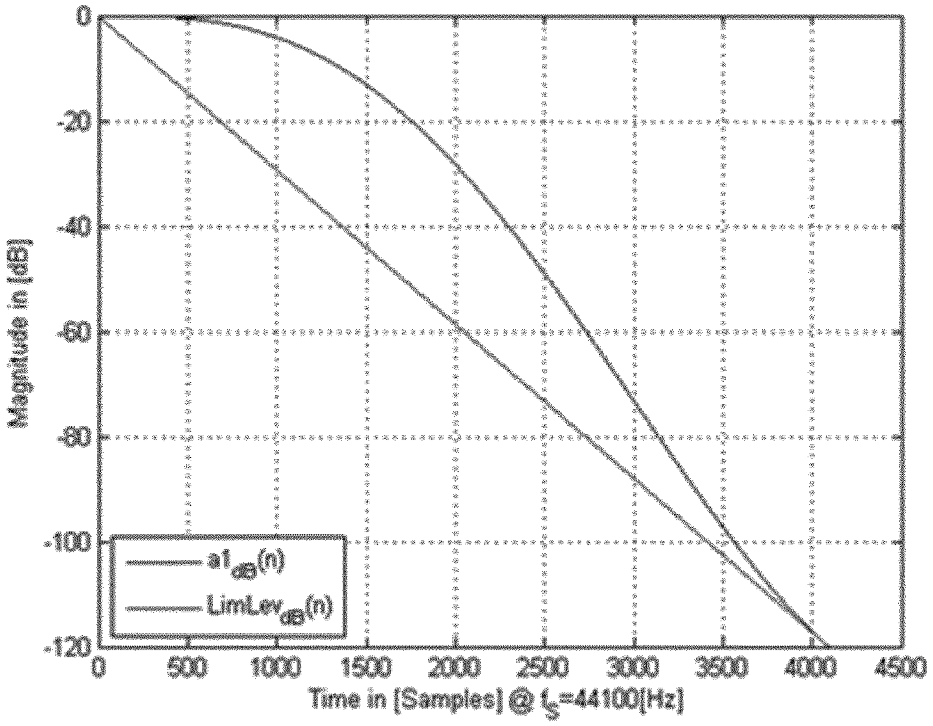
FIG. 52 is a magnitude time diagram illustrating the curve of an exemplary level limiting function.

The magnitude time curves of an exemplary frequency-dependent level limiting function $a1_{dB}(n)$ and an exemplary level limit $\mathrm{LimLev}_{dB}(n)$ are depicted in FIG. 52. Level limiting function $a1_{dB}(n)$ has been amended according to level modification function $\mathrm{LevModFct}_{dB}(n)$, shown as the amplitude frequency curve in FIG. 53, to the effect that the lower frequencies have been less limited than the upper frequencies. The windowing functions WinMat(n,t), based on exponential windows, are illustrated in FIG. 54 at frequencies 200 Hz (a), 2,000 Hz (b) and 20,000 Hz (c). Magnitude and post-ringing constraints can thus be combined with each other without any significant performance drops, as can further be seen in FIGS. 55-57.

Figure 55:
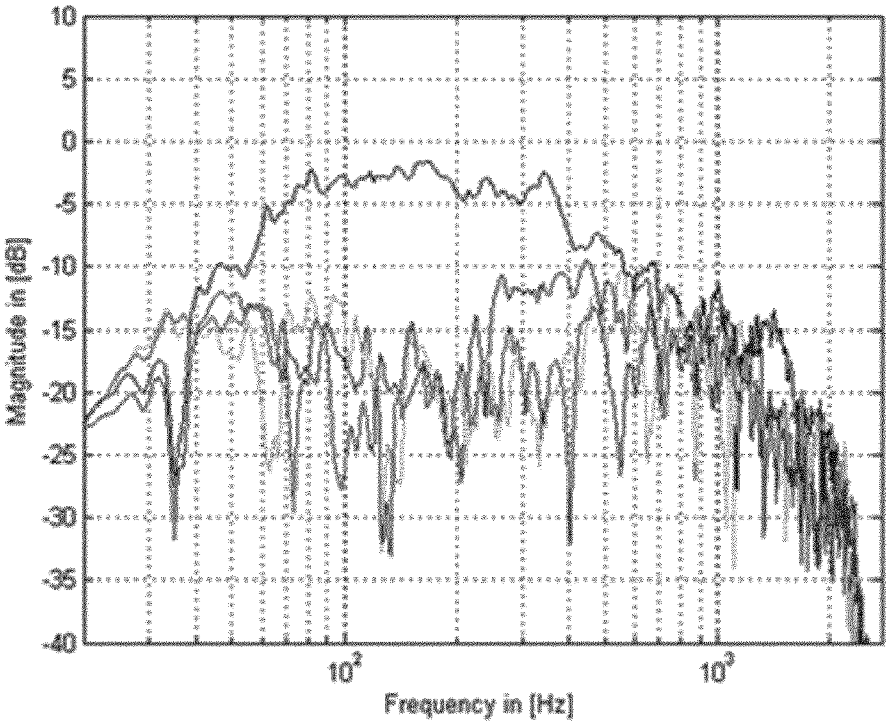
FIG. 55 is a magnitude frequency diagram illustrating the frequency characteristics at the four positions in the setup shown in FIG. 7, with applied equalizing filters when only more distant loudspeakers in combination with a pre-ringing constraint, a magnitude constraint, a frequency (dependent gain) constraint and a windowed post-ringing constraint are used.
Figure 56:
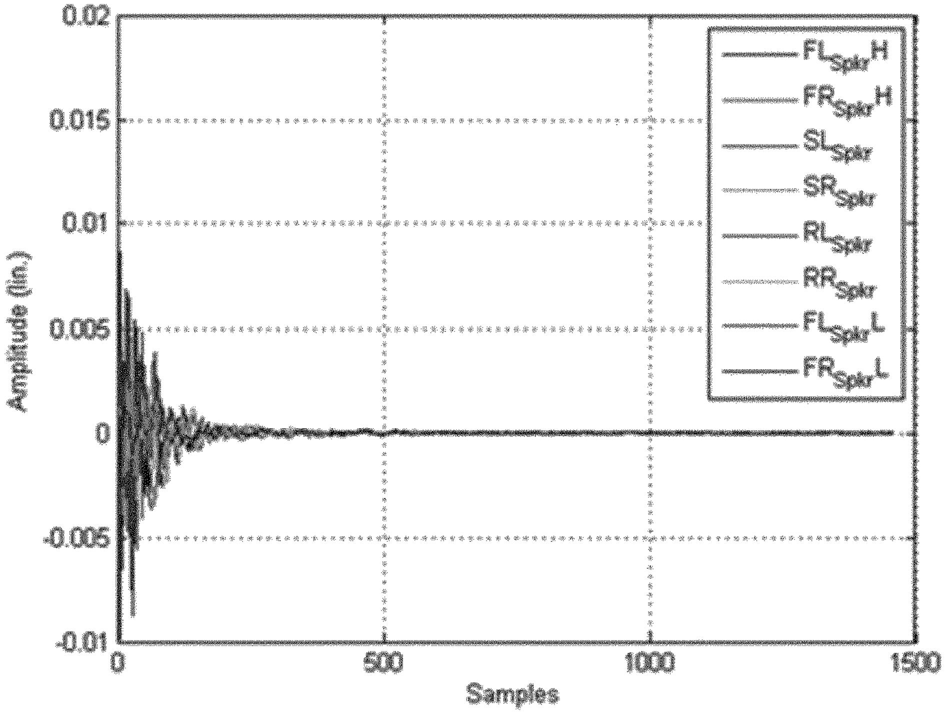
FIG. 56 is an amplitude time diagram illustrating the impulse responses of the equalization filter of the MIMO system, which results in the frequency characteristics at the four desired positions shown in FIG. 55.
Figure 57:
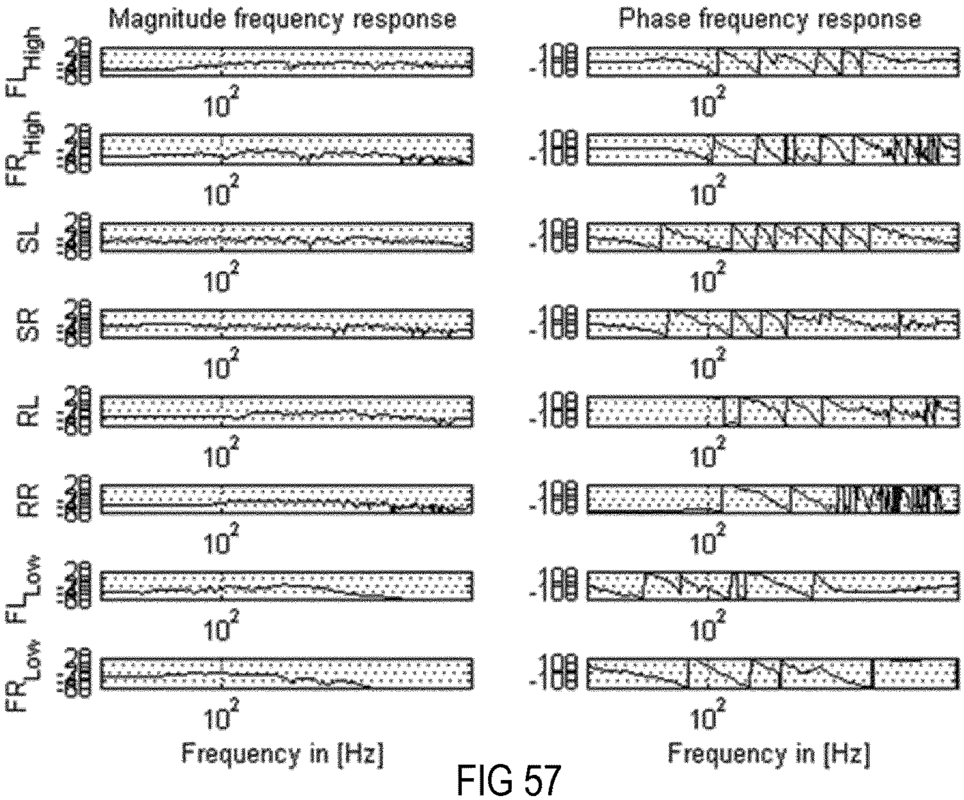
FIG. 57 is a Bode diagram of the equalizing filters applied to the setup shown in FIG. 7, with applied equalizing filters when only more distant loudspeakers in combination with a pre-ringing constraint, a magnitude constraint, a frequency (dependent gain) constraint and a windowed post-ringing constraint are used.

FIG. 55 is a diagram illustrating the magnitude frequency responses at the four positions described above in connection with FIG. 7 when equalizing filters are applied and only the more distant loudspeakers, i.e., $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ in the setup shown in FIG. 7, are used in connection with a pre-ringing constraint, a frequency constraint, a windowed magnitude and a post-ringing constraint. The corresponding impulse responses (amplitude time diagram) are shown in FIG. 56, and the corresponding Bode diagrams are shown in FIG. 57. The previously described windowing technique allows for a significant reduction of spectral components at higher frequencies, which is perceived by the listener as more convenient. It has to be noted that this special windowing technique is not only applicable in MIMO systems, but can also be applied to any other system and method that use constraints such as general equalizing systems or measurement systems.

In most of the aforementioned examples, only the more distant loudspeakers, i.e., $FL_{Spkr}H$, $FL_{Spkr}L$, $FR_{Spkr}H$, $FR_{Spkr}L$, $SL_{Spkr}$, $SR_{Spkr}$, $RL_{Spkr}$ and $RR_{Spkr}$ in the setup shown in FIG. 7, were used. However, employing more closely arranged loudspeakers such as loudspeakers $FLL_{Spkr}$, $FLR_{Spkr}$, $FRL_{Spkr}$, $FRR_{Spkr}$, $RLL_{Spkr}$, $RLR_{Spkr}$, $RRL_{Spkr}$ and $RRR_{Spkr}$ may provide additional performance enhancement. Accordingly, in the setup shown in FIG. 7, all loudspeakers, including the eight loudspeakers disposed in the headrests, are employed to assess the performance of a windowed post-ringing constraint in view of the crosstalk cancellation performance. It is assumed that a bright zone is established at the front left position and three dark zones are generated at the three remaining positions.

Figure 58:
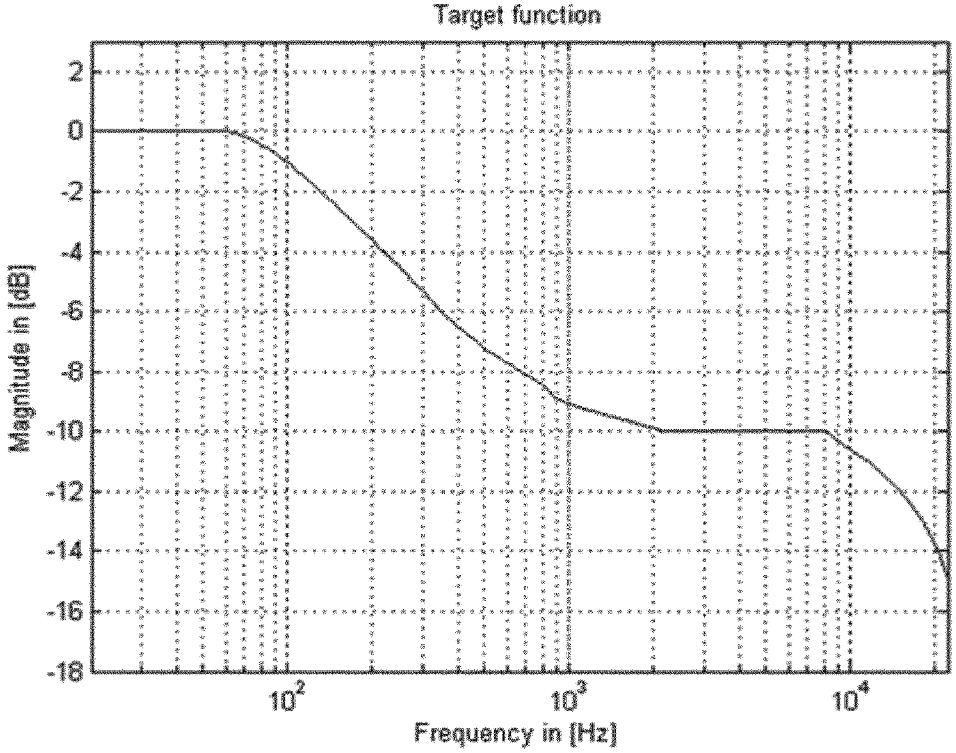
FIG. 58 is a magnitude frequency diagram illustrating an exemplary target function for the tonality of a bright zone.
Figure 59:
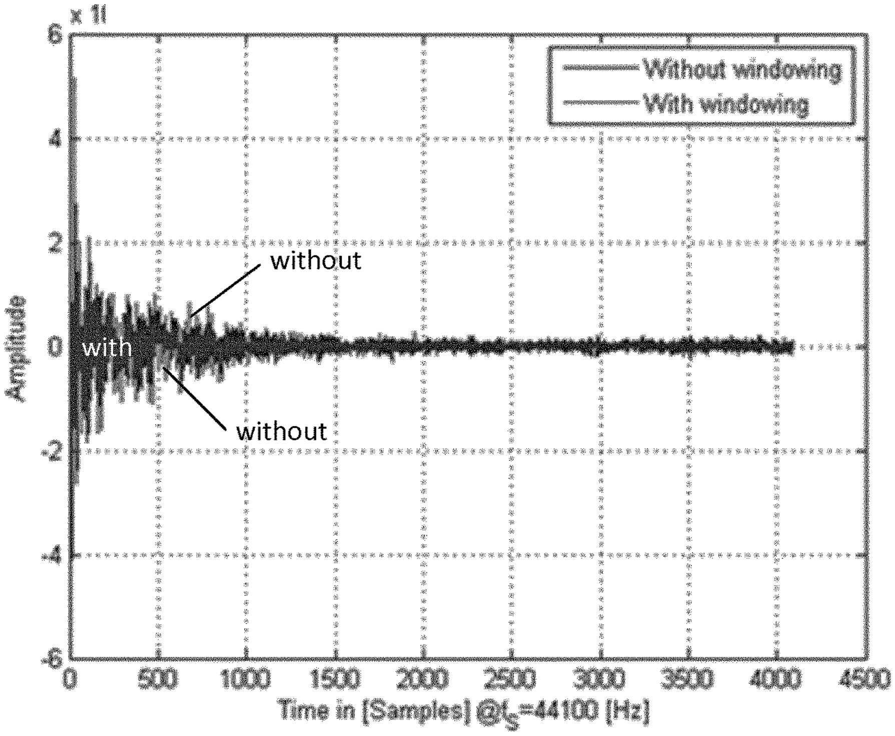
FIG. 59 is an amplitude time diagram illustrating the impulse responses in the linear domain of an exemplary equalizing filter with and without applied windowing.

FIG. 58 illustrates, by way of a magnitude frequency curve, a target function that is the reference for tonality in the bright zone and may be simultaneously applied to the pre-ringing constraint. The impulse responses of an exemplary equalizer filter based on the target function shown in FIG. 58 with and without applied windowing (windowed post-ringing constraint) are depicted in FIG. 59 as amplitude time curves in the linear domain and in FIG. 60 as magnitude time curves in the logarithmic domain. It is apparent from FIG. 60 that the windowed post-ringing constraint is capable of significantly reducing the decay time of the equalizing filter coefficients and thus of the impulse responses of the equalizing filters based on the MELMS algorithm.

Figure 60:
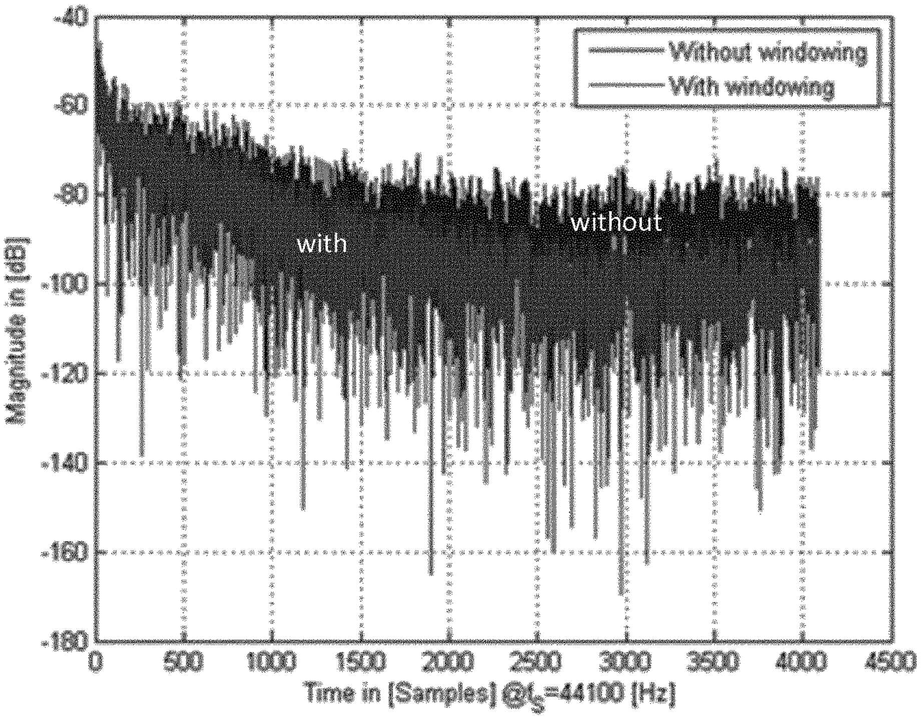
FIG. 60 is a magnitude time diagram illustrating the impulse responses in the logarithmic domain of an exemplary equalizing filter with and without applied windowing.
Figure 61:
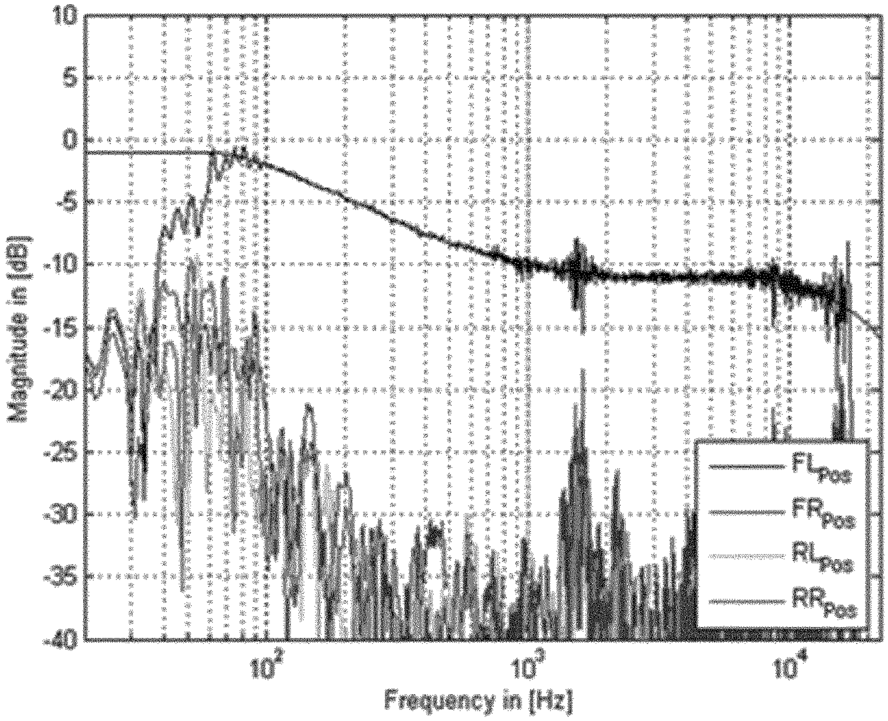
FIG. 61 is a magnitude frequency diagram illustrating the frequency characteristics at the four positions in the setup shown in FIG. 7, with applied equalizing filters when all loudspeakers in combination with a pre-ringing constraint, a magnitude constraint, a frequency (dependent gain) constraint and a windowed post-ringing constraint are used and the response at the bright zone is adjusted to the target function depicted in FIG. 58.
Figure 62:
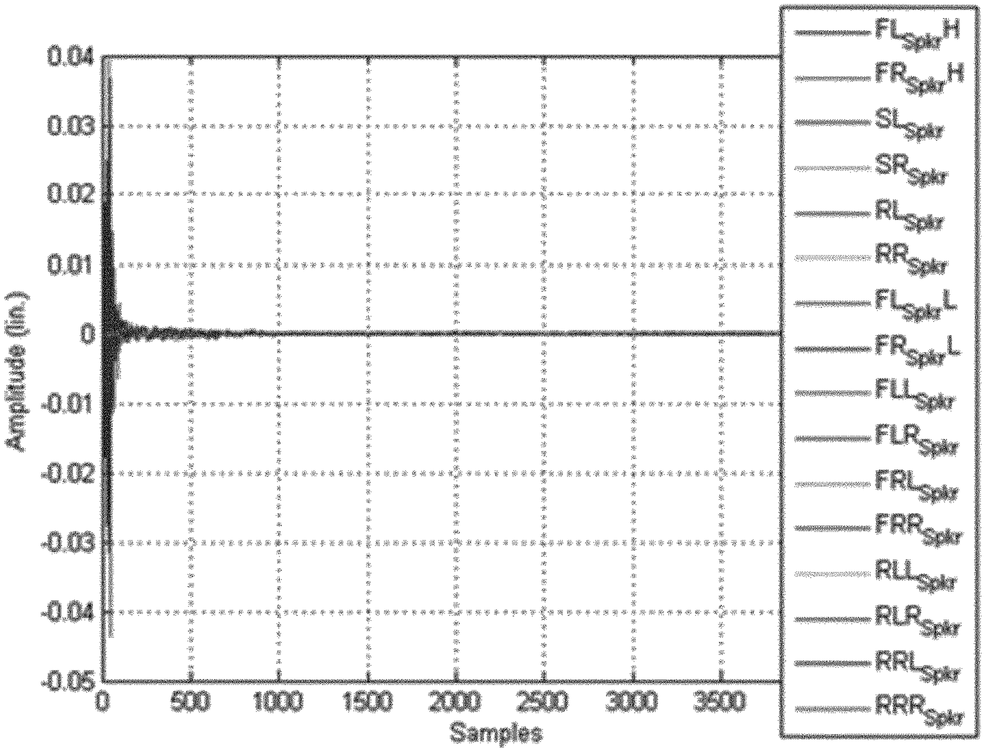
FIG. 62 is an amplitude time diagram illustrating the impulse responses of the equalization filter of the MIMO system, which results in the frequency characteristics at the four desired positions shown in FIG. 61.

From FIG. 60, it can be seen that the decay is in accordance with psychoacoustic requirements, which means that the effectiveness of the temporal reduction increases successively when frequency increases without deteriorating the crosstalk cancellation performance. Furthermore, FIG. 61 proves that the target function illustrated in FIG. 58 is met almost perfectly. FIG. 61 is a diagram illustrating the magnitude frequency responses at the four positions described above in connection with FIG. 7 when using all loudspeakers (including the loudspeakers in the headrests) in the setup shown in FIG. 7 and equalizing filters in combination with a pre-ringing constraint, a frequency constraint, a windowed magnitude and a windowed post-ringing constraint. The corresponding impulse responses are shown in FIG. 62. In general, all types of psychoacoustic constraints such as pre-ringing constraints, magnitude constraints, post-ringing constraints and all types of loudspeaker-room-microphone constraints such as frequency constraints and spatial constraints may be combined as required.

Figure 63:
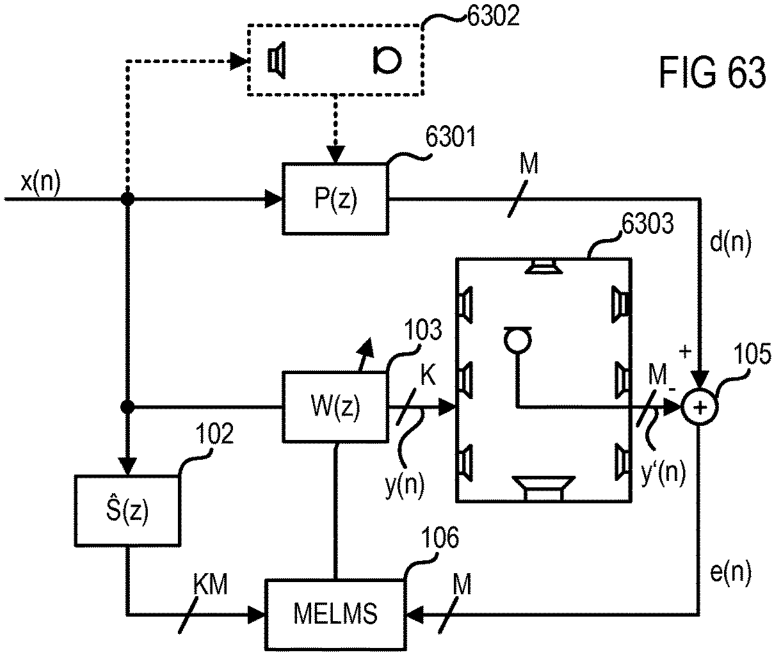
FIG. 63 is a flow chart of a system and method for reproducing wave fields or virtual sources using a modified MELMS algorithm.

Referring to FIG. 63, the system and method described above in connection with FIG. 1 may be modified not only to generate individual sound zones, but also to generate any desired wave fields (known as auralization). To achieve this, the system and method shown in FIG. 1 has been modified in view of primary path 101, which has been substituted by controllable primary path 6301. Primary path 6301 is controlled according to source room 6302, e.g., a desired listening room. The secondary path may be implemented as a target room such as the interior of vehicle 6303. The exemplary system and method shown in FIG. 63 is based on a simple setup in which the acoustics of desired listening room 6302 (e.g., a concert hall) are established (modeled) within a sound zone around one particular actual listening position with the same setup as shown in FIG. 7 (e.g., the front left position in vehicle interior 6303). A listening position may be the position of a listener's ear, a point between a listener's two ears or the area around the head at a certain position in the target room 6303.

Acoustic measurements in the source room and in the target room may be made with the same microphone constellation, i.e., the same number of microphones with the same acoustic properties, and disposed at the same positions relative to each other. As the MELMS algorithm generates coefficients for K equalizing filters that have transfer function W(z), the same acoustic conditions may be present at the microphone positions in the target room as at the corresponding positions in the source room. In the present example, this means that a virtual center speaker may be created at the front left position of target room 6303 that has the same properties as measured in source room 6302. The system and method described above may thus also be used for generating several virtual sources, as can be seen in the setup shown in FIG. 64. It should be noted that front left loudspeaker FL and front right loudspeaker FR correspond to loudspeaker arrays with high-frequency loudspeakers $FL_{Spkr}H$ and $FR_{Spkr}H$ and low-frequency loudspeakers $FL_{Spkr}L$ and $FR_{Spkr}L$, respectively. In the present example, both source room 6401 and target room 6303 may be 5.1 audio setups.

Figure 64:
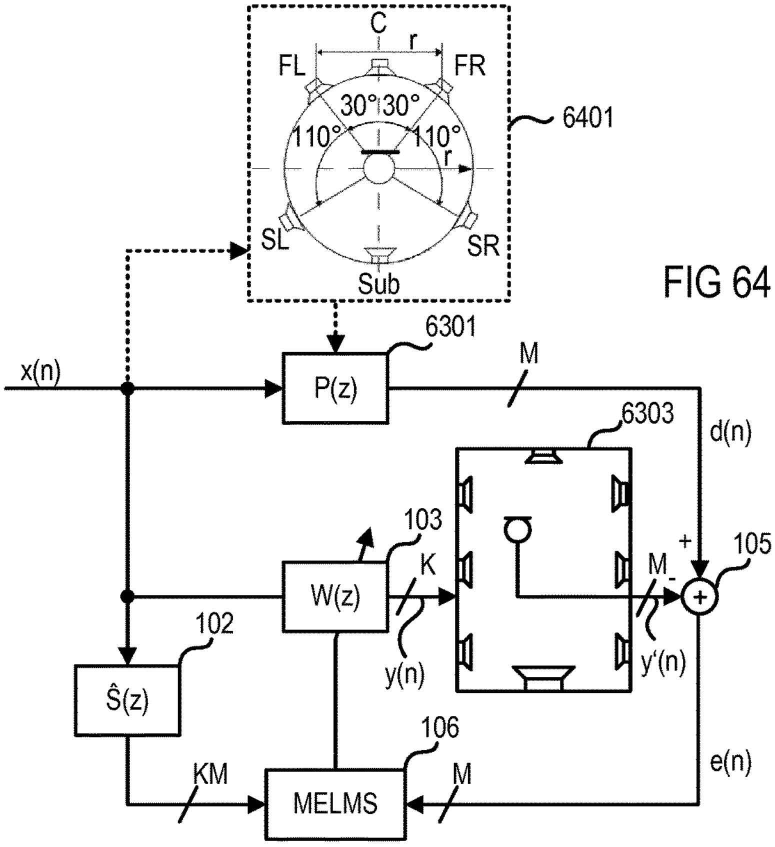
FIG. 64 is a flow chart of a system and method for reproducing virtual sources corresponding to a 5.1 loudspeaker setup using a modified MELMS algorithm.

However, not only may a single virtual source be modeled in the target room, but a multiplicity I of virtual sources may also be modeled simultaneously, wherein for each of the I virtual sources, a corresponding equalizing filter coefficient set $W_i(z)$, I being 0, . . . , I−1, is calculated. For example, when modeling a virtual 5.1 system at the front left position, as shown in FIG. 64, I=6 virtual sources are generated that are disposed according to the ITU standard for 5.1 systems. The approach for systems with a multiplicity of virtual sources is similar to the approach for systems with only one virtual source, which is that I primary path matrixes $P_i(z)$ are determined in the source room and applied to the loudspeaker set up in the target room. Subsequently, a set of equalizing filter coefficients $W_i(z)$ for K equalizing filters is adaptively determined for each matrix $P_i(z)$ by way of the modified MELMS algorithm. The I×K equalizing filters are then superimposed and applied, as shown in FIG. 65.

Figure 65:
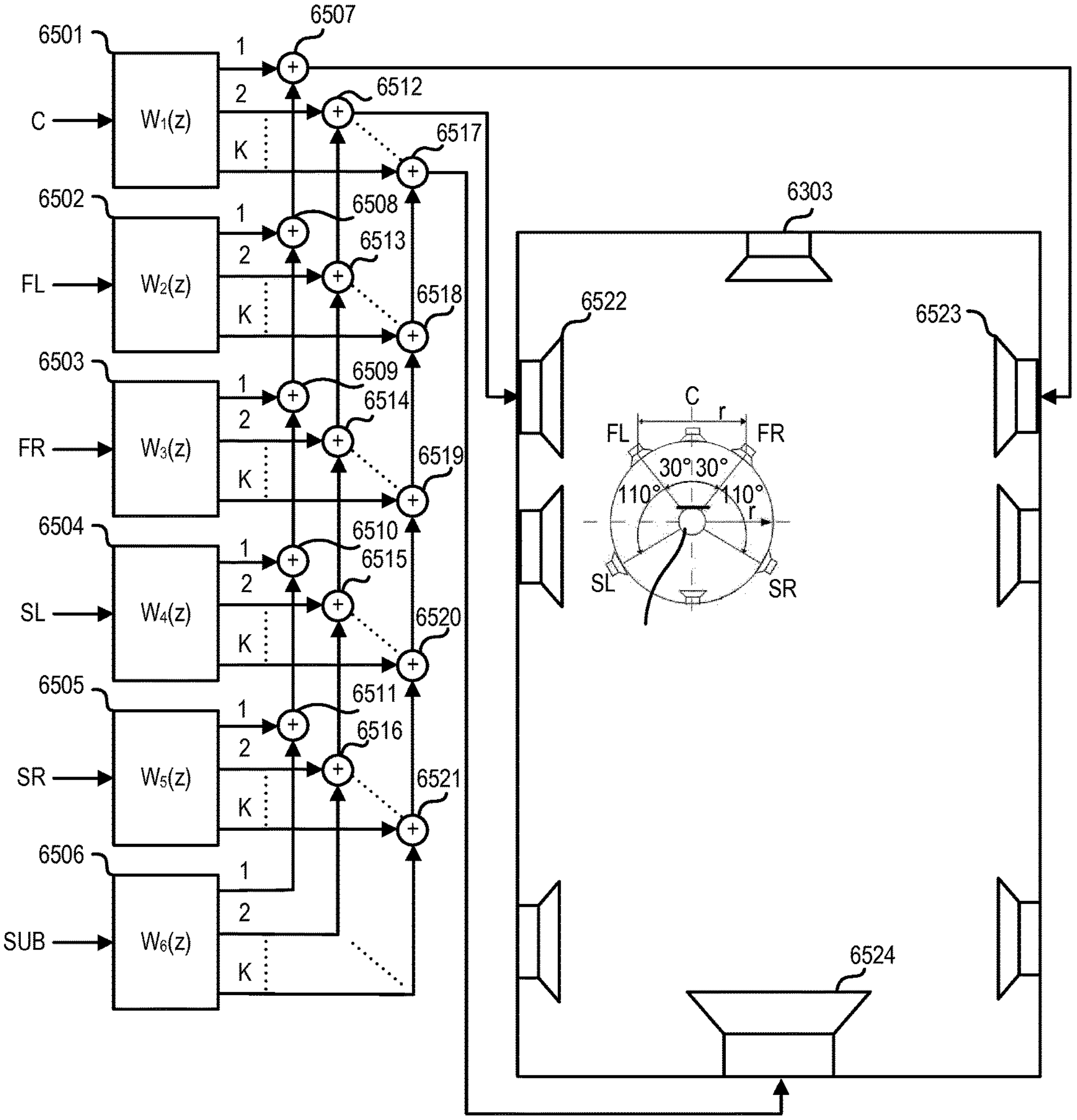
FIG. 65 is a flow chart of an equalizing filter module arrangement for reproducing virtual sources corresponding to a 5.1 loudspeaker setup at the driver position of a vehicle.

FIG. 65 is a flow chart of an application of accordingly generated I×K equalizing filters that form I filter matrixes 6501-6506 to provide I=6 virtual sound sources for the approximate sound reproduction according to the 5.1 standard at the driver's position. According to the 5.1 standard, six input signals relating to loudspeaker positions C, FL, FR, SL, SR and Sub are supplied to the six filter matrixes 6501-6506. Equalizing filter matrixes 6501-6506 provide I=6 sets of equalizing filter coefficients $W_1(z)$-$W_6(z)$ in which each set includes K equalizing filters and thus provides K output signals. Corresponding output signals of the filter matrixes are summed up by way of adders 6507-6521 and are then supplied to the respective loudspeakers arranged in target room 6303. For example, the output signals with k=1 are summed up and supplied to front right loudspeaker (array) 6523, the output signals with k=2 are summed up and supplied to front left loudspeaker (array) 6522, the output signals with k=6 are summed up and supplied to subwoofer 6524 and so forth.

Figure 66:
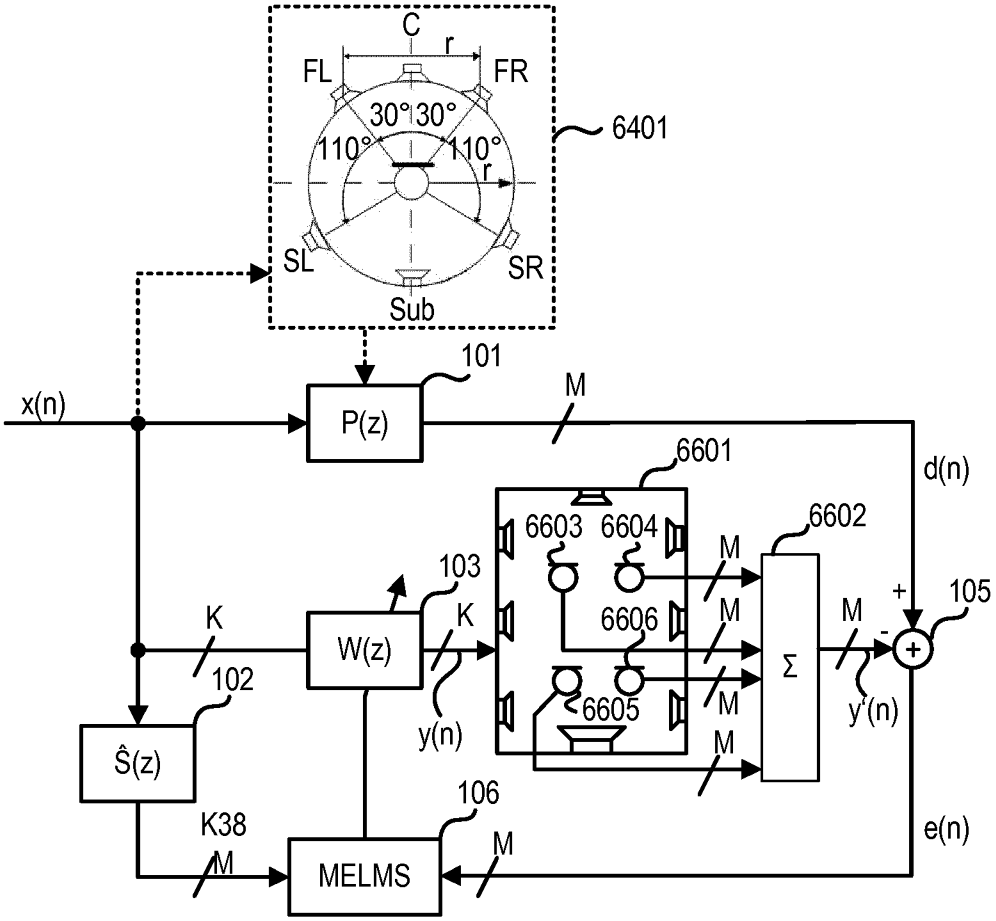
FIG. 66 is a flow chart of a system and method that uses a modified MELMS algorithm to generate virtual sound sources corresponding to a 5.1 loudspeaker setup at all four positions of a vehicle.

A wave field can be established in any number of positions, e.g., microphone arrays 6603-6606 at four positions in a target room 6601, as shown in FIG. 66. The microphone arrays providing 4×M are summed up in a summing module 6602 to provide M signals y(n) to subtractor 105. The modified MELMS algorithm allows not only for control of the position of the virtual sound source, but also for the horizontal angle of incidence (azimuth), the vertical angle of incidence (elevation) and the distance between the virtual sound source and the listener.

Figure 67:
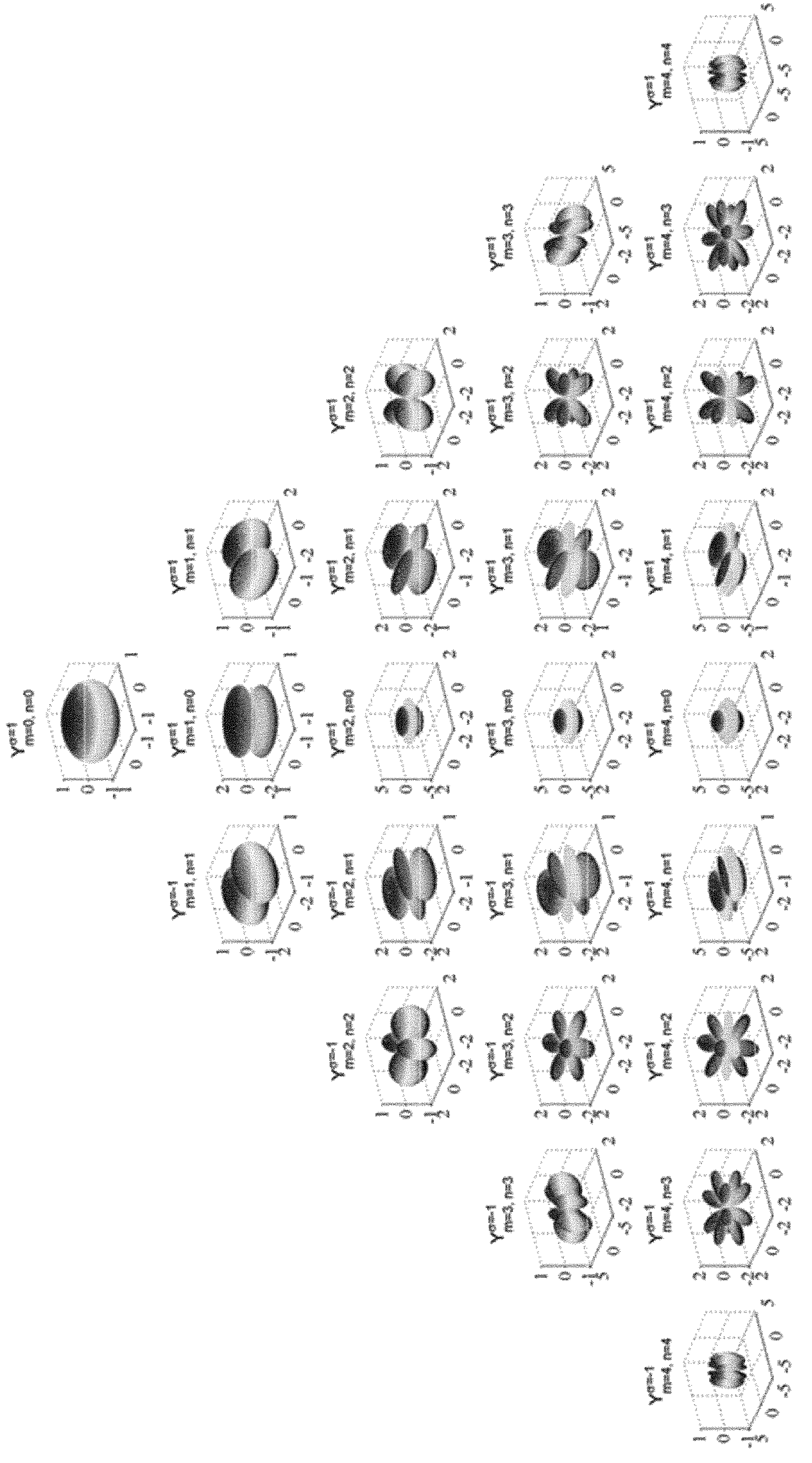
FIG. 67 is a diagram illustrating spherical harmonics up to fourth order.

Furthermore, the field may be coded into its eigenmodes, i.e., spherical harmonics, which are subsequently decoded again to provide a field that is identical or at least very similar to the original wave field. During decoding, the wave field may be dynamically modified, e.g., rotated, zoomed in or out, clinched, stretched, shifted back and forth, etc. By coding the wave field of a source in a source room into its eigenmodes and coding the eigenmodes by way of a MIMO system or method in the target room, the virtual sound source can thus be dynamically modified in view of its three-dimensional position in the target room. FIG. 67 depicts exemplary eigenmodes up to an order of M=4. These eigenmodes, e.g., wave fields that have the frequency-independent shapes shown in FIG. 67, may be modeled by way of specific sets of equalizing filter coefficients to a certain degree (order). The order basically depends on the sound system present in the target room such as the sound system's upper cutoff frequency. The higher the cutoff frequency is, the higher the order should be.

For loudspeakers in the target room that are more distant from the listener and that thus exhibit a cutoff frequency of $f_{Lim}$, =400 . . . 600 Hz, a sufficient order is M=1, which are the first $N=(M+1)^2=4$ spherical harmonics in three dimensions and N=(2M+1)=3 in two dimensions.

$$f_{Lim} = \frac{cM}{2\pi R},$$

wherein c is the speed of sound (343 m/s at 20° C.), M is the order of the eigenmodes, N is the number of eigenmodes and R is the radius of the listening surface of the zones.

By contrast, when additional loudspeakers are disposed much closer to the listener (e.g., headrest loudspeakers), order M may increase dependent on the maximum cutoff frequency to M=2 or M=3. Assuming that the distant field conditions are predominant, i.e., that the wave field can be split into plane waves, the wave field can be described by way of a Fourier Bessel series, as follows:

$$P(\underline{r},\omega)=S(j\omega)\left(\sum_{m=0}^{\infty} j^m j_m(kr) \sum_{0\le n\le m,\sigma=\pm 1} B_{m,n}^{\sigma} Y_{m,n}^{\sigma}(\theta,\varphi)\right),$$

wherein $B_{m,n}^{\sigma}$ are the Ambisonic coefficients (weighting coefficients of the $N^{th}$ spherical harmonic), $Y_{m,n}^{\sigma}(\theta,\varphi)$ is a complex spherical harmonic of $m^{th}$ order, $n^{th}$ grade (real part $\sigma=1$, imaginary part $\sigma=-1$), $P(\underline{r},\omega)$ is the spectrum of the sound pressure at a position $\underline{r}=(r, \theta, \varphi)$, $S(j\omega)$ is the input signal in the spectral domain, j is the imaginary unit of complex numbers and $j_m(kr)$ is the spherical Bessel function of the first species of $m^{th}$ order.

Figure 68:
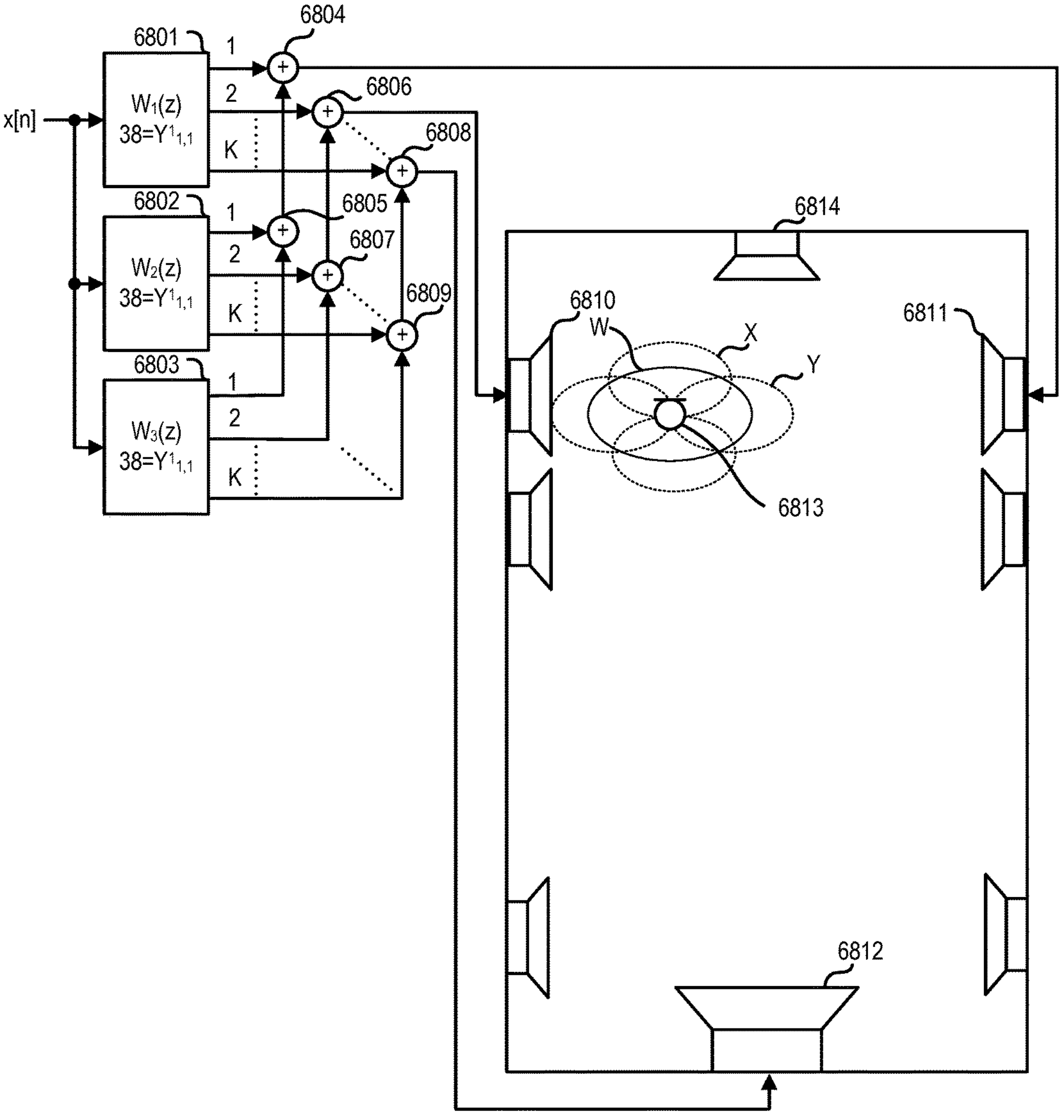
FIG. 68 is a flow chart of a system and method for generating spherical harmonics in a target room at a distinct position using a modified MELMS algorithm.

The complex spherical harmonics $Y_{m,n}^{\sigma}(\theta,\varphi)$ may then be modeled by the MIMO system and method in the target room, i.e., by the corresponding equalizing filter coefficients, as depicted in FIG. 68. By contrast, the Ambisonic coefficients $B_{m,n}^{\sigma}$ are derived from an analysis of the wave field in the source room or a room simulation. FIG. 68 is a flow chart of an application in which the first N=3 spherical harmonics are generated in the target room by way of a MIMO system or method. Three equalizing filter matrixes 6801-6803 provide the first three spherical harmonics (W, X and Y) of a virtual sound source for the approximate sound reproduction at the driver's position from input signal x[n]. Equalizing filter matrixes 6801-6803 provide three sets of equalizing filter coefficients $W_1(z)$-$W_3(z)$ in which each set includes K equalizing filters and thus provides K output signals. Corresponding output signals of the filter matrixes are summed up by way of adders 6804-6809 and then supplied to the respective loudspeakers arranged in target room 6814. For example, the output signals with k=1 are summed up and supplied to front right loudspeaker (array) 6811, the output signals with k=2 are summed up and supplied to front left loudspeaker (array) 6810 and the last output signals with k=K are summed up and supplied to subwoofer 6812. At listening position 6813 then, the first three eigenmodes X, Y and Z are generated that together form the desired wave field of one virtual source.

Modifications can be made in a simple manner, as can be seen from the following example in which a rotational element is introduced while decoding:

$$P(\underline{r},\omega)=S(j\omega)\left(\sum_{m=0}^{\infty} j^m j_m(kr) \sum_{0\le n\le m,\sigma=\pm 1} B_{m,n}^{\sigma} Y_{m,n}^{\sigma}(\theta,\varphi) Y_{m,n}^{\sigma}(\theta_{Des},\varphi_{Des})\right),$$

wherein $Y_{m,n}^{\sigma}(\theta_{Des},\varphi_{Des})$ are modal weighting coefficients that turn the spherical harmonics in the desired direction $(\theta_{Des},\varphi_{Des})$.

Figure 69:
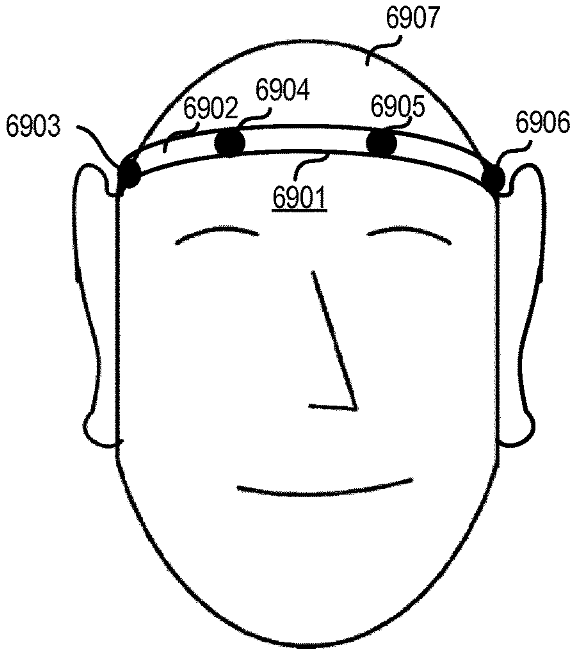
FIG. 69 is a schematic diagram illustrating a two-dimensional measuring microphone array disposed on a headband.

Referring to FIG. 69, an arrangement for measuring the acoustics of the source room may include microphone array 6901 in which a multiplicity of microphones 6903-6906 are disposed on a headband 6902. Headband 6902 may be worn by a listener 6907 when in the source room and positioned slightly above the listener's ears. Instead of a single microphone arrays may be used to measure the acoustics of the source room. The microphone arrays include at least two microphones arranged on a circle with a diameter corresponding to the diameter of an average listener's head and in a position that corresponds to an average listener's ears. Two of the array's microphones may be disposed at or at least close to the position of the average listener's ears.

Figure 70:
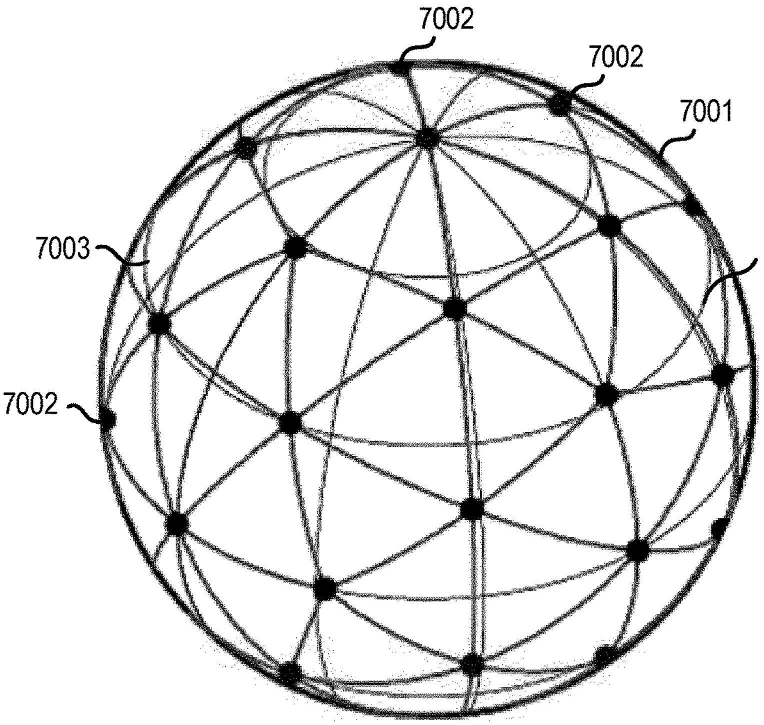
FIG. 70 is a schematic diagram illustrating a three-dimensional measuring microphone array disposed on a rigid sphere.

Instead of a listener's head, any artificial head or rigid sphere with properties similar to a human head may also be used. Furthermore, additional microphones may be arranged in positions other than on the circle, e.g., on further circles or according to any other pattern on a rigid sphere. FIG. 70 depicts a microphone array including a multiplicity of microphones 7002 on rigid sphere 7001 in which some of microphones 7002 may be arranged on at least one circle 7003. Circle 7003 may be arranged such that it corresponds to a circle that includes the positions of a listener's ears.

Figure 71:
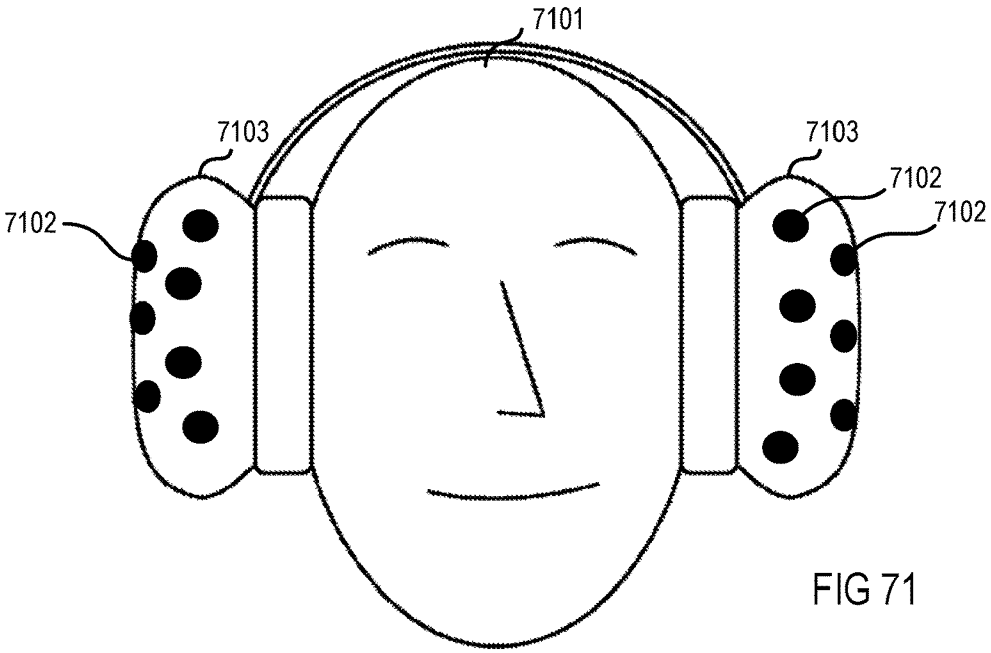
FIG. 71 is a schematic diagram illustrating a three-dimensional measuring microphone array disposed on two ear cups.

Alternatively, a multiplicity of microphones may be arranged on a multiplicity of circles that include the positions of the ears but that the multiplicity of microphones concentrates to the areas around where the human ears are or would be in case of an artificial head or other rigid sphere. An example of an arrangement in which microphones 7102 are arranged on ear cups 7103 worn by listener 7101 is shown in FIG. 71. Microphones 7102 may be disposed in a regular pattern on a hemisphere around the positions of the human ears.

Other alternative microphone arrangements for measuring the acoustics in the source room may include artificial heads with two microphones at the ears' positions, microphones arranged in planar patterns or microphones placed in a (quasi-)regular fashion on a rigid sphere, able to directly measure the Ambisonic coefficients.

Figure 53:
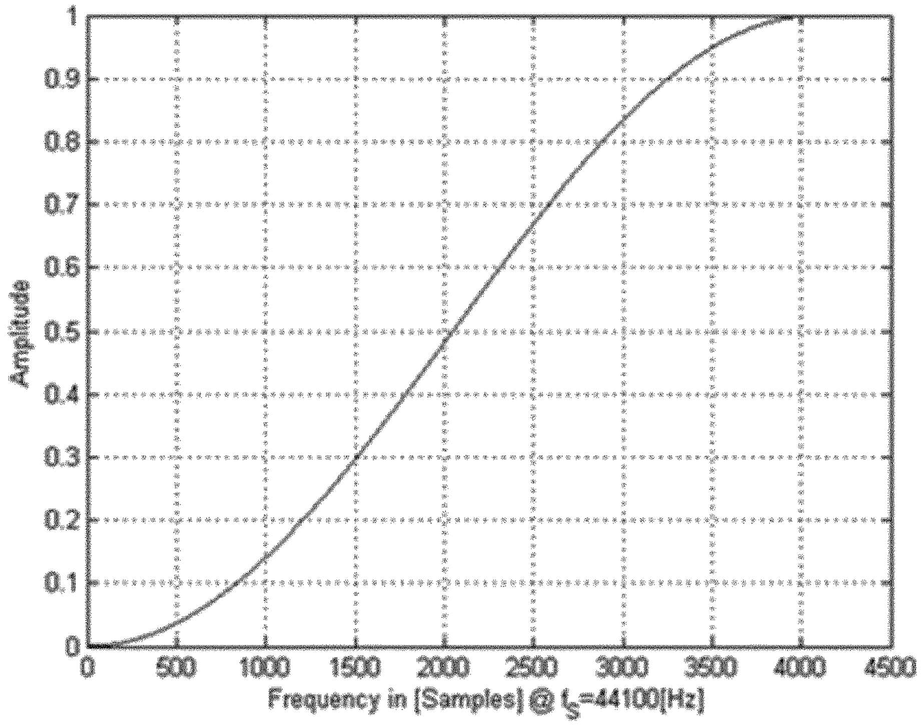
FIG. 53 is an amplitude time diagram corresponding to the magnitude time curve shown in FIG. 52.
Figure 72:
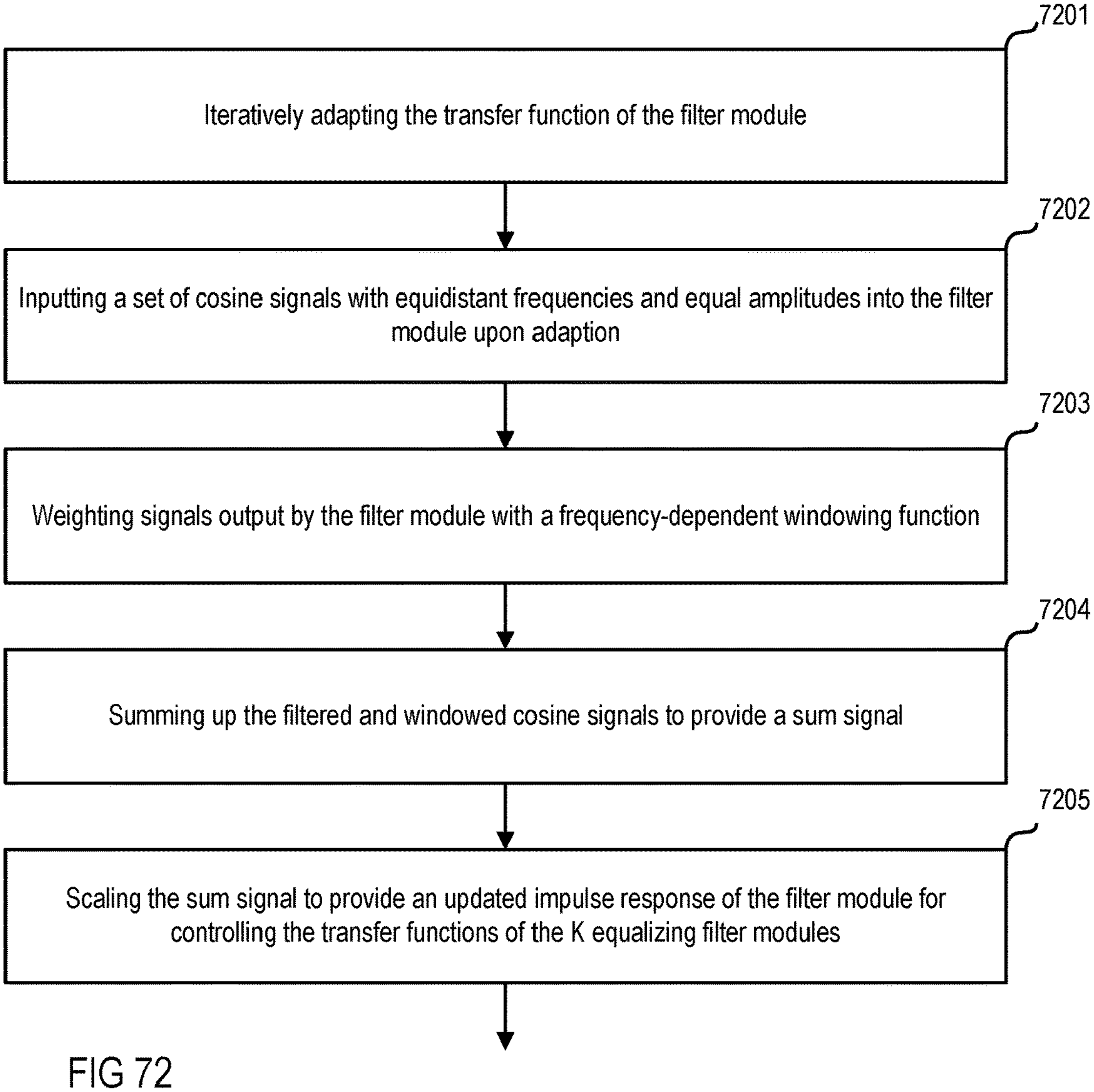
FIG. 72 is a process chart illustrating an exemplary process for providing a magnitude constraint with integrated post-ringing constraint.

Referring again to the description above in connection with FIGS. 52-54, an exemplary process for providing a magnitude constraint with integrated post-ringing constraint as shown in FIG. 72 may include iteratively adapting the transfer function of the filter module (7201), inputting a set of cosine signals with equidistant frequencies and equal amplitudes into the filter module upon adaption (7202), weighting signals output by the filter module with a frequency-dependent windowing function (7203), summing up the filtered and windowed cosine signals to provide a sum signal (7204), and scaling the sum signal to provide an updated impulse response of the filter module for controlling the transfer functions of the K equalizing filter modules (7205).

It is to be noted that in the system and methods described above that both the filter modules and the filter control modules may be implemented in a vehicle but alternatively only the filter modules may be implemented in the vehicle and the filter control modules may be outside the vehicle. As another alternative both the filter modules and the filter control modules may be implemented outside vehicle, e.g., in a computer and the filter coefficients of the filter module may be copied into a shadow filter disposed in the vehicle. Furthermore, the adaption may be a one-time process or a consecutive process as the case may be.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method configured to generate a sound wave field around a listening position in a target loudspeaker-room-microphone system in which a loudspeaker array of at least one group of loudspeakers, with each group of loudspeakers having at least one loudspeaker, is disposed around the listening position, and a microphone array of at least one group of microphones, with each group of microphones having at least one microphone, is disposed at the listening position, the method comprising:

equalizing filtering with a controllable transfer function that is coupled to a group of loudspeakers and to an input signal path, controlling with an equalization control signal of the controllable transfer function for equalizing filtering via an equalizing filter module according to an adaptive control algorithm based on an error signal from the microphone and an input signal on the input signal path, wherein:

the microphone array comprises at least two first groups of microphones that are annularly disposed around a listener's head, around or in an artificial head, or around or in a rigid sphere, and modeling a primary path present in a desired source loudspeaker-room-microphone system that is coupled to the at least one group of microphones and to the input signal path, modeling of the primary path is based on eigenmodes in the source loudspeaker-room-microphone system, and wherein the primary path is a path positioned between an input signal source and a measuring microphone, wherein the eigenmodes correspond to coded original sound wave fields that are modeled via the controllable transfer function that perform the equalizing filtering, and wherein the eigenmodes are decoded to provide virtual sound wave fields that are similar to the original sound wave fields.

2. The method of claim 1, further comprising at least one second group of microphones annularly disposed around the listener's head, the artificial head or the rigid sphere.

3. The method of claim 1, further comprising at least two third groups of microphones, wherein the at least two third groups of microphones and the first groups of microphones are together spherically disposed around the listener's head, around or in the artificial head, or around or in the rigid sphere.

4. The method of claim 3, wherein the at least two third groups of microphones and the first groups of microphones are together spherically disposed around the listener's head, around or in the artificial head, or around or in a rigid sphere are disposed in a regular fashion.

5. The method of claim 1, further comprising at least three fourth groups of microphones disposed around each microphone of the first groups of microphones.

6. The method of claim 1, wherein two groups of the at least two first groups of microphones are arranged in or close to a position where a listener's ears are or would be in the target loudspeaker-room-microphone system.

* * * * *